(12) United States Patent
Yasuda

(10) Patent No.: US 12,366,311 B2
(45) Date of Patent: Jul. 22, 2025

(54) JOINT PIPE

(71) Applicants: HIGASHIO MECH CO., LTD., Kawachinagano (JP); DAIKIN INDUSTRIES, LTD., Osaka (JP)

(72) Inventor: Akio Yasuda, Kawachinagano (JP)

(73) Assignees: HIGASHIO MECH CO., LTD., Kawachinagano (JP); DAIKIN INDUSTRIES, LTD., Osaka (JP)

( * ) Notice: Subject to any disclaimer, the term of this patent is extended or adjusted under 35 U.S.C. 154(b) by 163 days.

(21) Appl. No.: 17/621,619

(22) PCT Filed: Jun. 22, 2020

(86) PCT No.: PCT/JP2020/024445
§ 371 (c)(1),
(2) Date: Dec. 21, 2021

(87) PCT Pub. No.: WO2020/262318
PCT Pub. Date: Dec. 30, 2020

(65) Prior Publication Data
US 2022/0356971 A1    Nov. 10, 2022

(30) Foreign Application Priority Data

Jun. 28, 2019 (JP) .................................. 2019-121338
Jul. 1, 2019 (JP) .................................. 2019-122823
(Continued)

(51) Int. Cl.
F16L 19/12 (2006.01)
F16L 19/075 (2006.01)
F16L 19/14 (2006.01)

(52) U.S. Cl.
CPC ............... *F16L 19/12* (2013.01); *F16L 19/14* (2013.01); *F16L 19/075* (2013.01)

(58) Field of Classification Search
CPC ............ F16L 19/10; F16L 19/12; F16L 19/14
See application file for complete search history.

(56) References Cited

U.S. PATENT DOCUMENTS 2,695,796 A * 11/1954 Woodling ............... F16L 19/10
2,943,871 A *  7/1960 St Clair ................. F16L 19/10
(Continued)

FOREIGN PATENT DOCUMENTS

| CN | 103917816 A | 7/2014 |
| CN | 106015778 A | 10/2016 |

(Continued)

OTHER PUBLICATIONS

International Search Report for International Application No. PCT/JP2020/024445 dated Sep. 15, 2020 (3 sheets).
(Continued)

*Primary Examiner* — Zachary T Dragicevich
(74) *Attorney, Agent, or Firm* — Kratz, Quintos & Hanson, LLP

(57) ABSTRACT

A pipe joint allowing reliable connection to a pipe P without flaring. The pipe joint includes a flare joint body 1F, a cap nut 2, and a stop ring 3. A curved pressure-contacting slope surface 32 of the stop ring 3 contacts a slope surface 5 with reduced-diameter tip of the flare joint body 1F under pressure to establish sealing by means of mutual contact between metallic surfaces. The pipe P is grasped in a tightly pressure-contacting state using a back tooth and a front tooth formed at a tip head 37 of a substantially cylindrical thin part 35 of the stop ring 3.

9 Claims, 31 Drawing Sheets

(30) Foreign Application Priority Data

May 29, 2020 (JP) ................................ 2020-094035
May 29, 2020 (JP) ................................ 2020-094036

(56) References Cited

U.S. PATENT DOCUMENTS

| | | | |
|---|---|---|---|
| 3,079,182 A | | 2/1963 | Appleton |
| 3,708,186 A | * | 1/1973 | Takagi .................... F16L 19/12 |
| 3,787,080 A | * | 1/1974 | Daniel .................... F16L 19/10 |
| 4,136,896 A | * | 1/1979 | Rodman .................. F16L 19/10 |
| 4,740,019 A | * | 4/1988 | Casimir .................. F16L 19/10 |
| 4,867,489 A | * | 9/1989 | Patel ....................... F16L 19/12 |
| 5,028,078 A | * | 7/1991 | Schwarz ................. F16L 19/10 |
| 6,108,895 A | * | 8/2000 | Helsley, Jr. ............. F16L 19/10 |
| 9,194,514 B2 | * | 11/2015 | McKay .................. F16L 13/146 |
| 2005/0189766 A1 | | 9/2005 | Norman |
| 2008/0001404 A1 | | 1/2008 | Nicholson |
| 2016/0281893 A1 | | 9/2016 | Inaba |
| 2017/0089496 A1 | | 3/2017 | Lennon |

FOREIGN PATENT DOCUMENTS

| | | |
|---|---|---|
| DE | 01237391 B2 | 3/1967 |
| EP | 1195550 A2 | 4/2002 |
| EP | 1851474 A1 | 11/2007 |
| EP | 2434191 A1 | 3/2012 |
| EP | 2521874 A2 | 11/2012 |
| FR | 2395451 A1 | 1/1979 |
| JP | S56-007178 U | 1/1981 |
| JP | S56-171489 U | 12/1981 |
| JP | S60-027874 B2 | 7/1985 |
| JP | S64-055393 U | 4/1989 |
| JP | 2003-529032 A | 9/2003 |
| JP | 2005-042858 A | 2/2005 |
| JP | 2009-523967 A | 6/2009 |
| JP | 2009-287646 A | 12/2009 |
| JP | 2010-270846 A | 12/2010 |
| JP | 5091191 B2 | 12/2012 |
| JP | 2015-007445 A | 1/2015 |
| JP | 2017-223277 A | 12/2017 |
| KR | 101468788 B1 | 12/2014 |
| WO | 01/73333 A1 | 10/2001 |
| WO | 2006/089396 A1 | 8/2006 |
| WO | 2007/087043 A2 | 8/2007 |
| WO | 2011/082417 A2 | 7/2011 |
| WO | 2015/093066 A1 | 6/2015 |
| WO | 2018/011906 A1 | 1/2018 |

OTHER PUBLICATIONS

Office Action of Japanese Patent Application No. 2019-121338: Notice of Reasons for Refusal dated Dec. 23, 2021 (4 sheets, 4 sheets translation, 8 sheets total).

Office Action of Japanese Patent Application No. 2019-122823: Notice of Reasons for Refusal dated Dec. 23, 2021 (4 sheets, 4 sheets translation, 8 sheets total).

Office Action of Japanese Patent Application No. 2020-094036: Notice of Reasons for Refusal dated Dec. 23, 2021 (5 sheets, 5 sheets translation, 10 sheets total).

Office Action of Japanese Patent Application No. 2019-122823: Notice of Reasons for Refusal dated Jul. 15, 2022 (4 sheets, 4 sheets translation, 8 sheets total).

Office Action of Chinese Patent Application No. 202080045514.2 dated Jan. 17, 2024 (6 sheets, 11 sheets translation, 17 sheets total).

Extended European Search Report for European Patent Application No. 20831687.7 dated Jul. 26, 2023 (13 sheets).

Extended European Search Report for European Patent Application No. 23205201.9 dated Dec. 14, 2023 (7 sheets).

Office Action of Korean Patent Application No. 10-2022-7002471 dated Dec. 18, 2024 (11 sheets 13 sheets translation, 24 sheets total).

Office Action of U.S. Appl. No. 18/536,018 dated May 28, 2025 (Divisional of U.S. Appl. No. 17/621,619).

* cited by examiner

Fig.3
(A)
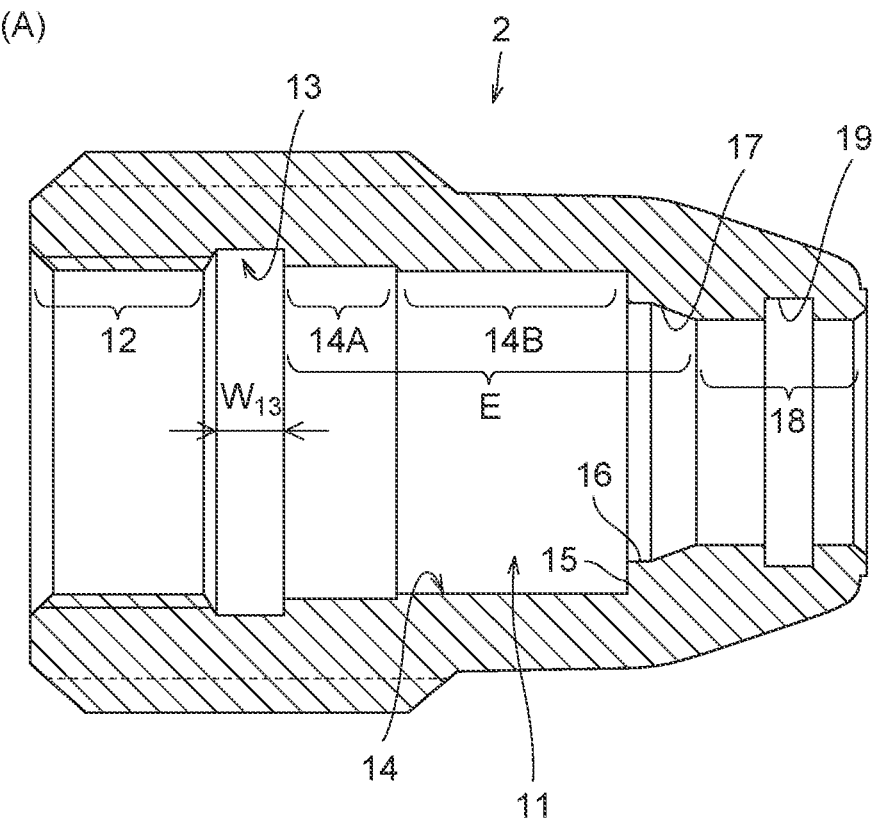
(B)
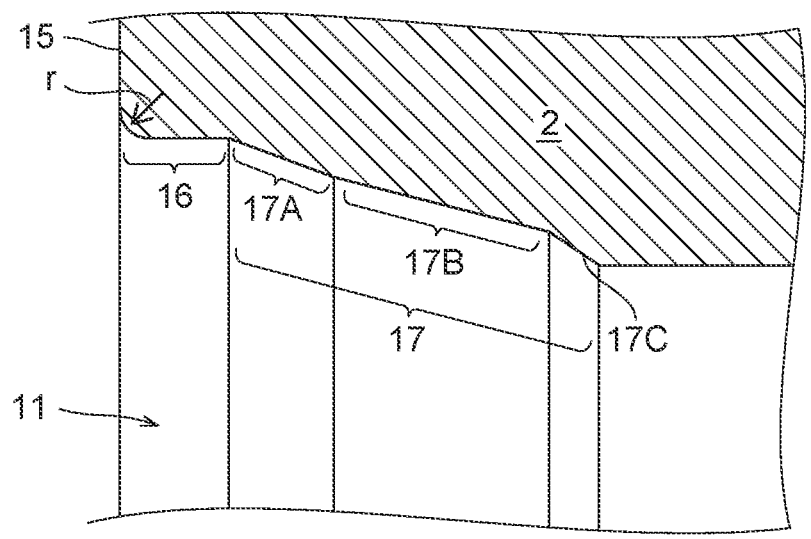

Fig.17
(A)
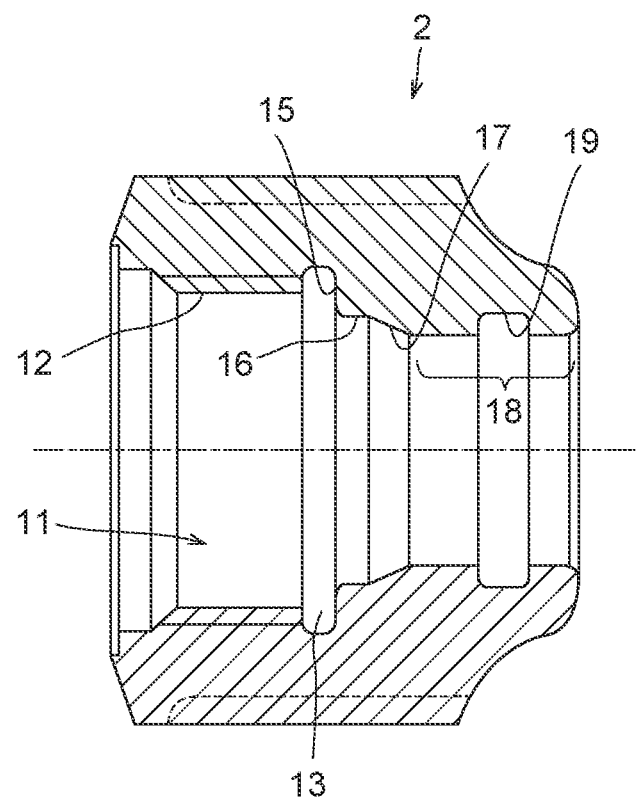
(B)
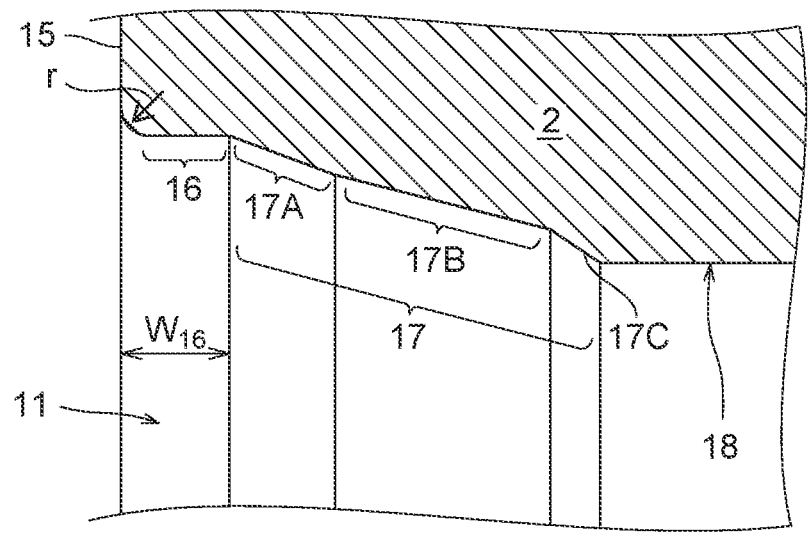

Fig.21
(A)
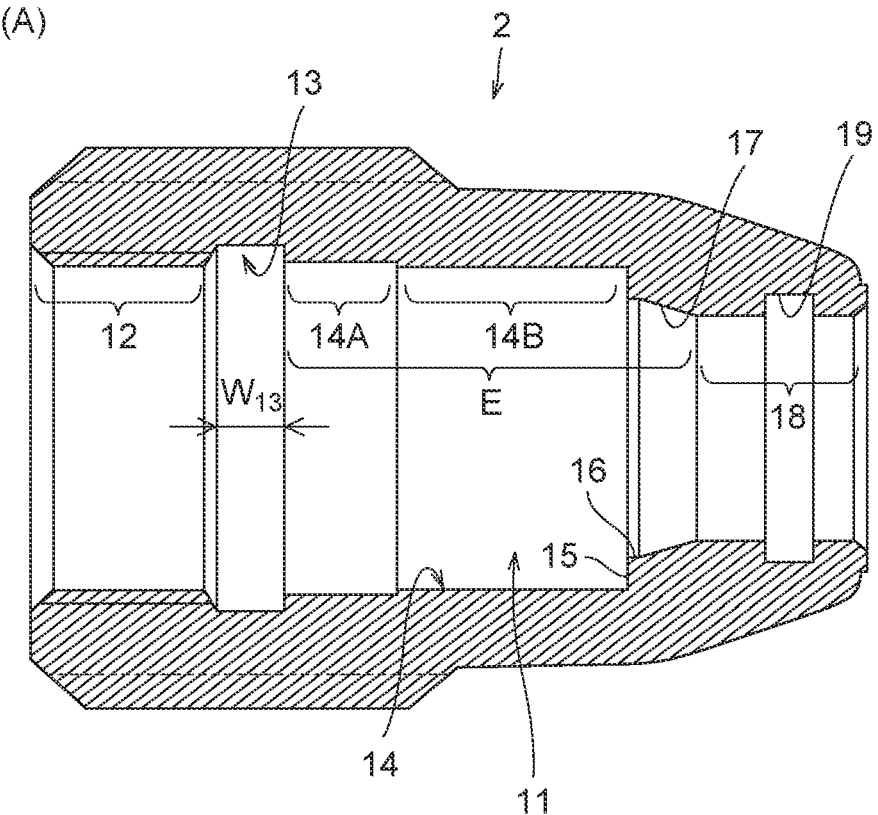
(B)
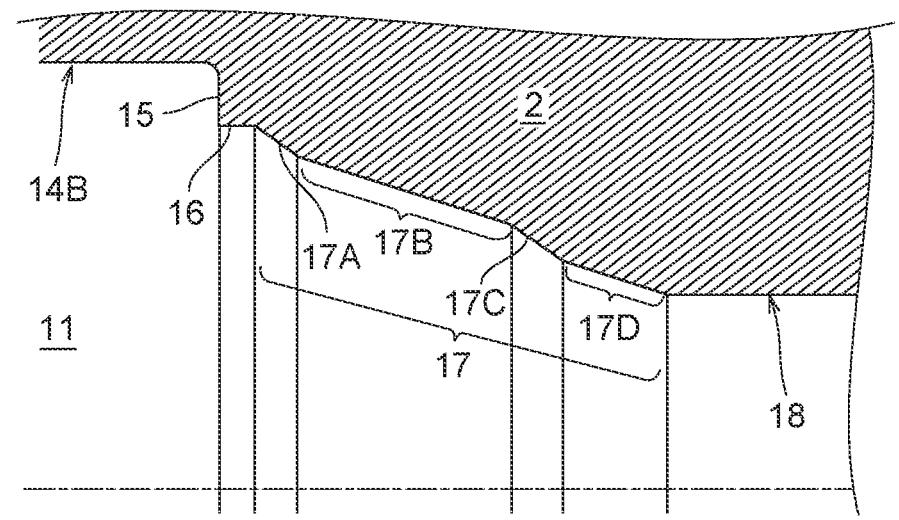

Fig.22
(A)
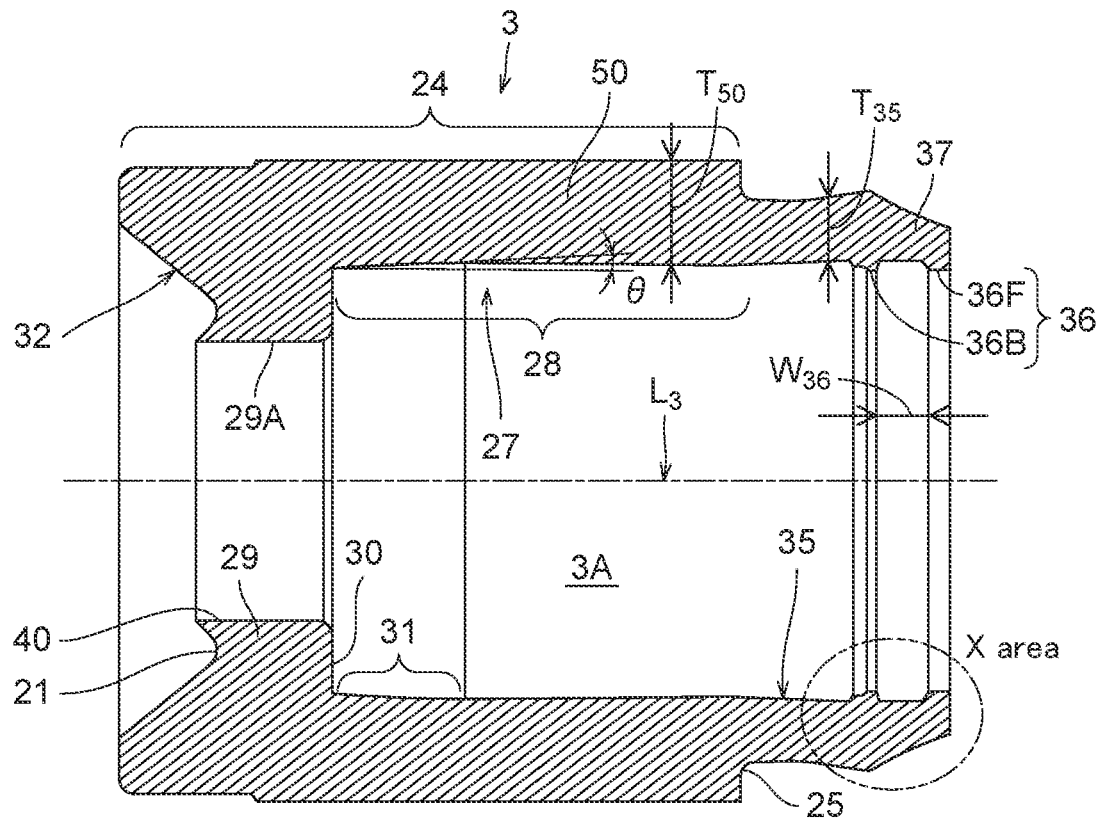
(B)
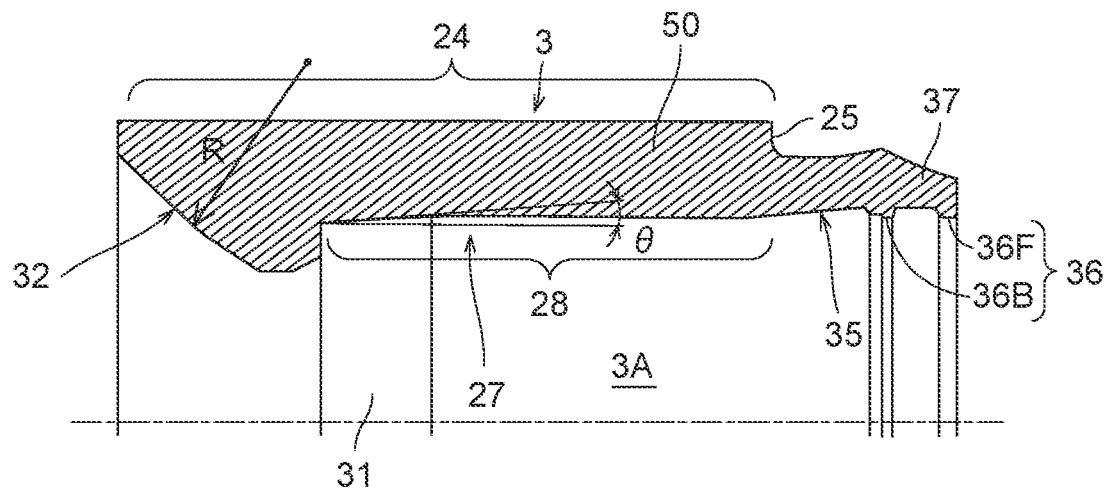

Fig.37
(A)
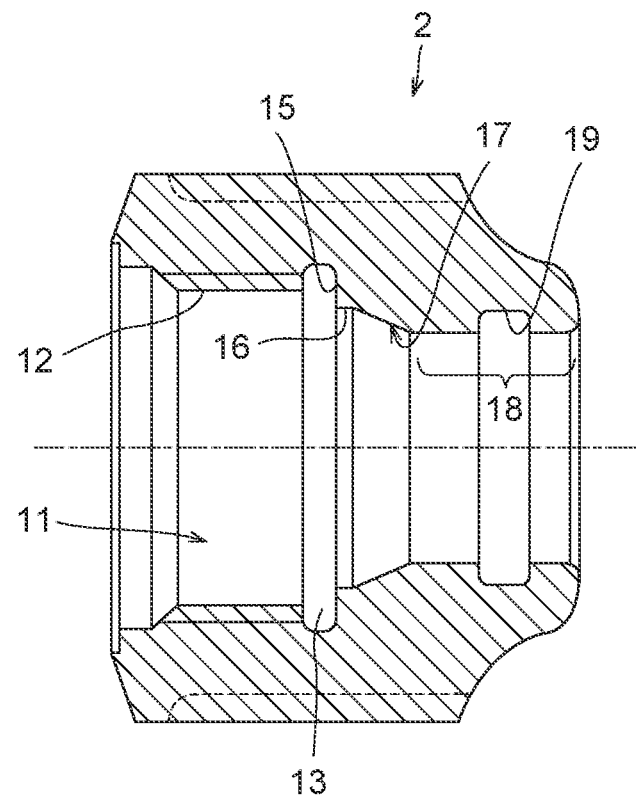
(B)
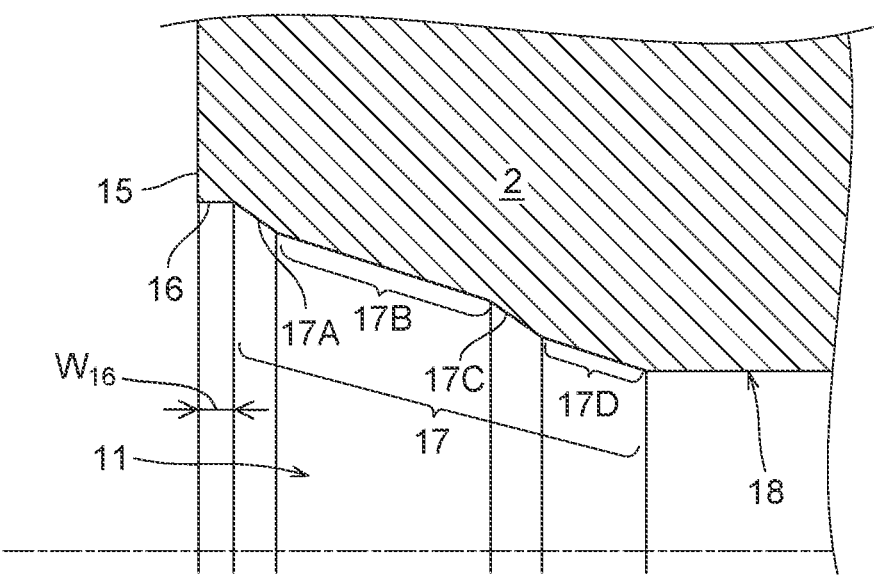

JOINT PIPE

TECHNICAL FIELD

The present invention relates to a pipe joint.

BACKGROUND ART

A flare joint is widely known as a kind of pipe joint. Generally, as shown in FIG. 49, such a flare joint is configured in such a manner that a flared part f is provided at an end portion of a pipe p by plastic forming using a specific jig, the flared part f is caused to abut on a tapered part a of a flare joint body h, is tightened with a cap nut n, and is caught under pressure between a tapered surface t of the cap nut n and the tapered part a of the flare joint body h, thereby ensuring hermeticity using mutual pressure contact between the metallic surfaces (see patent document 1, for example).

Regarding the pipe joint shown in FIG. 49, however, the flared part f is required to be provided to the end portion of the connection target pipe p using a dedicated tool at a worksite. This causes poor working efficiency and also causes quality non-uniformity. Furthermore, a crack may occur easily at a small-diameter edge fi of the flared part f of the pipe p. Another problem is also caused that the thickness of the pipe p is reduced during tightening of the cap nut n, resulting in a high likelihood of reduction in hermeticity or loosening of the cap nut n.

In response to this, a pipe joint allowing connection of the pipe p without the flared part f shown in FIG. 49 has once been suggested by the present applicant, etc.

Specifically, a pipe joint having a configuration such as that shown in FIG. 50 has been suggested (see patent document 2). In the pipe joint illustrated in FIG. 50 (in patent document 2), a cap nut 54 is threadedly attached to a flare joint body 51 with a male screw part 52 and a tapered part 53, and a stop ring 56 is fitted and retained in a housing space part 55 inside the cap nut 54.

The stop ring 56 includes a sealing concave groove 57 in which an O-ring 58 is fitted. The O-ring 58 is to exert hermetic action with a pipe P to be inserted. In particular, the stop ring 56 includes a pressure-contacting slope surface 59 contacting the tapered part 53 of the joint body 51 under pressure. The stop ring 56 has a tip provided with a cylindrical thin part 60 extending with an equal diameter, and the cylindrical thin part 60 has an extreme tip provided with a pawl 61 having a triangular section for biting into a pipe outer peripheral surface.

The pawl 61 is configured to bite into the outer peripheral surface of the pipe P in response to threaded movement of the cap nut 54 (see patent document 2).

PRIOR ART

Patent Document

Patent Document 1: Japanese Patent Application Publication No. 200542858
Patent Document 2: Japanese Patent Publication No. 5091191

SUMMARY OF INVENTION

Problem to be Solved by the Invention

In making the pipe joint shown in FIG. 50 (in patent document 2) actually available in the market as a coolant pipe, however, three issues described below have been found to be unsettled or the presence of technical insufficiency has been found.

(i) As the cap nut 54 threadedly moves forward, the stop ring 56 is caused to rotate together to cause relative slip between the tapered part 53 and the pressure-contacting slope surface 59, thereby causing metallic pressure-contacting sealing therebetween. To avoid this, "preliminary working" is required by which the pawl 61 is caused to bite into the outer peripheral surface of the pipe P in advance using a specific jig.

Such "preliminary working" seriously reduces working efficiency at a pipe connection site.

(ii) The pipe P in an actual case has a thickness substantially equal to that of the cylindrical thin part 60, and in some cases, this thickness may be about one-third of a thickness Tp shown in FIG. 50. This prevents even the pawl 61 having a triangular section from biting into the surface of the pipe P made of Cu and only results in plastic deformation of the pipe P occurring locally in an inner diameter direction. In this case, resistance to pipe extraction is low.

(iii) As described above in the paragraph (ii), if the pawl 61 does not bite into the pipe P and if external force acts on the pipe P to rotate the pipe P about the axis thereof after pipework, the pipe P is caused to rotate easily. This breaks metal sealing performance between the pawl 61 and the pipe outer peripheral surface. In this case, omission of the O-ring 58 becomes impossible.

Means for Solving the Problems

According to the present invention, a pipe joint comprises: a flare joint body including a male screw part and a slope surface with reduced-diameter tip; a cap nut including a female screw part threadedly attached to the male screw part and provided at a base end of a hole part, and a housing space part with a constant diameter section, a stepped section, and a tapered section with reduced-diameter tip provided at an intermediate area of the hole part; and a stop ring fitted in the housing space part, including a base-end pressure-contacting slope surface contacting the slope surface with reduced-diameter tip under pressure, and having a tip provided with a plastically-deformable and substantially cylindrical thin part and a pipe extraction preventing tooth part formed at a tip head of the substantially cylindrical thin part, wherein the tooth part includes a back tooth and a front tooth arranged at a tiny interval, the back tooth has a trapezoidal or substantially trapezoidal sectional shape with a linear first tip side as an upper side, and the front tooth has a trapezoidal or substantially trapezoidal sectional shape with a linear second tip side as an upper side, and as the cap nut threadedly moves forward, the first tip side of the back tooth and the second tip side of the front tooth of the stop ring come into a state of tightly contacting an outer peripheral surface of a straight tip part of a connection target pipe under pressure to generate pipe extraction resistance.

A sealing member is omitted from an inner peripheral surface and an outer peripheral surface of the stop ring by a sealing function exerted by the back tooth and the front tooth of the tooth part while the back tooth and the front tooth are in the state of tightly contacting the outer peripheral surface under pressure in response to the threaded movement of the cap nut.

At the hole part of the cap nut, the tapered section with reduced-diameter tip is defined by a base-end steep slope tapered part and a tip gentle slope tapered part.

While the back tooth and the front tooth are in the state of tightly contacting the outer peripheral surface of the pipe under pressure, the pipe extraction resistance is distributed equally to the back tooth and the front tooth.

While the stop ring is in a free state, the first tip side of the back tooth and the second tip side of the front tooth are arranged parallel to each other in such a manner that the first tip side is placed radially inwardly from the second tip side, and a slope angle at a tip of the tapered section with reduced-diameter tip, and the shape and dimension of the tip head are set in such a manner that, in the tightly pressure-contacting state, the second tip side projects further in a radially inward direction than the first tip side or the second tip side and the first tip side are at the same position as viewed in a radial direction.

The substantially cylindrical thin part with a tip provided with the back tooth and the front tooth has a conical cylindrical shape increased in diameter toward the tip.

A small projection for preventing the substantially cylindrical thin part from being increased in diameter and deformed excessively in a pressure-receiving state is provided at an outer peripheral surface of the substantially cylindrical thin part, and the small projection is configured to abut on an inner surface of the hole part of the cap nut.

The stop ring includes an annular small projecting strip provided at an inner peripheral edge of the base-end pressure-contacting slope surface, to be hooked from an inner diameter side on an annular tip edge part defined by a tip of the slope surface with reduced-diameter tip of the flare joint body and a joint body hole part, and configured to prevent a base end portion of the stop ring from being excessively deformed radially outwardly.

At least a back portion of a pipe insertion hole part of the stop ring is formed into a tapered shape with diameter reduced backward and is configured to cause the straight tip part to contact an inner peripheral surface of the pipe insertion hole part under pressure in a pipe insertion finished state.

According to the present invention, a pipe joint comprises a joint body that itself includes an extraction preventing tooth part as an integral part that comes into a state of tightly contacting an outer peripheral surface of a connection target pipe under pressure to generate pipe extraction resistance in response to threaded movement of a cap nut toward the joint body.

According to the present invention, a pipe joint comprises a joint body that itself includes an extraction preventing tooth part as an integral part that comes into a state of tightly contacting an outer peripheral surface of a connection target pipe under pressure to generate pipe extraction resistance in response to threaded movement of a cap nut toward the joint body, wherein the extraction preventing tooth part is formed at a tip of a substantially cylindrical thin part of a projecting shape provided at a tip of the joint body, the extraction preventing tooth part includes a back tooth and a front tooth arranged at a tiny interval, the back tooth has a trapezoidal or substantially trapezoidal sectional shape with a linear first tip side as an upper side, the front tooth has a trapezoidal or substantially trapezoidal sectional shape with a linear second tip side as an upper side, and as the cap nut threadedly moves forward, the first tip side of the back tooth and the second tip side of the front tooth of the joint body come into a state of tightly contacting the outer peripheral surface of the connection target pipe under pressure to generate pipe extraction resistance.

The cap nut includes: a female screw part threadedly attached to a male screw part of the joint body and provided at a base end of a hole part; and a stepped section and a tapered section with reduced-diameter tip provided at an intermediate area of the hole part, and the tapered section with reduced-diameter tip is defined by a base-end steep slope tapered part and a tip gentle slope tapered part.

While the back tooth and the front tooth are in the state of tightly contacting the outer peripheral surface of the pipe under pressure, the pipe extraction resistance is distributed equally to the back tooth and the front tooth.

While the substantially cylindrical thin part is in a free state, the first tip side of the back tooth and the second tip side of the front tooth are arranged parallel to each other in such a manner that the first tip side is placed radially inwardly from the second tip side, and a slope angle at a tip of the tapered section with reduced-diameter tip, and the shape and dimension of the tip head are set in such a manner that, in the tightly pressure-contacting state, the second tip side projects further in a radially inward direction than the first tip side or the second tip side and the first tip side are at the same position as viewed in a radial direction.

The substantially cylindrical thin part with a tip provided with the back tooth and the front tooth has a conical cylindrical shape increased in diameter toward the tip.

A small projection for preventing the substantially cylindrical thin part from being increased in diameter and deformed excessively in a pressure-receiving state is provided at an outer peripheral surface of the substantially cylindrical thin part, and the small projection is configured to abut on an inner surface of the hole part of the cap nut.

A back portion of a pipe insertion hole part of the joint body is formed into a tapered shape with diameter reduced backward and is configured to cause the pipe outer peripheral surface to contact an inner peripheral surface of the pipe insertion hole part under pressure in a pipe insertion finished state.

According to the present invention, a pipe joint comprises: a flare joint body including a male screw part and a slope surface with reduced-diameter tip; a cap nut including a female screw part threadedly attached to the male screw part and provided at a base end of a hole part, and a housing space part with a constant diameter section, a stepped section, and a tapered section with reduced-diameter tip provided at an intermediate area of the hole part; and a stop ring fitted in the housing space part, including a base-end pressure-contacting slope surface contacting the slope surface with reduced-diameter tip under pressure, and having a tip provided with a plastically-deformable and substantially cylindrical thin part and a pipe extraction preventing tooth part formed at a tip head of the substantially cylindrical thin part, wherein the tooth part includes a back tooth and a front tooth arranged at a tiny interval, as the cap nut threadedly moves forward, a first tip side of the back tooth and a second tip side of the front tooth of the stop ring come into a state of tightly contacting an outer peripheral surface of a straight tip part of a connection target pipe under pressure to generate pipe extraction resistance, the stop ring includes a base inner diameter part to which the pipe is to be inserted and a base outer diameter part fitted in housing space part of the cap nut, and the thickness dimension of a base short cylindrical part defined by the base inner diameter part and the base outer diameter part called $T_{50}$ and an average thickness dimension of the substantially cylindrical thin part 35 called $T_{35}$ are set in such a manner as to establish the following formula: $0.40 \cdot T_{50} \leq T_{35} \leq 0.75 \cdot T_{50}$.

According to the present invention, a pipe joint comprises: a flare joint body including a male screw part and a slope surface with reduced-diameter tip, a cap nut including a female screw part threadedly attached to the male screw part and provided at a base end of a hole part, and a housing space part with a constant diameter section, a stepped section, and a tapered section with reduced-diameter tip provided at an intermediate area of the hole part; and a stop ring fitted in the housing space part, including a base-end pressure-contacting slope surface contacting the slope surface with reduced-diameter tip under pressure, and having a tip provided with a plastically-deformable and substantially cylindrical thin part and a pipe extraction preventing tooth part formed at a tip head of the substantially cylindrical thin part, wherein the tooth part includes a back tooth and a front tooth arranged at a tiny interval, the back tooth has a substantially trapezoidal sectional shape and the first tip side composed of an upper side of the substantially trapezoidal shape includes a short posterior half side part and a tall anterior half side part defined across a curved intermediate level difference part, and the front tooth has a substantially trapezoidal sectional shape and the second tip side composed of an upper side of the substantially trapezoidal shape has a polygonal line shape with a short posterior half side part and a tall anterior half side part defined across a slope surface sloping downward and backward.

As the cap nut threadedly moves forward, the first tip side of the back tooth and the second tip side of the front tooth of the stop ring come into a state of tightly contacting an outer peripheral surface of a straight tip part of a connection target pipe under pressure to generate pipe extraction resistance, and in the tightly pressure-contacting state, the first tip side of the back tooth and the second tip side of the front tooth contact the outer peripheral surface of the pipe under pressure in such a manner as to bite into the outer peripheral surface, thereby exerting a double sealing function.

As the cap nut threadedly moves forward, the first tip side of the back tooth and the second tip side of the front tooth of the stop ring come into a state of tightly contacting an outer peripheral surface of a straight tip part of the connection target pipe under pressure to cause the first tip side of the back tooth and the second tip side of the front tooth to contact the outer peripheral surface of the pipe under pressure in such a manner as to bite into the outer peripheral surface, thereby exerting a double sealing function, and a sealing member is omitted from an inner peripheral surface and an outer peripheral surface of the stop ring by the exertion of the double sealing function.

Even if the pipe rotates about its axis in the tightly pressure-contacting state, the anterior half side part of the first tip side of the back tooth bites into the outer peripheral surface of the pipe in such a manner as to form a closed annular small recessed peripheral groove to prevent spiral rotation of the pipe, and the curved intermediate level difference part of the first tip side contacts a back side surface of the small recessed peripheral groove under pressure to exert a sealing function.

While the back tooth and the front tooth are in the state of tightly contacting the outer peripheral surface of the pipe under pressure, the front tooth takes on pipe extraction resistance greater than pipe extraction resistance taken on by the back tooth, and the front tooth is responsible for a pipe extraction preventing function of preventing the pipe from coming off in response to receipt of external force in a bending direction using the second tip side of the front tooth tightly contacting the outer peripheral surface under pressure in the polygonal line shape.

In the tightly pressure-contacting state, the back tooth and the front tooth are configured to bite into the outer peripheral surface of the pipe to the same depth in such a manner that the first tip side and the second tip side are at an equal distance from an axis of the pipe.

At the hole part of the cap nut, the tapered section with reduced-diameter tip is defined by a base-end steep slope tapered part, an intermediate gentle slope tapered part, an intermediate steep slope tapered part, and a tip gentle slope tapered part.

At the hole part of the cap nut, the tapered section with reduced-diameter tip is defined by a base-end steep slope tapered part, an intermediate gentle slope tapered part, an intermediate steep slope tapered part, and a tip gentle slope tapered part, the tip head of the substantially cylindrical thin part includes a first convex part composed of an extreme tip outer peripheral corner and a second convex part of a low triangular bulging shape formed at an axial direction position corresponding to an axial direction position of the back tooth and formed at an outer periphery of the tip head, and a first squeezing step and a subsequent second squeezing step are performed. In the first squeezing step, the tip head enters the tapered section with reduced-diameter tip while slidably contacting the tapered section in response to the threaded movement of the cap nut to press the second convex part radially inwardly with the base-end steep slope tapered part, thereby pressing the back tooth against the outer peripheral surface of the pipe. In the second squeezing step, the first convex part is pressed radially inwardly with the intermediate steep slope tapered part, thereby pressing the front tooth against the outer peripheral surface of the pipe.

In a tightening finished state of the cap nut, a stepped part composed of a tip surface of the base short cylindrical part of the stop ring and the stepped section of the hole part of the cap nut abut on each other to allow a worker to detect increase in resistance to the threaded movement of the cap nut.

A support incore is provided that supports the tip part of the pipe from an inner peripheral side while the back tooth and the front tooth of the stop ring are in the state of tightly contacting the outer peripheral surface of the pipe under pressure.

According to the present invention, a pipe joint comprises a joint body that itself includes an extraction preventing tooth part as an integral part that comes into a state of tightly contacting an outer peripheral surface of a connection target pipe under pressure to generate pipe extraction resistance in response to threaded movement of a cap nut toward a male screw part of the joint body, wherein the extraction preventing tooth part is provided at a tip of a substantially cylindrical thin part projecting continuously from a tip surface of a connection tube with an outer periphery provided with the male screw part, the tooth part includes a back tooth and a front tooth arranged at a tiny interval, and an average thickness dimension of the substantially cylindrical thin part called $T_{35}$ and an average thickness dimension of the connection tube called $T_7$ are set in such a manner as to establish the following formula:

$$0.40 \cdot T_7 \leq T_{35} \leq 0.75 \cdot T_7.$$

According to the present invention, a pipe joint comprises a joint body that itself includes an extraction preventing tooth part as an integral part that comes into a state of tightly contacting an outer peripheral surface of a connection target pipe under pressure to generate pipe extraction resistance in response to threaded movement of a cap nut toward a male screw part of the joint body, wherein the extraction preventing tooth part is provided at a tip of a substantially cylindrical thin part projecting continuously from a tip surface of a connection tube with an outer periphery provided with the male screw part, the tooth part includes a back tooth and a front tooth arranged at a tiny interval, the back tooth has a substantially trapezoidal sectional shape and the first tip side composed of an upper side of the substantially trapezoidal shape includes a short posterior half side part and a tall anterior half side part defined across a curved intermediate level difference part, and the front tooth has a substantially trapezoidal sectional shape and the second tip side composed of an upper side of the substantially trapezoidal shape has a polygonal line shape with a short posterior half side part and a tall anterior half side part defined across a slope surface sloping downward and backward.

As the cap nut threadedly moves forward, the first tip side of the back tooth and the second tip side of the front tooth of the joint body come into a state of tightly contacting an outer peripheral surface of a straight tip part of the connection target pipe under pressure to generate pipe extraction resistance, and in the tightly pressure-contacting state, the first tip side of the back tooth and the second tip side of the front tooth contact the outer peripheral surface of the pipe under pressure in such a manner as to bite into the outer peripheral surface, thereby exerting a double sealing function.

As the cap nut threadedly moves forward, the first tip side of the back tooth and the second tip side of the front tooth of the joint body come into a state of tightly contacting an outer peripheral surface of a straight tip part of the connection target pipe under pressure to cause the first tip side of the back tooth and the second tip side of the front tooth to contact the outer peripheral surface of the pipe under pressure in such a manner as to bite into the outer peripheral surface, thereby exerting a double sealing function, and a sealing member is omitted from an inner peripheral surface and an outer peripheral surface of the joint body by the exertion of the double sealing function.

Even if the pipe rotates about its axis in the tightly pressure-contacting state, the anterior half side part of the first tip side of the back tooth bites into the outer peripheral surface of the pipe in such a manner as to form a closed annular small recessed peripheral groove to prevent spiral rotation of the pipe, and the curved intermediate level difference part of the first tip side contacts a back side surface of the small recessed peripheral groove under pressure to exert a sealing function.

While the back tooth and the front tooth are in the state of tightly contacting the outer peripheral surface of the pipe under pressure, the front tooth takes on pipe extraction resistance greater than pipe extraction resistance taken on by the back tooth, and the front tooth is responsible for a pipe extraction preventing function of preventing the pipe from coming off in response to receipt of external force in a bending direction using the second tip side of the front tooth tightly contacting the outer peripheral surface under pressure in the polygonal line shape.

In the tightly pressure-contacting state, the back tooth and the front tooth are configured to bite into the outer peripheral surface of the pipe to the same depth in such a manner that the first tip side and the second tip side are at an equal distance from an axis of the pipe.

At the hole part of the cap nut, the tapered section with reduced-diameter tip is defined by a base-end steep slope tapered part, an intermediate gentle slope tapered part, an intermediate steep slope tapered part, and a tip gentle slope tapered part.

At the hole part of the cap nut, the tapered section with reduced-diameter tip is defined by a base-end steep slope tapered part, an intermediate gentle slope tapered part, an intermediate steep slope tapered part, and a tip gentle slope tapered part, the tip head of the substantially cylindrical thin part includes a first convex part composed of an extreme tip outer peripheral corner and a second convex part of a low triangular bulging shape formed at an axial direction position corresponding to an axial direction position of the back tooth and formed at an outer periphery of the tip head, and a first squeezing step and a subsequent second squeezing step are performed. In the first squeezing step, the tip head enters the tapered section with reduced-diameter tip while slidably contacting the tapered section in response to the threaded movement of the cap nut to press the second convex part radially inwardly with the base-end steep slope tapered part, thereby pressing the back tooth against the outer peripheral surface of the pipe.

In the second squeezing step, the first convex part is pressed radially inwardly with the intermediate steep slope tapered part, thereby pressing the front tooth against the outer peripheral surface of the pipe.

In a tightening finished state of the cap nut, the tip surface of the connection tube of the cap nut of the joint body and the stepped section of the hole part of the cap nut abut on each other to allow a worker to detect increase in resistance to the threaded movement of the cap nut.

A support incore is provided that supports a tip part of the pipe from an inner peripheral side while the back tooth and the front tooth of the joint body are in the state of tightly contacting the outer peripheral surface of the pipe under pressure.

Advantageous Effects of Invention

According to the present invention, two teeth including the back tooth and the front tooth are in a state of tightly contacting the pipe outer peripheral surface under pressure to generate large resistance to pipe extraction, thereby exerting excellent hermetic performance (sealing performance) on a coolant, for example. Furthermore, the conventional "preliminary working" described as the problem (i) becomes omissible to allow pipe connection work to be done readily and efficiently. Additionally, while the back tooth and the front tooth exert their respective functions (operations) to complement each other, they comprehensively exert excellent hermetic performance (sealing performance) and extraction resistance in a situation where bending force acts on a pipe, making it possible to reliably prevent an accident of pipe extraction.

BRIEF DESCRIPTION OF DRAWINGS

FIG. 3 is a sectional view showing an example of a cap nut including an entire sectional view (A) and a principal part enlarged sectional view (B).

FIG. 17 is a sectional view of a cap nut including an entire sectional view (A) and a principal part enlarged sectional view (B).

FIG. 21 is a sectional view of a cap nut including an entire sectional view (A) and a principal part enlarged sectional view (B).

FIG. 22 is a sectional view of a stop ring including a sectional view (A) according to one example and a sectional view showing only the upper half of the stop ring according to another example.

FIG. 37 is a sectional view showing an example of a cap nut including an entire sectional view (A) and a principal part enlarged sectional view (B).

EMBODIMENTS OF THE INVENTION

Figure 1:
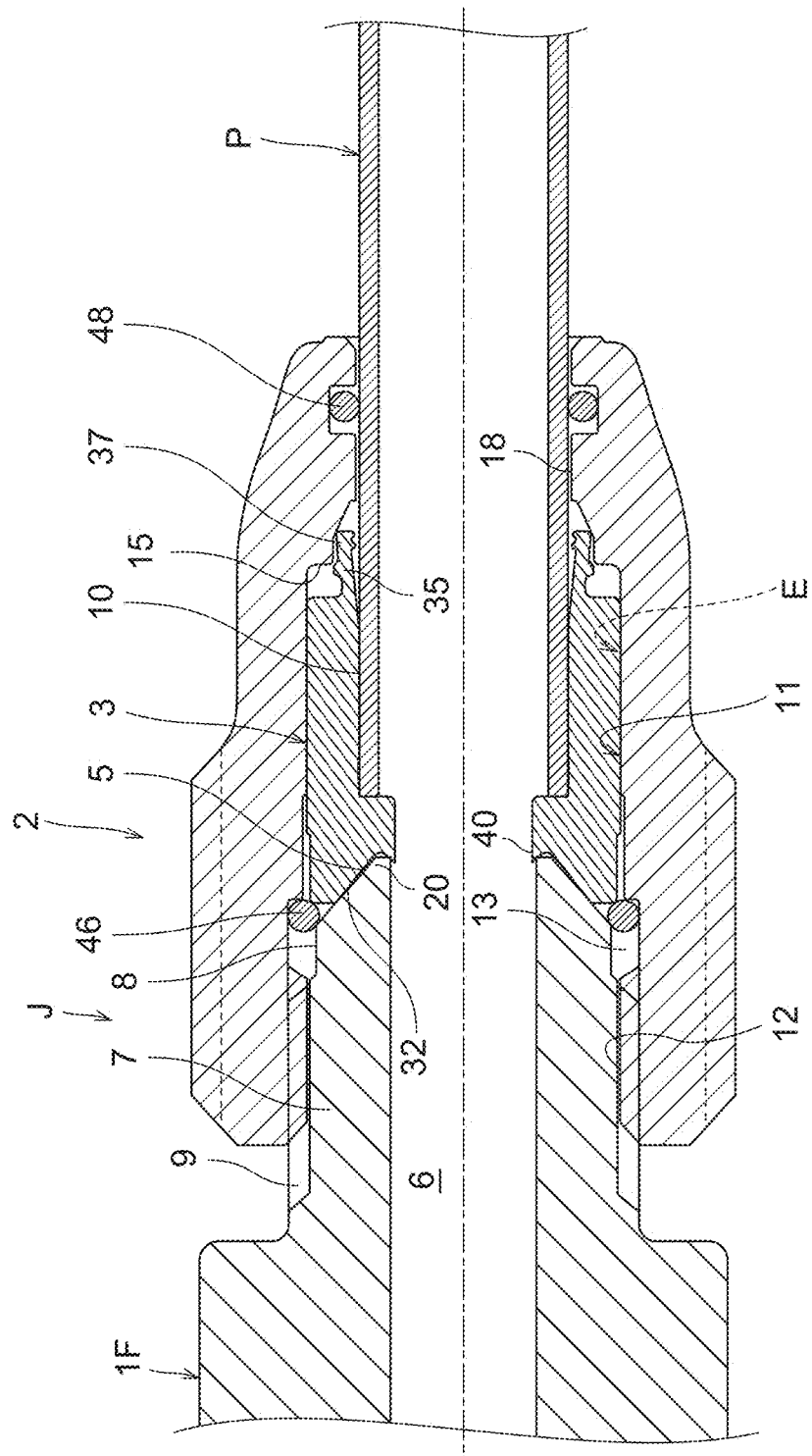
FIG. 1 is a sectional view showing a first embodiment of the present invention and showing a state in which a pipe is being connected.

The present invention will be described below in detail on the basis of embodiments shown in the drawings.

In a first embodiment of the present invention shown in FIGS. 1 to 5, a pipe joint J according to the present invention includes a flare joint body 1F, a cap nut 2, and a stop ring 3. A connection target pipe P has a tip provided with a straight tip part 10 (from which the conventional flaring is completely omitted).

Figure 49:
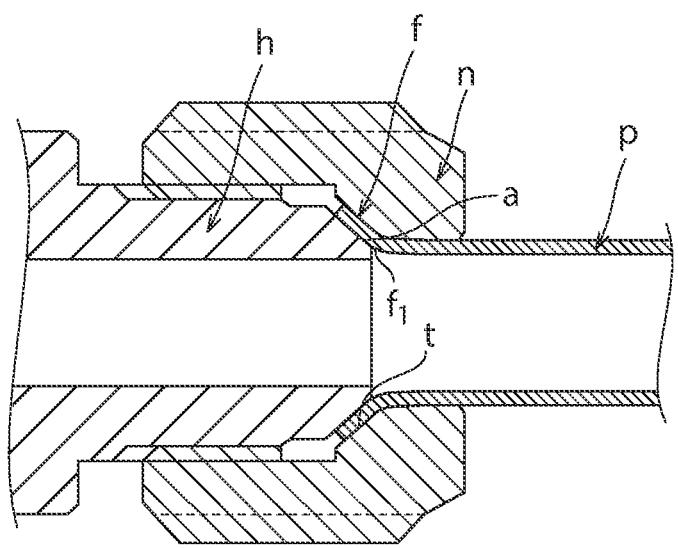
FIG. 49 is a sectional view showing a conventional example.

The flare joint body 1F is of a type having been used for a long time, is similar to the flare joint body h shown in FIG. 49, and includes a slope surface 5 with reduced-diameter tip. Specifically, the slope surface 5 with reduced-diameter tip is formed at a tip of a connection tube 7 where a flow path hole 6 passes through.

The entire shape of the flare joint body 1F is determined freely and may be a straight shape, a T-shape, a Y-shape, or an X shape, for example. The shape of a different connection end part beyond the range of FIGS. 1 and 2 may be determined freely and may have the connection tube 7 shown in FIGS. 1 and 2, or may have a taper male screw, a parallel female screw, or a tubular part for welding, for example.

Figure 2:
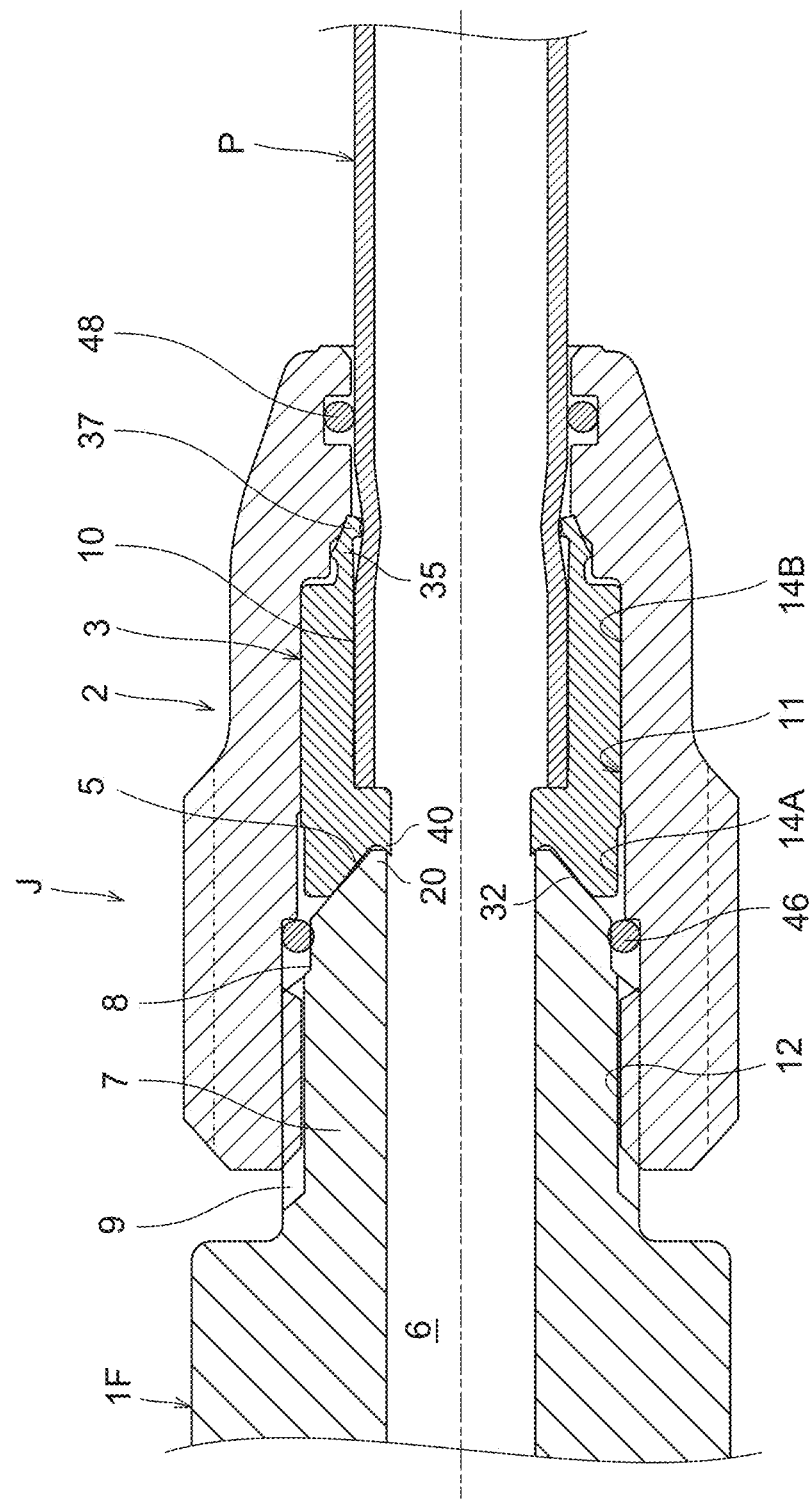
FIG. 2 is a sectional view showing a pipe connection finished state.

In short, at least one connection tube 7 is provided as shown in FIGS. 1 and 2, and the connection tube 7 includes a male screw part 9 as a parallel screw provided continuously across a short straight part 8 with a base edge of the slope surface 5 in the illustrations of FIGS. 1 and 2. The flare joint body 1 is made of a material that is preferably yellow copper (brass).

The cap nut 2 includes a hole part 11 provided in an axial direction (as shown in FIGS. 1 to 3). The hole part 11 has a base end provided with a female screw part 12 to which the male screw part 9 is threadedly attached. The hole part 11 includes a sealing groove 13 having a small width dimension $W_{13}$ in the axial direction, a first constant diameter section (first straight section) 14A, a second constant diameter section (second straight section) 14B, a stepped section 15, a short straight section 16 having a small width dimension $W_{16}$, a tapered section 17 with reduced-diameter tip, and a straight section 18 (having an inner diameter dimension slightly greater than the outer diameter of the connection-target pipe P) that are formed sequentially from the female screw part 12 toward the tip.

The straight section 18 is provided with a concave groove 19 to which a seal 48 such as an O-ring is fitted. A seal 46 such as an additional O-ring is fitted to the sealing groove 13. The first constant diameter section 14A is set to have a slightly greater inner diameter dimension than the second constant diameter section 14B.

The constant diameter sections 14A and 14B, the stepped section 15, the short straight section 16, and the tapered section 17 with reduced-diameter tip of the hole part 11 define a housing space part E for housing the stop ring 3. The material of the cap nut 2 is yellow copper (brass) or aluminum.

As shown in FIG. 3(B), the tapered section 17 with reduced-diameter tip is defined at the hole part 11 of the cap nut 2 by a base-end steep slope tapered part 17A, a tip gentle slope tapered part 17B, etc. Preferably, an innermost site steep slope tapered part 17C is added.

As shown in FIG. 3(B), a corner at the stepped section 15 and the short straight section 16 is formed into a curved chamfer r.

As described above by referring to FIG. 3, a constant diameter section (straight section) 14 is defined by the first and second constant diameter sections 14A and 14B having inner diameter dimensions slightly different from each other. Alternatively, in response to need, the first constant diameter section 14A and the second constant diameter section 14B may have inner diameters completely equal to each other.

The stop ring 3 will be described next. As shown in FIGS. 4 and 1 to 3, the stop ring 3 is fitted in the housing space part E of the cap nut 2. The stop ring 3 has a substantially short cylindrical shape, and has an outer peripheral surface provided with a base outer diameter part 24 extending from a base end to an intermediate range and slidably fitted to the straight section 14 of the hole part 11 of the cap nut 2, and a substantially cylindrical thin part 35 formed continuously at a tip side across a stepped part 25, having a small diameter, and having a tapered shape increased gently in diameter toward the tip.

An inner peripheral surface 27 includes a base inner diameter part 28 provided at an intermediate area in the axial direction, and the pipe P is inserted into the base inner diameter part 28 (as shown in FIG. 1).

The base inner diameter part 28 has a base end where an inner bulge 29 with a small diameter inner peripheral surface part 29A is provided continuously. The inner bulge 29 has one end surface (a surface perpendicular to the axis) functioning as a stepped surface 30.

A sign 32 is a curved (convex) pressure-contacting slope surface formed at a base end of the stop ring 3. As shown in FIGS. 1 and 2, the pressure-contacting slope surface 32 contacts the slope surface 5 with reduced-diameter tip of the joint body 1 under pressure to exert hermetic action by means of metal touch.

An annular small projecting strip 40 is provided at a point of intersection between the inner peripheral edge of the curved pressure-contacting slope surface 32 and the small diameter inner peripheral surface part 29A.

This will be described more specifically. As shown in FIGS. 1 and 2, the stop ring 3 includes the annular small projecting strip 40 to be hooked from an inner diameter side on an annular tip edge part 20 defined by a tip of the slope surface 5 with reduced-diameter tip of the joint body 1 and a joint body hole part 6.

Figure 4:
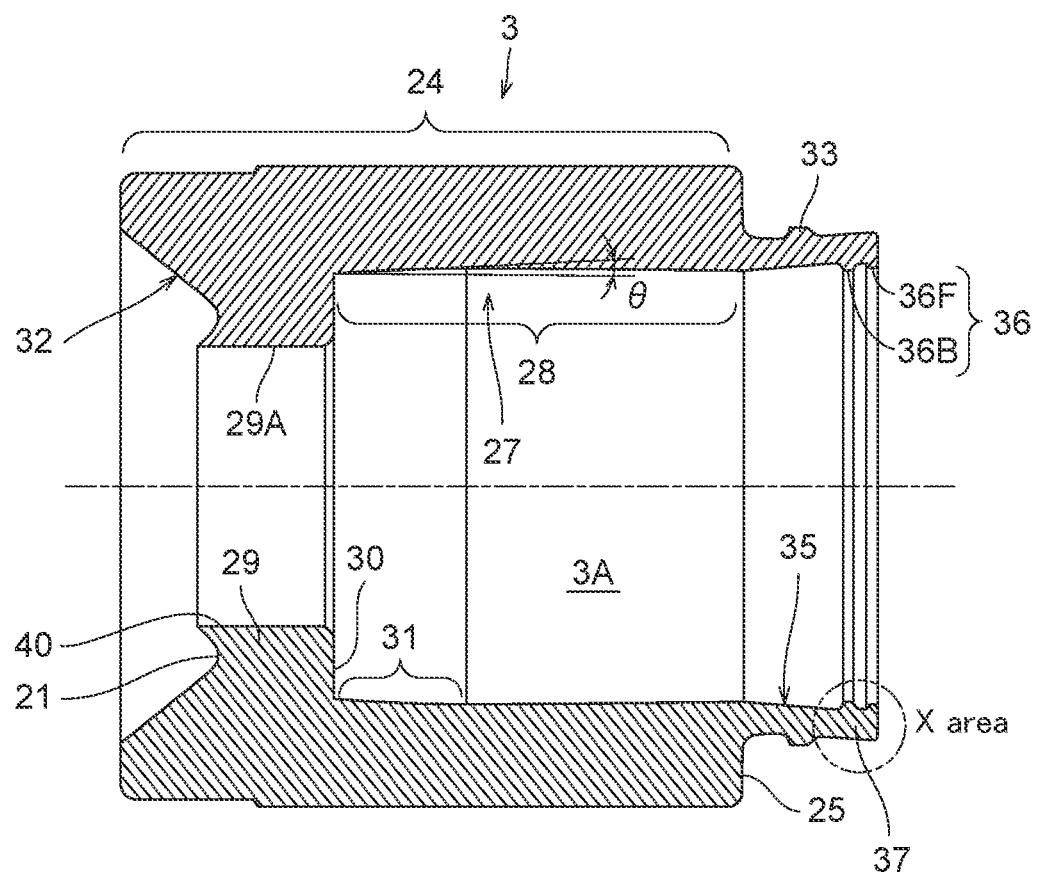
FIG. 4 is a sectional view showing an example of a stop ring.

As clearly seen from FIG. 4, the small projecting strip 40 has an overturned triangular sectional shape. This overturned triangle is defined by a short leg resulting from inverting the inner edge of the curved (convex) pressure-contacting slope surface 32 outward across a small curved recess 21, and by the small diameter inner peripheral surface part 29A.

As descried above, as shown in FIGS. 1 and 2, the annular small projecting strip 40 has a shape hooked from an inner diameter side on the annular tip edge part 20 of the joint body 1. This makes it possible to prevent the base end of the stop ring 3 from excessively deforming radially outwardly.

As shown in FIG. 4, at least a back portion 31 of a pipe insertion hole part 3A of the stop ring 3 is formed into a tapered shape with diameter reduced backward.

Specifically, in FIG. 4, at least the back portion 31 is formed into a tapered shape with an extremely small slope angle θ, which may be equal to or greater than 0.5° and equal to or less than 2°, for example, and is configured in such a manner that the tip part 10 of the pipe P contacts the back portion 31 of the inner peripheral surface 27 of the pipe insertion hole part 3A under pressure in a pipe insertion finished state shown in FIG. 2.

The stop ring 3 includes the plastically-deformable and substantially cylindrical thin part 35 formed integrally at a tip side thereof. The substantially cylindrical thin part 35 includes a tip head 37 provided with a pipe extraction preventing tooth part 36.

Figure 5:
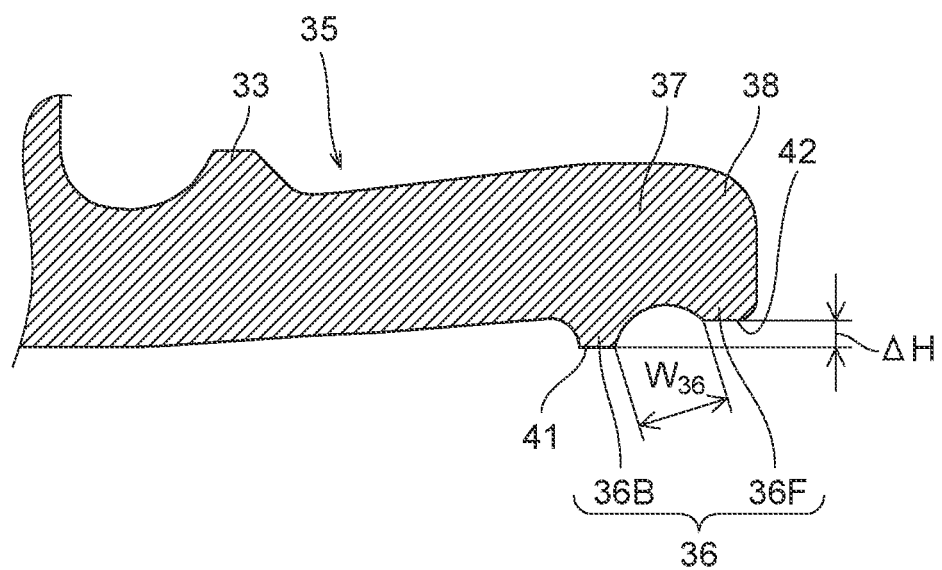
FIG. 5 is a principal part enlarged sectional view of the stop ring.
Figure 6:
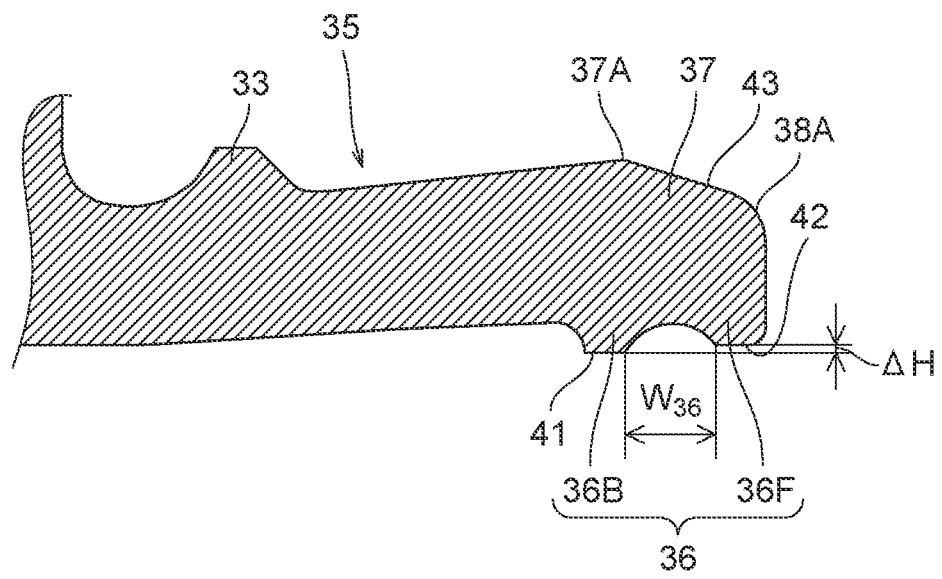
FIG. 6 is a principal part enlarged sectional view of the stop ring showing another example.

As shown in an enlarged sectional view in FIG. 5 or 6, the tooth part 36 includes a back tooth 36B and a front tooth 36F arranged at a tiny interval $W_{36}$.

The substantially cylindrical thin part 35 has a conical cylindrical shape increased in diameter toward the tip (see FIGS. 4, 5, and 6).

The back tooth 36B and the front tooth 36F are names derived from regarding a direction toward the tip (right) in FIGS. 1, 2, and 4 as "frontward."

Figure 7:
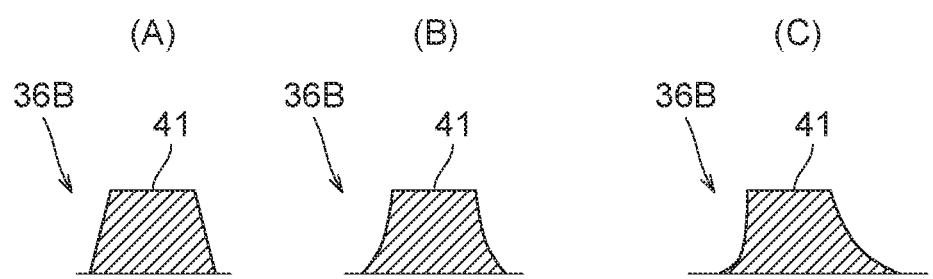
FIG. 7 includes explanatory views illustrating the sectional shape of a back tooth.

As shown in FIGS. 7 and 5, the sectional shape of the back tooth 36B is a trapezoidal or substantially trapezoidal shape with a linear first tip side 41 as an upper side. FIG. 7 can be seen as an enlarged sectional view showing an area X in FIG. 4 in an enlarged manner.

FIG. 7(A) illustrates a case where the sectional shape of the back tooth 36B is a trapezoidal shape. FIG. 7(B) illustrates a substantially trapezoidal shape with right and left legs having recessed curved shapes. FIG. 7(C) illustrates a case where, of the right and left legs of a trapezoid, the back leg is steep and the front leg has a recessed curved shape.

Figure 8:
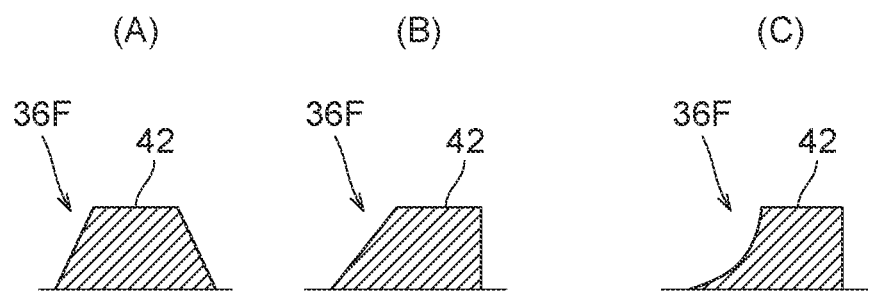
FIG. 8 includes explanatory views illustrating the sectional shape of a front tooth.

As shown in FIGS. 8 and 5, the sectional shape of the front tooth 36F is a trapezoidal or substantially trapezoidal shape with a linear second tip side 42 as an upper side. FIG. 8 can be seen as an enlarged sectional view showing the area X in FIG. 4 in an enlarged manner.

FIG. 8(A) illustrates a case where the sectional shape of the front tooth 36F is a trapezoidal shape. FIG. 8(B) illustrates a trapezoidal shape with a steep front leg. FIG. 8(C) illustrates a case where, of the right and left legs of a trapezoid, the front leg is steep and the back leg has a recessed curved shape.

In each of these cases, each of the back tooth 36B and the front tooth 36F has a sectional shape with a straight upper side, which can be designated as what is called a "table top mounting type."

The substantially cylindrical thin part 35 including the back tooth 36B and the front tooth 36F at the tip has a conical cylindrical shape increased in diameter toward the tip as viewed in its entirety (as already described). The first tip side 41 of the back tooth 36B and the second tip side 42 of the front tooth 36F provided at the tip of the cylindrical part 35 are formed parallel to each other, and in a free state, the first tip side 41 of the back tooth 36B is determined to be located radially inwardly by a tiny dimension ΔH from the second tip side 42 of the front tooth 36F as shown in FIG. 5 (the first tip side 41 and the second tip side 42 are arranged as what are called uneven parallel sides).

As shown in FIG. 6, in some cases, the tiny dimension ΔH is preferably extremely small or zero.

The tip head 37 in FIG. 5 includes an extreme tip radially outward part 38 that is formed into a rounded curved shape. The tip head 37 in FIG. 6 includes a slope surface part 43 with reduced-diameter tip.

As the cap nut 2 threadedly moves forward, the substantially cylindrical thin part 35 in a free state shown in FIG. 6 deforms sequentially as shown in FIGS. 9, 10, 11, 12, 13, and 14 in this order.

Figure 13:
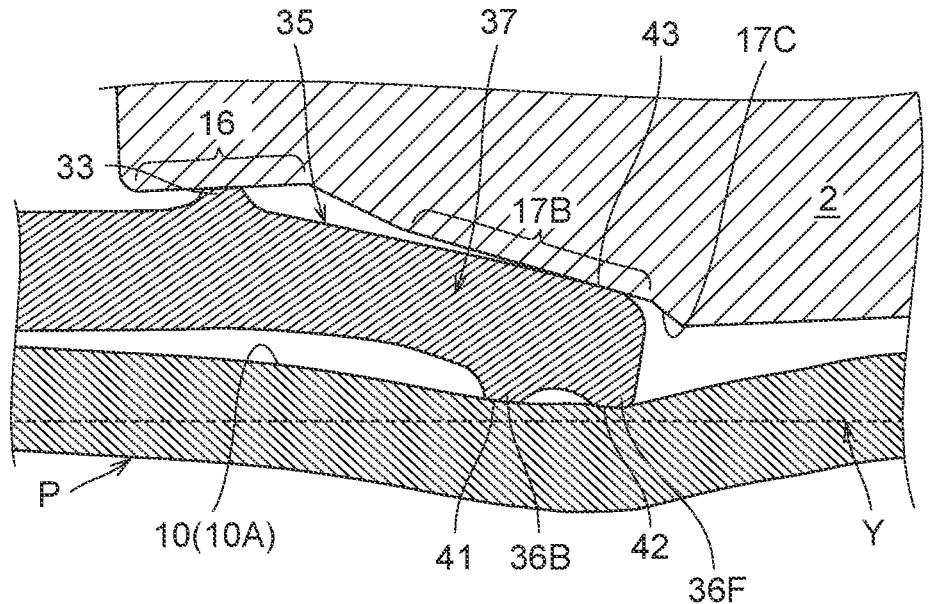
FIG. 13 is a principal part enlarged sectional view showing a connection finished state in which the tip head reaches a final entry position.
Figure 14:
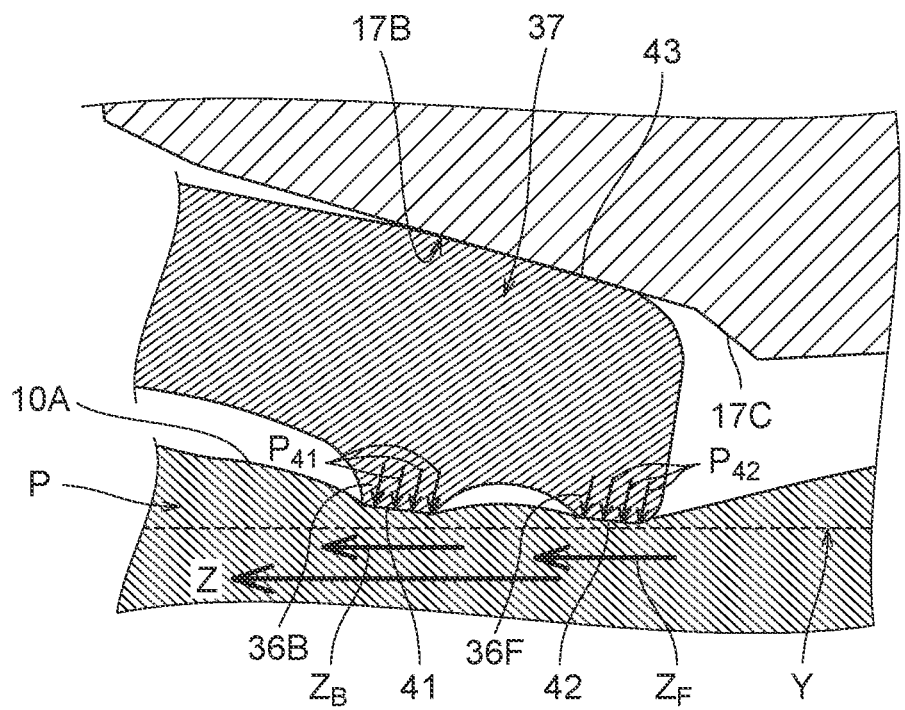
FIG. 14 is a principal part enlarged view of FIG. 13 for explaining operation.

Specifically, the first tip side 41 of the back tooth 36B and the second tip side 42 of the front tooth 36F of the stop ring 3 move in a diameter reducing direction (radially inward direction) relative to an outer peripheral surface 10A of the straight tip part 10 of the connection target pipe P to come into a tightly pressure-contacting state with large pressure contacting surface pressures indicated by arrows $P_{41}$ and arrows $P_{42}$ in a final connection finished state as shown in FIGS. 13 and 14, thereby generating large pipe extraction resistance Z.

Figure 50:
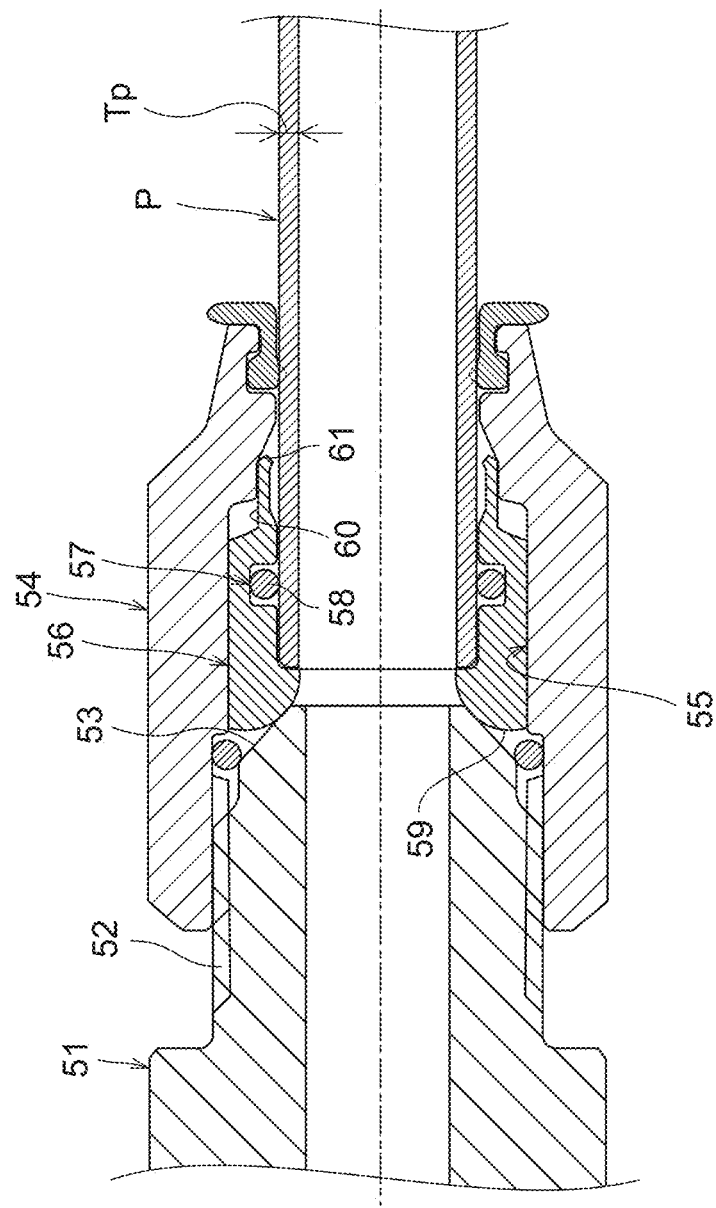
FIG. 50 is a sectional view showing another conventional example.

With the back tooth 36B and the front tooth 36F in the state of tightly contacting the pipe outer peripheral surface 10A under pressure, the tooth part 36 including the back tooth 36B and the front tooth 36F exerts a sufficient hermetic function on a fluid such as a coolant, thereby omitting a sealing member from between the inner peripheral surface of the stop ring 3 and the pipe outer peripheral surface 10A and from between the outer peripheral surface of the stop ring 3 and the inner peripheral surface of the hole part 11 of the cap nut 2 as shown in FIG. 2. Namely, the O-ring 58 in FIG. 50 showing the conventional example is omitted.

Figure 9:
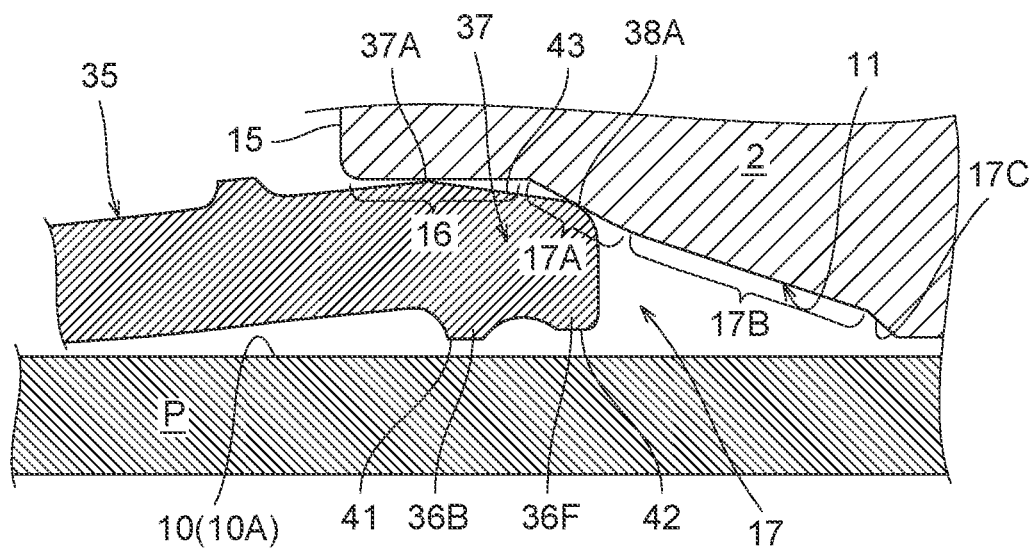
FIG. 9 is a principal part enlarged sectional view showing a state in which a tip head of a substantially cylindrical thin part is adapted to a straight section and a steep slope tapered part of the cap nut.

The tapered section 17 with reduced-diameter tip of the hole part 11 of the cap nut 2 includes the base-end steep slope tapered part 17A (continuing to the short straight section 16) and the tip gentle slope tapered part 17B (as already described). The tip head 37 of the substantially cylindrical thin part 35 shown in FIG. 6 includes an outermost diameter part 37A that is set to have the same diameter or a diameter slightly smaller than the inner diameter dimension of the short straight section 16 in a free state. Furthermore, the presence of the slope surface part 43 allows the entering tip head 37 to easily reach as far as the state shown in FIG. 9. Specifically, an extreme tip curved part 38A of the tip head 37 abuts on the steep slope tapered part 17A (as shown in FIG. 9).

Figure 10:
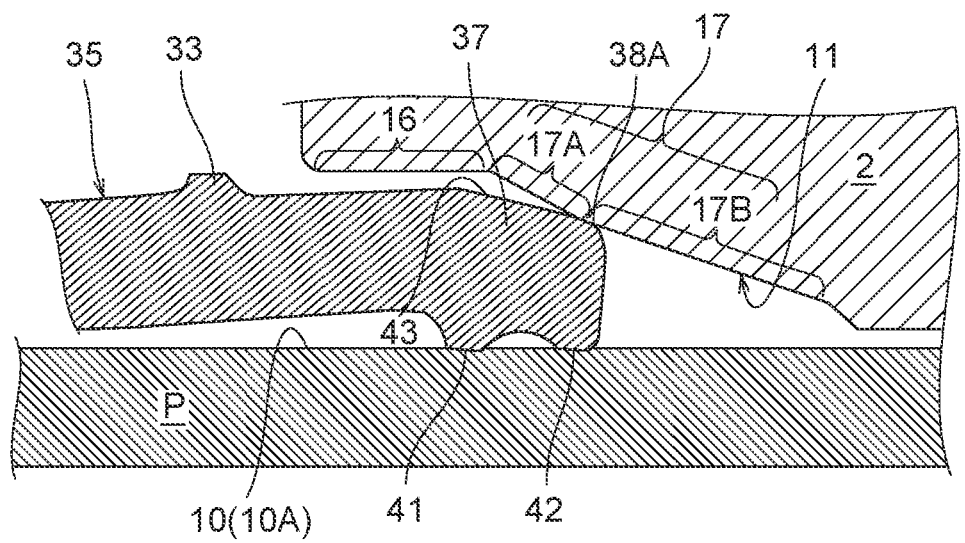
FIG. 10 is a principal part enlarged sectional view showing a state in which the tip head of the substantially cylindrical thin part is adapted to the vicinity of a boundary between the steep slope tapered part and a gentle slope tapered part of the cap nut.

As the cap nut 2 is caused to threadedly move forward continuously, the curved part 38A reaches a boundary between the steep slope tapered part 17A and the gentle slope tapered part 17B (see FIG. 10). At this time, the first tip side 41 of the back tooth 36B and the second tip side 42 of the front tooth 36F start to contact the outer peripheral surface 10A of the pipe P.

Figure 11:
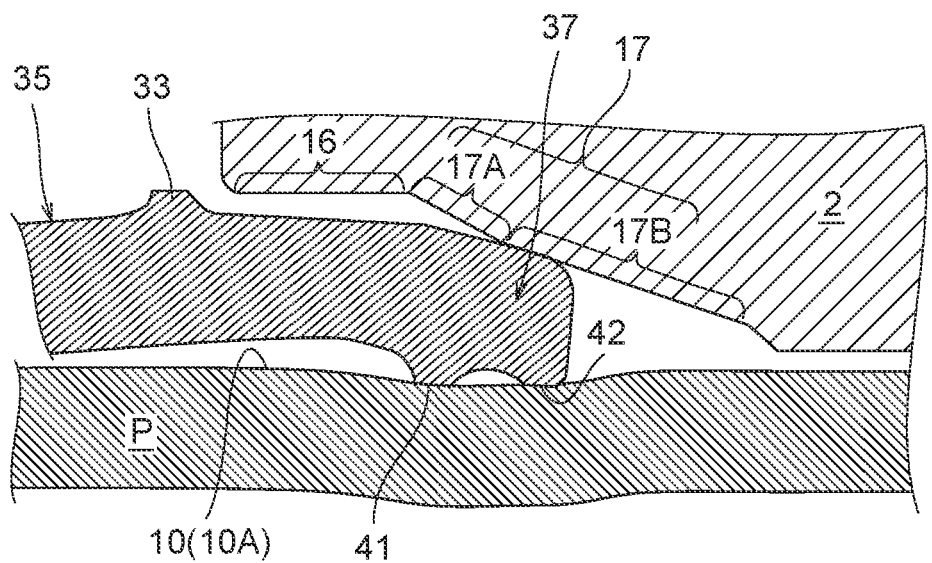
FIG. 11 is a principal part enlarged sectional view of a state in which the entering tip head reaches as far as the gentle slope tapered part of the cap nut.
Figure 12:
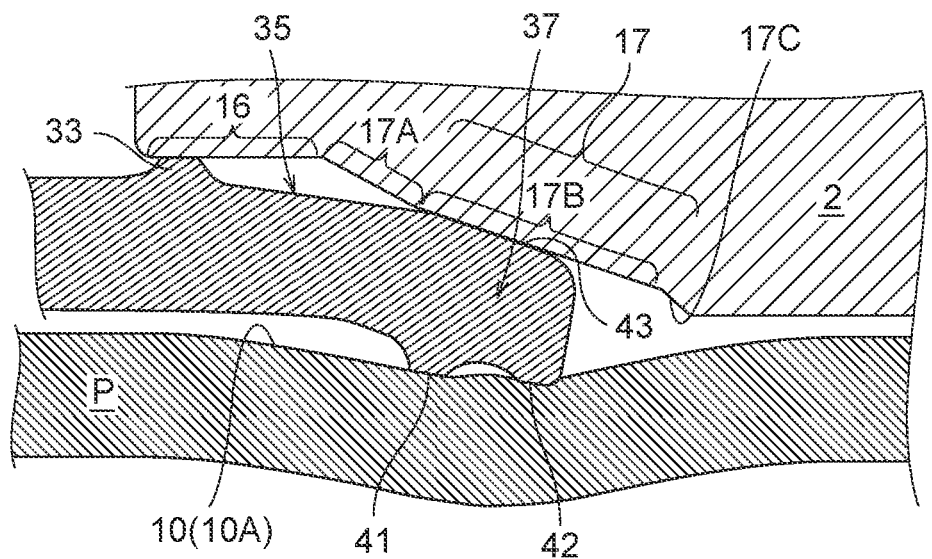
FIG. 12 is a principal part enlarged sectional view of a state in which the entering tip head moves further.

As the cap nut 2 is caused to threadedly move forward continuously, while the slope surface part 43 slidably contacts the gentle slope tapered part 17B and maintains an equal slope (slope angle), the tip head 37 moves radially inwardly to reduce the diameter of and deform the pipe P locally as shown in FIGS. 11 and 12. As the cap nut 2 is caused to further threadedly move forward, a final tightened state shown in FIGS. 13 and 14 is produced.

The pipe P made of a relatively soft material such as copper (Cu) is subjected to local deformation by means of diameter reduction to assume the shape such as that shown in FIGS. 13 and 14 after passing through the shape in FIG. 12 (from the shape in FIG. 11). In the meantime, the first tip side 41 and the second tip side 42 come into the state of tightly contacting the outer peripheral surface 10A of the pipe P under pressure while maintaining positions parallel to each other (see FIG. 6), thereby exerting the large pipe extraction resistance Z.

In FIGS. 13 and 14, a dashed line Y shows a reference line parallel to the axis of the pipe P. Specifically, the reference line (dashed line) Y is used as a basis to clearly show how the outer peripheral surface 10A of the pipe P is deformed and to clearly show the tilted postures of the back tooth 36B and the front tooth 36F and the positions of the back tooth 36B and the front tooth 36F relative to each other.

In a connection finished state shown in FIGS. 13 and 14, the back tooth 36B and the front tooth 36F come into the state of tightly contacting the pipe outer peripheral surface 10A under pressure with the pressure-contacting surface pressures $P_{41}$ and $P_{42}$ respectively substantially equal to each other. Thus, extraction resistance $Z_B$ generated by the back tooth 36B and extraction resistance $Z_F$ generated by the front tooth 36F (shown in FIG. 14) become substantially equal to each other.

Specifically, referring to FIG. 14, the following formula is established:

$$Z = Z_B + Z_F$$

$$Z_B \approx Z_F$$

In other words, (as shown in FIG. 14), the vector Z indicating the entire pipe extraction resistance is distributed equally to the back tooth 36B and the front tooth 36F as indicated by their respective vectors $Z_B$ and $Z_F$.

A configuration for making the extraction resistance (vector) $Z_B$ of the back tooth 36B and the extraction resistance (vector) $Z_F$ of the front tooth 36F substantially equal to each other will be described next in detail. As shown in FIG. 6, in a free state, the first tip side 41 of the back tooth 36B and the second tip side 42 of the front tooth 36F are arranged parallel to each other with the tiny (level difference) dimension ΔH therebetween, and the first tip side 41 is located radially inwardly from the second tip side 42.

As shown in FIGS. 13 and 14, a slope angle at the tip of the tapered section 17 with reduced-diameter tip of the cap nut 2, specifically, a slope angle at the gentle slope tapered part 17B in FIGS. 9 to 14, and the shape and dimension of the tip head 37 are determined in such a manner that, in the tightly pressure-contacting state (connection finished state), the second tip side 42 projects further in the radially inward direction than the first tip side 41 or both the tip sides 42 and 41 are at the same position as viewed in a radial direction.

In particular, the shape and dimension of the tip head 37 will be described in more detail. The outer peripheral surface (slope surface part) 43 of the tip head 37 is formed into a straight slope shape with a dimension in the axial direction sufficient for maintaining a stable posture while contacting the gentle slope tapered part 17B under pressure. The radial direction positions of the back tooth 36B and the front tooth 36F are set in such a manner that a straight line (not shown in the drawings) connecting the back tooth 36B and the front tooth 36F extends parallel to the dashed line Y shown in FIG. 14 (FIG. 13) or this line gets closer to the dashed line Y gradually at a position closer to a direction toward the tip (frontward).

Regarding the shape shown in FIG. 5, the dimension and shape of the gentle slope tapered part 17B and those of the innermost site steep slope tapered part 17C of the tapered section 17 with reduced-diameter tip are set in such a manner as to cause the tip head 37 to move relatively largely toward the radially inward direction like head shaking.

The substantially cylindrical thin part 35 of the stop ring 3 is provided with a small projection 33 at its outer peripheral surface. In the illustrations of the drawings, the small projection 33 has a substantially trapezoidal shape.

As shown in FIGS. 12 and 13, the small projection 33 is adapted to the short straight section 16 of the cap nut 2. If the substantially cylindrical thin part 35 tries to deform excessively by means of diameter increase in a pressure-receiving state, the small projection 33 abuts on the inner surface of the hole part 11 of the cap nut 2 to prevent this deformation. In particular, the small projection 33 is adapted to the short straight section 16 of the hole part 11 (see FIG. 13).

In a period from the initial stage to the intermediate stage of the threaded movement shown in FIGS. 9, 10, and 11, the substantially cylindrical thin part 35 slidably contacts the inner peripheral surface of the hole part 11 only at the tip head 37. This reduces rotation torque particularly when the cap nut 2 is rotated with a work tool to achieve the advantage of facilitating the work.

Another advantage is also achieved that, in a period near the finished state and in the final tightened state shown in FIGS. 12 and 13, the small projection 33 abuts on the short straight section 16 to realize centering of the substantially cylindrical thin part 35.

While the seals 46 and 48 such as O-rings are provided in FIGS. 1 and 2, these seals are not provided for preventing a fluid such as a coolant from leaking outside but for preventing stress corrosion occurring at a pressure-contacting site, a plastically-deformed site, etc. according to the present invention. These seals are desirably oxygen-resistant rubber. The present invention is not limited to the embodiment illustrated in the drawings but can be changed freely in terms of design. For example, the short straight section 16 may freely be omitted from the cap nut 2 or may freely be formed into a gentle tapered shape.

As described above in detail, according to the first embodiment of the present invention shown in FIGS. 1 to 14, a pipe joint includes: the flare joint body 1 including the male screw part 9 and the slope surface 5 with reduced-diameter tip; the cap nut 2 including the female screw part 12 threadedly attached to the male screw part 9 and provided at a base end of the hole part 11, and the housing space part E with the constant diameter section 14, the stepped section 15, and the tapered section 17 with reduced-diameter tip provided at an intermediate area of the hole part 11; and the stop ring 3 fitted in the housing space part E, including the base-end pressure-contacting slope surface 32 contacting the slope surface 5 with reduced-diameter tip under pressure, and having a tip provided with the plastically-deformable and substantially cylindrical thin part 35 and the pipe extraction preventing tooth part 36 formed at the tip head 37 of the substantially cylindrical thin part 35. In this pipe joint, the tooth part 36 includes the back tooth 36B and the front tooth 36F arranged at the tiny interval $W_{36}$, the back tooth 36B has a trapezoidal or substantially trapezoidal sectional shape with the linear first tip side 41 as an upper side, and the front tooth 36F has a trapezoidal or substantially trapezoidal sectional shape with the linear second tip side 42 as an upper side, and as the cap nut 2 threadedly moves forward, the first tip side 41 of the back tooth 36B and the second tip side 42 of the front tooth 36F of the stop ring 3 come into a state of tightly contacting the outer peripheral surface 10A of the straight tip part 10 of the connection target pipe P under pressure to generate the pipe extraction resistance Z. In this configuration, the stop ring 3 does not rotate together with the cap nut 2 as the cap nut 2 threadedly moves forward but the stop ring 3 continues to be at standstill integrally with the pipe P. This makes it possible to prevent the occurrence of relative slip between the slope surface 5 of the joint body 1 and the curved pressure-contacting slope part 32. It becomes possible to omit the "preliminary working" requiring a specific jig described as the unsettled problem (i) of the conventional pipe joint (shown in FIG. 50).

In response to this, working efficiency at a pipe connection site is improved dramatically.

Furthermore, resistance to pipe extraction is provided by the tightly pressure-contacting state realized at a surface using the first tip side 41 and the second tip side 42 each forming a trapezoidal or substantially trapezoidal shape. This makes this resistance sufficiently greater than that provided by the pawl 61 having a triangular section in the conventional pipe joint (see FIG. 50).

In response to application of external force to rotate the pipe P about its axis after completion of the pipework, as a result of provision of the surface pressure contact (not linear pressure contact) and provision of the double tight pressure contact using the back tooth 36B and the front tooth 36F, metal sealing performance is reliably maintained between the tooth part 36 and the pipe outer peripheral surface 10A.

A sealing member is omitted from the inner peripheral surface and the outer peripheral surface of the stop ring 3 by the hermitic function exerted by the back tooth 36B and the front tooth 36F of the tooth part 36 while the back tooth 36B and the front tooth 36F are in the state of tightly contacting the outer peripheral surface 10A under pressure in response to the threaded movement of the cap nut 2. This configuration makes a costly sealing member particularly for resistance to a coolant (conventional O-ring 58 shown in FIG. 50) omissible, while making burdensome work omissible for forming a concave groove for sealing at the stop ring 3.

At the hole part 11 of the cap nut 2, the tapered section 17 with reduced-diameter tip is defined by the base-end steep slope tapered part 17A and the tip gentle slope tapered part 17B. This configuration makes it possible to reduce the number of times the cap nut 2 makes threaded movement, thereby encouraging efficiency improvement of pipe connection work. Specifically, in the initial stage of the threaded movement of the cap nut 2 in which the substantially cylindrical thin part 35 is allowed to be reduced in diameter with small force (see the states in FIGS. 9 and 10), the diameter reduction is realized even by the slight rotation of the cap nut 2 to allow reduction in the total number of times the cap nut 2 makes threaded movement.

Next, the back tooth 36B and the front tooth 36F contact the pipe outer peripheral surface 10A (see FIGS. 11 to 13). Then, the diameter reduction is allowed to occur slowly using the tip gentle slope tapered part 17B, making it possible to make the threaded movement reasonably.

While the back tooth 36B and the front tooth 36F are in the state of tightly contacting the outer peripheral surface 10A of the pipe P under pressure, the pipe extraction resistance Z is distributed equally to the back tooth 36B and the front tooth 36F. This configuration provides the pipe extraction resistance Z sufficiently large as calculated from $(Z_B+Z_F)$ as shown in FIG. 14 to exert excellent resistance to extraction for actual use. In particular, if the pipe P is made of a soft material to be easily deformed plastically, the tooth part does not get stuck into the pipe P but escapes from the pipe P as shown in FIGS. 12, 13, and 14. Even in such a bad condition, resistance to extraction sufficiently large for actual use is still provided.

While the stop ring 3 is in a free state, the first tip side 41 of the back tooth 36B and the second tip side 42 of the front tooth 36F are arranged parallel to each other in such a manner that the first tip side 41 is placed radially inwardly from the second tip side 42, and a slope angle at the tip of the tapered section 17 with reduced-diameter tip, and the shape and dimension of the tip head 37 are set in such a manner that, in the tightly pressure-contacting state, the second tip side 42 projects further in the radially inward direction than the first tip side 41 or the second tip side 42 and the first tip side 41 are at the same position as viewed in the radial direction. This causes the back tooth 36B and the front tooth 36F to exert the respective extraction resistances $Z_B$ and $Z_F$ substantially equal to each other while avoiding "play" at one of the back tooth 36B and the front tooth 36F. This results in the sufficiently large pipe extraction resistance Z as a whole to provide excellent resistance to extraction for actual use. In particular, if the pipe P is made of a soft material to be easily deformed plastically, the tooth part does not get stuck into the pipe P but the pipe outer peripheral surface 10A escapes from the tooth part while being deformed plastically into a curved recess shape (see FIGS. 12, 13, and 14). Even in such a bad condition, sufficiently large resistance to extraction is still provided.

The substantially cylindrical thin part 35 with the tip provided with the back tooth 36B and the front tooth 36F has a conical cylindrical shape increased in diameter toward the tip. This causes the outer peripheral surface of the substantially cylindrical thin part 35 to contact the tapered section 17 with reduced-diameter tip of the cap nut 2 at a small area (in comparison to a circular cylindrical shape of a constant diameter). This further controls rotation torque of the cap nut 2 low and reduces workload (energy) required for the rotation, thereby achieving excellent workability in the threaded movement of the cap nut 2. In addition, torque to cause the co-rotation of the stop ring 3 is reduced.

The small projection 33 for preventing the substantially cylindrical thin part 35 from being increased in diameter and deformed excessively in a pressure-receiving state is provided at the outer peripheral surface of the substantially cylindrical thin part 35, and the small projection 33 is configured to abut on the inner surface of the hole part 11 of the cap nut 2. This makes it possible to reduce the thickness of the substantially cylindrical thin part 35 sufficiently without causing abnormal diameter increase and deformation of the substantially cylindrical thin part 35 in a pressure-receiving state. This sufficiently small thickness controls rotation torque of the cap nut 2 low and reduces workload (energy) required for the rotation, thereby improving workability in the threaded movement of the cap nut 2.

The stop ring 3 includes the annular small projecting strip 40 provided at the inner peripheral edge of the base-end pressure-contacting slope surface 32, to be hooked from an inner diameter side on the annular tip edge part 20 defined by the tip of the slope surface 5 with reduced-diameter tip of the joint body 1 and a joint body hole part 6, and configured to prevent a base end portion of the stop ring 3 from being excessively deformed radially outwardly. This stabilizes the posture of the slope surface 5 of the joint body 1 and that of the pressure-contacting slope surface 32 of the stop ring 3 relative to each other, thereby ensuring hermetic performance stably at a metal touch site therebetween.

Furthermore, interference with the threaded movement of the cap nut 2 is prevented to be caused if the outer peripheral surface of the stop ring 3 is locally increased in diameter at the base end thereof.

At least the back portion 31 of the pipe insertion hole part 3A of the stop ring 3 is formed into a tapered shape with diameter reduced backward and is configured to cause the straight tip part 10 to contact the inner peripheral surface 27 of the pipe insertion hole part 3A under pressure in a pipe insertion finished state. Thus, even if external force acts in a direction of fluctuating the pipe P, the pipe P is still retained relative to the stop ring 3 in such a manner that the axes of the pipe P and the stop ring 3 completely agree with each other. This makes it possible to prevent break of the tightly pressure-contacting state (grasping state) exerted by the back tooth 36B and the front tooth 36F to be caused by swinging motion about the tip head 37 of the substantially cylindrical thin part 35 tightly holding the pipe P on the occurrence of such external force acting on the pipe P.

A second embodiment of the present invention will be described next using FIGS. 15 to 18.

As shown in FIGS. 15 to 18, a pipe joint J includes a joint body 1 and cap nuts 2, 2. Like in the first embodiment, a pipe P has a tip provided with a straight tip part 10.

The joint body 1 in its entirety has a straight shape and a flow path hole 6 is formed along an axis to pass through the joint body 1. A grasping part 1A having a hexagonal shape, etc. is provided at a center position in an axial direction for holding a work tool such as a spanner, and connection tubes 7, 7 are provided continuously with the grasping part 1A in the right and left sides of the axial direction. A male screw part 9 is formed at the outer peripheral surface of each connection tube 7. The two cap nuts 2, 2 are configured to be threadedly attached to the corresponding ones of the right and left male screw parts 9, 9.

Figure 15:
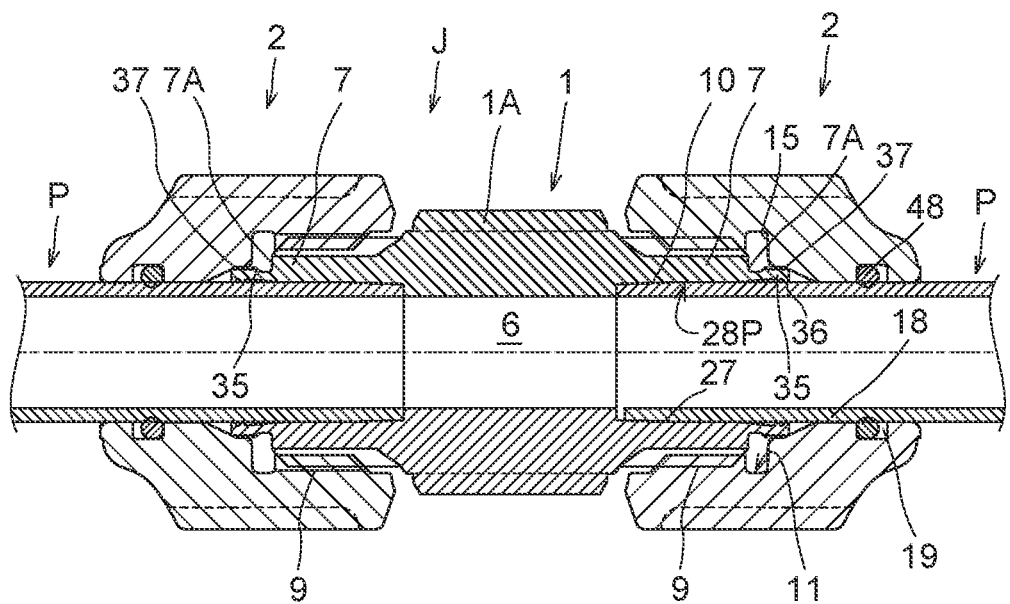
FIG. 15 is a sectional view showing a second embodiment of the present invention and showing a state in which a pipe is being connected.
Figure 18:
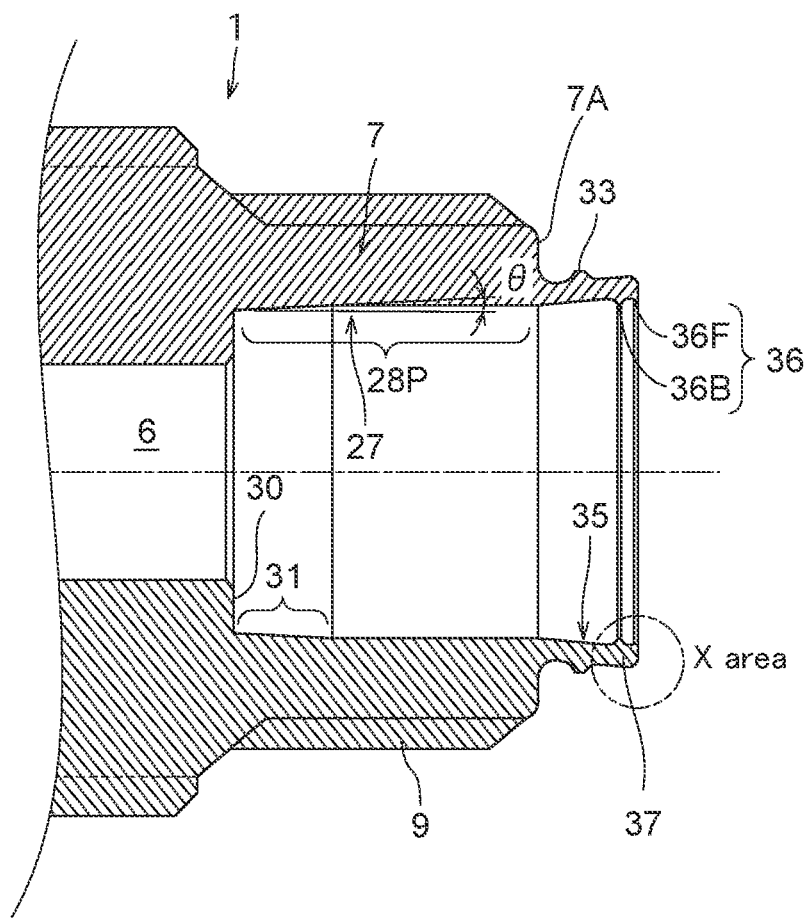
FIG. 18 is a principal part enlarged sectional view of a joint body.

As shown in FIGS. 15 and 18, a substantially cylindrical thin part 35 extends integrally from a tip surface 7A of the connection tube 7. In other words, the joint body 1 includes the connection tube 7 having the outer peripheral surface provided with the male screw part 9, and the substantially cylindrical thin part 35 formed continuously at a tip side (across the tip surface 7A as a stepped part), having a small diameter, and having a tapered shape increased gently in diameter toward the tip. Thus, the substantially cylindrical thin part 35 has a conical cylindrical shape increased in diameter toward the tip.

The flow path hole (hole part) 6 includes a stepped part 30 and has larger diameters at right and left outer portions than a base diameter at the center. The pipe P is inserted into the stepped part 30 (or into the vicinity of the stepped part 30). In this way, a pipe insertion hole part 28P having a (slightly) large diameter is defined by the stepped part 30. (As a preceding description), by using the pipe insertion hole part 28P, a back portion 31 is formed into a tapered shape with diameter reduced backward so as to cause a pipe outer peripheral surface 10A to contact an inner peripheral surface 27 of the hole part 28P under pressure in a pipe insertion finished state (see FIG. 16).

As shown in FIG. 18, an inner diameter dimension at a base end of the substantially cylindrical thin part 35 agrees with an inner diameter dimension at a tip of the pipe insertion hole part 28P, and the inner peripheral surface of the substantially cylindrical thin part 35 has a tapered shape increased gently in diameter toward the tip.

Additionally, an extraction preventing tooth part 36 is provided at an inner peripheral surface of a tip head 37 of the substantially cylindrical thin part 35. Like in FIGS. 5 and 6 referred to in the description of the first embodiment, the tooth part 36 includes a back tooth 36B and a front tooth 36F arranged at a tiny interval $W_{36}$.

As described above, the joint body 1 itself includes the extraction preventing tooth part 36, namely, the back tooth 36B and the front tooth 36F as an integral part to exert pipe extraction resistance.

Figure 16:
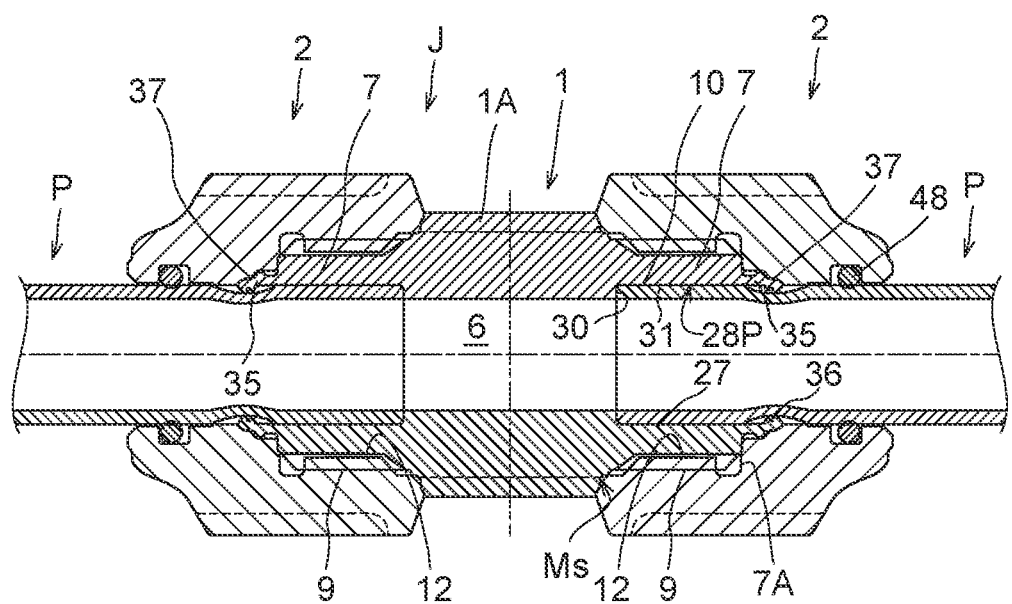
FIG. 16 is a sectional view showing a pipe connection finished state.

While the entire shape shown in FIGS. 15 and 16 is a straight shape, it may be determined freely and may be a T-shape, a Y-shape, an X shape, or an elbow shape, for example. The substantially cylindrical thin part 35 is provided at each of both ends for connection in the illustrations of FIGS. 15 and 16. As an option, this specific substantially cylindrical thin part 35 may be provided only at one of the ends and the other end may be configured as a connection structure with a taper male screw, a parallel female screw, or a tubular part for welding, for example.

The cap nut 2 is smaller in axial direction dimension than that shown in FIG. 3(A) described in the first embodiment. The cap nut 2 includes a hole part 11 provided in an axial direction (as shown in FIGS. 15 to 17). The hole part 11 has a base end provided with a female screw part 12 to which the male screw part 9 is threadedly attached. The hole part 11 includes a clearance groove 13 having a small width dimension in the axial direction, a stepped section 15, a short straight section 16 having a small width dimension $W_{16}$, a tapered section 17 with reduced-diameter tip, and a straight section 18 (having an inner diameter dimension slightly greater than the outer diameter of the connection target pipe P) that are formed sequentially from the female screw part 12 toward the tip.

The straight section 18 is provided with a concave groove 19 to which a seal 48 such as an O-ring is fitted. A metal seal Ms (see FIG. 16) is formed by establishing pressure contact of metals between a base end portion of the cap nut 2 and the vicinity of a tip surface of the grasping part 1A of the joint body 1 while the cap nut 2 is threadedly attached, thereby omitting a sealing member. The material of the cap nut 2 is yellow copper (brass) or aluminum.

As shown in FIG. 17(B), the tapered section 17 with reduced-diameter tip is defined at the hole part 11 of the cap nut 2 by a base-end steep slope tapered part 17A, an intermediate gentle slope tapered part 17B, etc. Preferably, a steep slope tapered part (at an innermost site) 17C is added.

As shown in FIG. 17(B), a corner at the stepped section 15 and the short straight section 16 is formed into a curved chamfer r.

The following additionally explains FIG. 18 showing a principal part of the joint body 1 in an enlarged manner. Specifically, the back portion 31 is preferably formed into a tapered shape with an extremely small slope angle θ, which may be equal to or greater than 0.5° and equal to or less than 2°, for example. In a pipe insertion finished state shown in FIG. 16, the tip part 10 of the pipe P contacts the back portion 31 of the inner peripheral surface 27 of the pipe insertion hole part 28P under pressure, and the axis of the pipe tip part 10 and the axis of the flow path hole (hole part) 6 of the joint body 1 agree with each other completely to retain the pipe P fixedly without fluctuation.

The substantially cylindrical thin part 35 of the joint body 1 includes the back tooth 36B and the front tooth 36F of projecting shapes arranged at the tiny interval $W_{36}$ provided at the inner peripheral surface of the tip thereof (as described above). As shown in FIGS. 15 and 16, the back tooth 36B and the front tooth 36F are names derived from regarding a direction toward the tip of each of the right and left sides as viewed from the base end (center) of the joint body 1 as "frontward."

The shapes of the back tooth 36B, the front tooth 36F, etc. are the same as those of the first embodiment described above. Specifically, as shown in FIGS. 7 and 5, the sectional shape of the back tooth 36B is a trapezoidal or substantially trapezoidal shape with a linear first tip side 41 as an upper side. FIG. 7 can be seen as an enlarged sectional view showing an area X in FIG. 18 in an enlarged manner.

FIG. 7(A) illustrates a case where the sectional shape of the back tooth 36B is a trapezoidal shape. FIG. 7(B) illustrates a substantially trapezoidal shape with right and left legs having recessed curved shapes. FIG. 7(C) illustrates a case where, of the right and left legs of a trapezoid, the back leg is steep and the front leg has a recessed curved shape.

As shown in FIGS. 8 and 5, the sectional shape of the front tooth 36F is a trapezoidal or substantially trapezoidal shape with a linear second tip side 42 as an upper side. FIG. 8 can be seen as an enlarged sectional view showing the area X in FIG. 4 in an enlarged manner.

FIG. 8(A) illustrates a case where the sectional shape of the front tooth 36F is a trapezoidal shape. FIG. 8(B) illustrates a trapezoidal shape with a steep front leg. FIG. 8(C) illustrates a case where, of the right and left legs of a trapezoid, the front leg is steep and the back leg has a recessed curved shape.

In each of these cases, each of the back tooth 36B and the front tooth 36F has a sectional shape with a straight upper side, which can be designated as w % bat is called a "table top mounting type."

Like in the first embodiment, the substantially cylindrical thin part 35 including the back tooth 36B and the front tooth 36F at the tip has a conical cylindrical shape increased in diameter toward the tip as viewed in its entirety. The first tip side 41 of the back tooth 36B and the second tip side 42 of the front tooth 36F provided at the tip of the cylindrical part 35 are formed parallel to each other, and in a free state, the first tip side 41 of the back tooth 36B is determined to be located radially inwardly by a tiny dimension ΔH from the second tip side 42 of the front tooth 36F as shown in FIG. 5 (the first tip side 41 and the second tip side 42 are arranged as what are called uneven parallel sides).

Like in the first embodiment, in some cases, the tiny dimension ΔH is preferably extremely small or zero (see FIG. 6). Furthermore, the tip head 37 includes an extreme tip radially outward part 38 that is formed into a rounded curved shape (see FIG. 5). The tip head 37 includes a slope surface part 43 with reduced-diameter tip (see FIG. 6).

In the second embodiment, the motion and function of the substantially cylindrical thin part 35, those of the back tooth 36B, and those of the front tooth 36F are the same as those in the first embodiment already described.

Specifically, as the cap nut 2 threadedly moves forward, the substantially cylindrical thin part 35 in a free state shown in FIG. 6 deforms sequentially as shown in FIGS. 9, 10, 11, 12, 13, and 14 in this order.

The first tip side 41 of the back tooth 36B and the second tip side 42 of the front tooth 36F of the joint body 1 move in a diameter reducing direction (radially inward direction) relative to the outer peripheral surface 10A of the straight tip part 10 of the connection target pipe P to come into a tightly pressure-contacting state with large pressure contacting surface pressures indicated by arrows $P_{41}$ and arrows $P_{42}$ in a final connection finished state as shown in FIGS. 13 and 14, thereby generating large pipe extraction resistance Z.

Then, with the back tooth 36B and the front tooth 36F in the state of tightly contacting the pipe outer peripheral surface 10A under pressure, the tooth part 36 including the back tooth 36B and the front tooth 36F exerts a sufficient hermetic function on a fluid such as a coolant, thereby omitting a sealing member from between the inner peripheral surface of the joint body 1 and the pipe outer peripheral surface 10A as shown in FIG. 16. Namely, the O-ring 58 in FIG. 50 showing the conventional example is omitted.

The tapered section 17 with reduced-diameter tip of the hole part 11 of the cap nut 2 includes the base-end steep slope tapered part 17A (continuing to the short straight section 16) and the intermediate gentle slope tapered part 17B (as already described). The tip head 37 of the substantially cylindrical thin part 35 shown in FIG. 6 includes an outermost diameter part 37A that is set to have the same diameter or a diameter slightly smaller than the inner diameter dimension of the short straight section 16 in a free state. Furthermore, the presence of the slope surface part 43 allows the entering tip head 37 to easily reach as far as the state shown in FIG. 9. Specifically, an extreme tip curved part 38A of the tip head 37 abuts on the steep slope tapered part 17A (as shown in FIG. 9).

As the cap nut 2 is caused to threadedly move forward continuously, the curved part 38A reaches a boundary between the steep slope tapered part 17A and the gentle slope tapered part 17B (see FIG. 10). At this time, the first tip side 41 of the back tooth 36B and the second tip side 42 of the front tooth 36F start to contact the outer peripheral surface 10A of the pipe P.

As the cap nut 2 is caused to threadedly move forward continuously, while the slope surface part 43 slidably contacts the gentle slope tapered part 17B and maintains an equal slope (slope angle), the tip head 37 moves radially inwardly to reduce the diameter of and deform the pipe P locally as shown in FIGS. 11 and 12. As the cap nut 2 is caused to further threadedly move forward, a final tightened state shown in FIGS. 13 and 14 is produced.

The pipe P made of a relatively soft material such as copper (Cu) is subjected to local deformation by means of diameter reduction to assume the shape such as that shown in FIGS. 13 and 14 after passing through the shape in FIG. 12 (from the shape in FIG. 11). In the meantime, the first tip side 41 and the second tip side 42 come into the state of tightly contacting the outer peripheral surface 10A of the pipe P under pressure while maintaining positions parallel to each other (see FIG. 6), thereby exerting the large pipe extraction resistance Z.

In FIGS. 13 and 14, a dashed line Y shows a reference line parallel to the axis of the pipe P. Specifically, the reference line (dashed line) Y is used as a basis to clearly show how the outer peripheral surface 10A of the pipe P is deformed and to clearly show the tilted postures of the back tooth 36B and the front tooth 36F and the positions of the back tooth 36B and the front tooth 36F relative to each other.

In a connection finished state shown in FIGS. 13 and 14, the back tooth 36B and the front tooth 36F come into the state of tightly contacting the pipe outer peripheral surface 10A under pressure with the pressure-contacting surface pressures $P_{41}$ and $P_{42}$ respectively substantially equal to each other. Thus, extraction resistance $Z_B$ generated by the back tooth 36B and extraction resistance $Z_F$ generated by the front tooth 36F (shown in FIG. 14) become substantially equal to each other.

Specifically, referring to FIG. 14, the following formula is established:

$$Z = Z_B + Z_F$$

$$Z_B \approx Z_F$$

In other words, (as shown in FIG. 14), the vector Z indicating the entire pipe extraction resistance is distributed equally to the back tooth 36B and the front tooth 36F as indicated by their respective vectors $Z_B$ and $Z_F$.

A configuration for making the extraction resistance (vector) $Z_B$ of the back tooth 36B and the extraction resistance (vector) $Z_F$ of the front tooth 36F substantially equal to each other will be described next in detail. As shown in FIG. 6, in a free state, the first tip side 41 of the back tooth 36B and the second tip side 42 of the front tooth 36F are arranged parallel to each other with the tiny (level difference) dimension ΔH therebetween, and the first tip side 41 is located radially inwardly from the second tip side 42.

As shown in FIGS. 13 and 14, a slope angle at the tip of the tapered section 17 with reduced-diameter tip of the cap nut 2, specifically, a slope angle at the gentle slope tapered part 17B in FIGS. 9 to 14, and the shape and dimension of the tip head 37 are determined in such a manner that, in the tightly pressure-contacting state (connection finished state), the second tip side 42 projects further in the radially inward direction than the first tip side 41 or both the tip sides 42 and 41 are at the same position as viewed in a radial direction.

In particular, the shape and dimension of the tip head 37 will be described in more detail. The outer peripheral surface (slope surface part) 43 of the tip head 37 is formed into a straight slope shape with a dimension in the axial direction sufficient for maintaining a stable posture while contacting the gentle slope tapered part 17B under pressure. The radial direction positions of the back tooth 36B and the front tooth 36F are set in such a manner that a straight line (not shown in the drawings) connecting the back tooth 36B and the front tooth 36F extends parallel to the dashed line Y shown in FIG. 14 (FIG. 13) or this line gets closer to the dashed line Y gradually at a position closer to a direction toward the tip (frontward).

Regarding the shape shown in FIG. 5, the dimension and shape of the gentle slope tapered part 17B and those of the innermost site steep slope tapered part 17C of the tapered section 17 with reduced-diameter tip are set in such a manner as to cause the tip head 37 to move relatively largely toward the radially inward direction like head shaking.

The substantially cylindrical thin part 35 of the joint body 1 itself is provided with a small projection 33 at its outer peripheral surface. In the illustrations of the drawings, the small projection 33 has a substantially trapezoidal shape.

As shown in FIGS. 12 and 13, the small projection 33 is adapted to the short straight section 16 of the cap nut 2. If the substantially cylindrical thin part 35 tries to deform excessively by means of diameter increase in a pressure-receiving state, the small projection 33 abuts on the inner surface of the hole part 11 of the cap nut 2 to prevent this deformation. In particular, the small projection 33 is adapted to the short straight section 16 of the hole part 11 (see FIG. 13).

In a period from the initial stage to the intermediate stage of the insertion shown in FIGS. 9, 10, and 11, the substantially cylindrical thin part 35 slidably contacts the inner peripheral surface of the hole part 11 only at the tip head 37. This reduces rotation torque particularly when the cap nut 2 is rotated with a work tool to achieve the advantage of facilitating the work.

Another advantage is also achieved that, in a period near the finished state and in the final tightened state shown in FIGS. 12 and 13, the small projection 33 abuts on the short straight section 16 to realize centering of the substantially cylindrical thin part 35.

While the seal 48 such as an O-ring is provided in FIGS. 15 and 16, this seal is not provided for preventing a fluid such as a coolant from leaking outside but for preventing stress corrosion occurring at a pressure-contacting site, a plastically-deformed site, etc. according to the present invention. This seal is desirably oxygen-resistant rubber. The present invention is not limited to the embodiment illustrated in the drawings but can be changed freely in terms of design. For example, the short straight section 16 may freely be omitted from the cap nut 2 or may freely be formed into a gentle tapered shape.

As described above in detail, according to the second embodiment of the present invention shown in FIGS. 15 to 18, the joint body 1 itself includes the extraction preventing tooth part 36 as an integral part that comes into a state of tightly contacting the outer peripheral surface 10A of the connection target pipe P under pressure to generate the pipe extraction resistance Z in response to the threaded movement of the cap nut 2 toward the joint body 1. In this configuration, the large extraction resistance Z is exerted on the connection target pipe P only by causing the cap nut 2 to threadedly move forward. This allows pipe connection work to exert reliable and hermetic performance to be done easily and readily. In particular, a parts count is reduced, risk of loss of a small part is not caused, and a dimension in the axial direction can be reduced significantly, thereby encouraging compactness. In comparison to the conventional case (see FIG. 50), sites where fluid leakage is to be avoided are reduced by half, thereby obtaining an excellent pipe joint with stable sealing performance.

Furthermore, as the stop ring 56 in the conventional pipe join shown in FIG. 50 is omitted, it becomes possible to completely omit the foregoing "preliminary working" requiring a specific jig described as the unsettled problem (i). In response to this, working efficiency at a pipe connection site is improved dramatically.

According to the present invention, the joint body 1 itself includes the extraction preventing tooth part 36 as an integral part that comes into a state of tightly contacting the outer peripheral surface 10A of the connection target pipe P under pressure to generate the pipe extraction resistance Z in response to the threaded movement of the cap nut 2 toward the joint body 1, the extraction preventing tooth part 36 is formed at the tip of the substantially cylindrical thin part 35 of a projecting shape provided at the tip of the joint body 1, the extraction preventing tooth part 36 includes the back tooth 36B and the front tooth 36F arranged at the tiny interval $W_{36}$, the back tooth 36B has a trapezoidal or substantially trapezoidal sectional shape with the linear first tip side 41 as an upper side, the front tooth 36F has a trapezoidal or substantially trapezoidal sectional shape with the linear second tip side 42 as an upper side, and as the cap nut 2 threadedly moves forward, the first tip side 41 of the back tooth 36B and the second tip side 42 of the front tooth 36F of the joint body 1 come into a state of tightly contacting the outer peripheral surface 10A of the connection target pipe P under pressure to generate the pipe extraction resistance Z. In this configuration, resistance to pipe extraction is provided by the tightly pressure-contacting state realized at a surface using the first tip side 41 and the second tip side 42 each forming a trapezoidal or substantially trapezoidal shape (see FIG. 14). This resistance to extraction is exerted sufficiently intensely.

In response to application of external force to rotate the pipe P about its axis after completion of the pipework, as the surface pressure-contacting force acts intensely (see the pressure-contacting surface pressures $P_{41}$ and $P_{42}$ shown in FIG. 14), metal sealing performance (hermeticity) is reliably maintained between the tooth part 36 and the pipe outer peripheral surface 10A without rotating the pipe P.

The cap nut 2 includes: the female screw part 12 threadedly attached to the male screw part 9 of the joint body 1 and provided at a base end of the hole part 11; and the stepped section 15 and the tapered section 17 with reduced-diameter tip provided at an intermediate area of the hole part 11, and the tapered section 17 with reduced-diameter tip is defined by the base-end steep slope tapered part 17A and the intermediate gentle slope tapered part 17B. This configuration makes it possible to reduce the number of times the cap nut 2 makes threaded movement, thereby encouraging efficiency improvement of pipe connection work. Specifically, in the initial stage of the threaded movement of the cap nut 2 in which the substantially cylindrical thin part 35 is allowed to be reduced in diameter with small force (see the states in FIGS. 9 and 10), the diameter reduction is realized even by the slight rotation of the cap nut 2 to allow reduction in the total number of times the cap nut 2 makes threaded movement.

Next, the back tooth 36B and the front tooth 36F contact the pipe outer peripheral surface 10A (see FIGS. 11 to 13). Then, the diameter reduction is allowed to occur slowly using the intermediate gentle slope tapered part 17B, making it possible to make the threaded movement reasonably.

While the back tooth 36B and the front tooth 36F are in the state of tightly contacting the outer peripheral surface 10A of the pipe P under pressure, the pipe extraction resistance Z is distributed equally to the back tooth 36B and the front tooth 36F. This configuration provides the pipe extraction resistance Z sufficiently large as calculated from $(Z_B+Z_F)$ as shown in FIG. 14 to exert excellent resistance to extraction for actual use. In particular, if the pipe P is made of a soft material to be easily deformed plastically, the tooth part does not get stuck into the pipe P but escapes from the pipe P as shown in FIGS. 12, 13, and 14. Even in such a bad condition, resistance to extraction sufficiently large for actual use is still provided.

While the substantially cylindrical thin part 35 is in a free state, the first tip side 41 of the back tooth 36B and the second tip side 42 of the front tooth 36F are arranged parallel to each other in such a manner that the first tip side 41 is placed radially inwardly from the second tip side 42, and a slope angle at the tip of the tapered section 17 with reduced-diameter tip, and the shape and dimension of the tip head 37 are set in such a manner that, in the tightly pressure-contacting state, the second tip side 42 projects further in the radially inward direction than the first tip side 41 or the second tip side 42 and the first tip side 41 are at the same position as viewed in the radial direction. This causes the back tooth 36B and the front tooth 36F to exert the respective extraction resistances $Z_B$ and $Z_F$ substantially equal to each other while avoiding "play" at one of the back tooth 36B and the front tooth 36F. This results in the sufficiently large pipe extraction resistance Z as a whole to provide excellent resistance to extraction for actual use. In particular, if the pipe P is made of a soft material to be easily deformed plastically, the tooth part does not get stuck into the pipe P but the pipe outer peripheral surface 10A escapes from the tooth part while being deformed plastically into a curved recess shape (see FIGS. 12, 13, and 14). Even in such a bad condition, sufficiently large resistance to extraction is still provided.

The substantially cylindrical thin part 35 with the tip provided with the back tooth 36B and the front tooth 36F has a conical cylindrical shape increased in diameter toward the tip. This causes the outer peripheral surface of the substantially cylindrical thin part 35 to contact the tapered section 17 with reduced-diameter tip of the cap nut 2 at a small area (in comparison to a circular cylindrical shape of a constant diameter). This further controls rotation torque of the cap nut 2 low and reduces workload (energy) required for the rotation, thereby achieving excellent workability in the threaded movement of the cap nut 2.

The small projection 33 for preventing the substantially cylindrical thin part 35 from being increased in diameter and deformed excessively in a pressure-receiving state is provided at the outer peripheral surface of the substantially cylindrical thin part 35, and the small projection 33 is configured to abut on the inner surface of the hole part 11 of the cap nut 2. This makes it possible to reduce the thickness of the substantially cylindrical thin part 35 sufficiently without causing abnormal diameter increase and deformation of the substantially cylindrical thin part 35 in a pressure-receiving state. This sufficiently small thickness controls rotation torque of the cap nut 2 low and reduces workload (energy) required for the rotation, thereby improving workability in the threaded movement of the cap nut 2.

The back portion 31 of the pipe insertion hole part 28P of the joint body 1 is formed into a tapered shape with diameter reduced backward and is configured to cause the pipe outer peripheral surface 10A to contact the inner peripheral surface 27 of the pipe insertion hole part 28P under pressure in a pipe insertion finished state. Thus, even if external force acts in a direction of fluctuating the pipe P, the pipe P is still retained relative to the hole part 28P in such a manner that the axes of the pipe P and the hole part 28P completely agree with each other. This makes it possible to prevent break of the tightly pressure-contacting state (grasping state) exerted by the back tooth 36B and the front tooth 36F to be caused by fluctuating motion about the tip head 37 of the substantially cylindrical thin part 35 tightly holding the pipe P on the occurrence of such external force acting on the pipe P.

A third embodiment of the present invention will be described next using FIGS. 19 to 34.

According to the third embodiment described on the basis of FIGS. 19 to 34, a pipe joint J includes a flare joint body 1F, a cap nut 2, and a stop ring 3. A connection target pipe P has a tip provided with a straight tip part 10 (from which the conventional flaring is completely omitted).

The flare joint body 1F is of a type having been used for a long time, is similar to the flare joint body h shown in FIG. 49, and includes a slope surface 5 with reduced-diameter tip. Specifically, the slope surface 5 with reduced-diameter tip is formed at a tip of a connection tube 7 where a flow path hole 6 passes through.

The entire shape of the flare joint body 1F is determined freely and may be a straight shape, a T-shape, a Y-shape, or an X shape, for example. The shape of a different connection end part beyond the range of FIGS. 19 and 20 may be determined freely and may have the connection tube 7 shown in FIGS. 19 and 20, or may have a taper male screw, a parallel female screw, or a tubular part for welding, for example.

Figure 19:
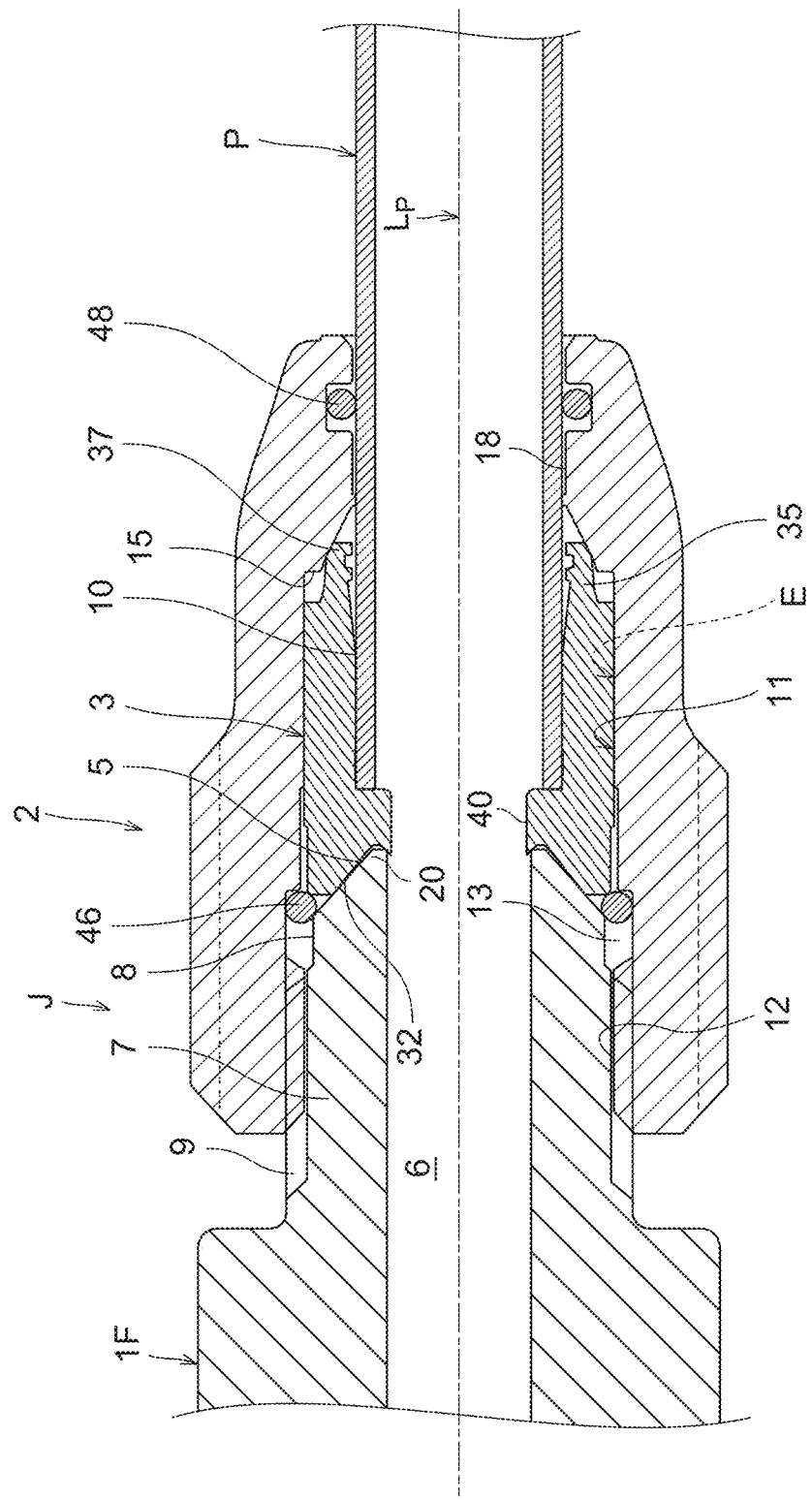
FIG. 19 is a sectional view showing a third embodiment of the present invention and showing a state in which a pipe is being connected.
Figure 20:
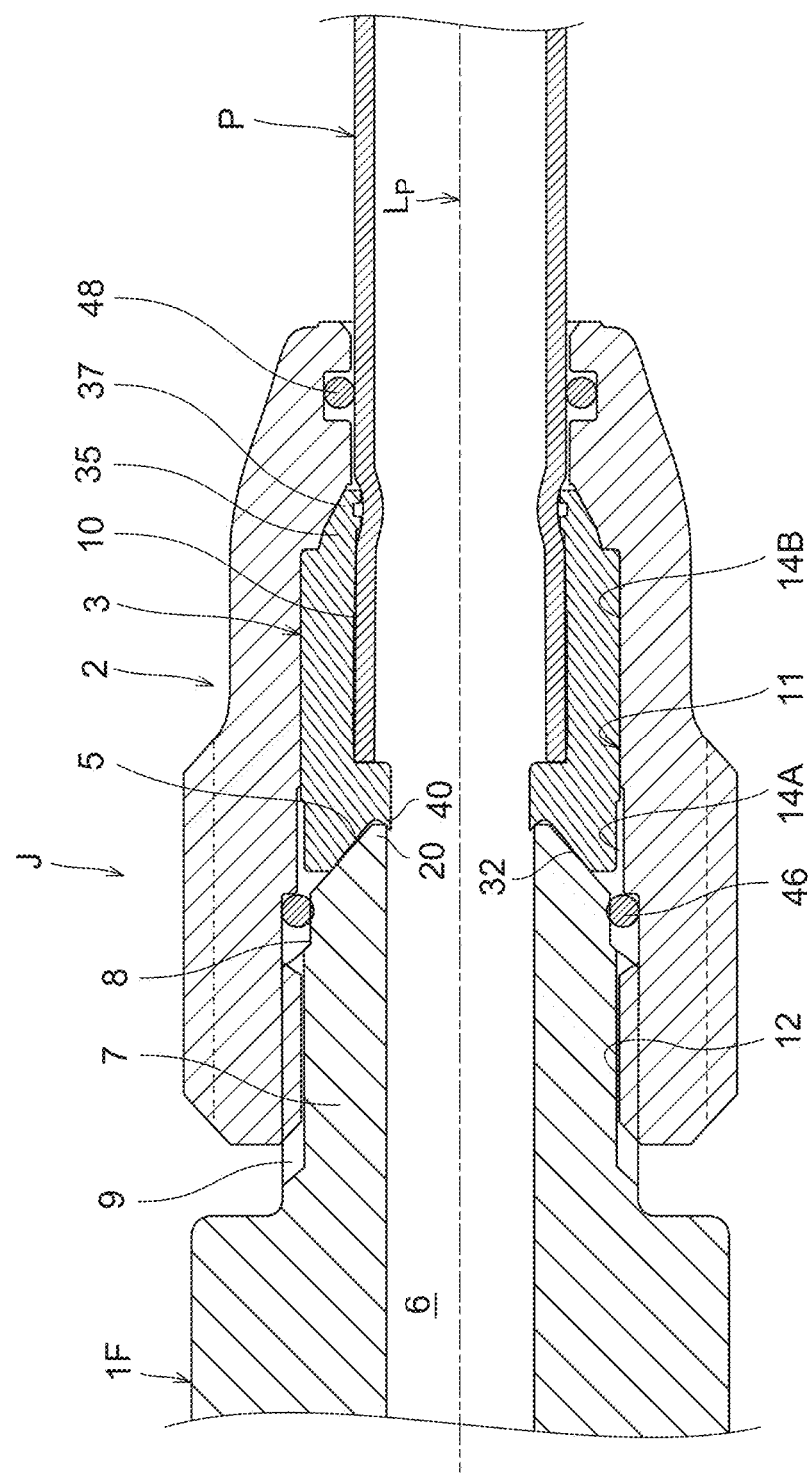
FIG. 20 is a sectional view showing a pipe connection finished state.

In short, at least one connection tube 7 is provided as shown in FIGS. 19 and 20, and the connection tube 7 includes a male screw part 9 as a parallel screw provided continuously across a short straight part 8 with a base edge of the slope surface 5 in the illustrations of FIGS. 19 and 20.

The cap nut 2 includes a hole part 11 provided in an axial direction (as shown in FIGS. 19 to 21). The hole part 11 has a base end provided with a female screw part 12 to which the male screw part 9 is threadedly attached. The hole part 11 includes a sealing groove 13 having a small width dimension $W_{13}$ in the axial direction, a first constant diameter section (first straight section) 14A, a second constant diameter section (second straight section) 14B, a stepped section 15, a short straight section 16 having a small width dimension $W_{16}$, a tapered section 17 with reduced-diameter tip, and a straight section 18 (having an inner diameter dimension slightly greater than the outer diameter of the connection target pipe P) that are formed sequentially from the female screw part 12 toward the tip. In some cases, the short straight section 16 is omissible (in a short diameter shape).

The straight section 18 is provided with a concave groove 19 to which a seal 48 such as an O-ring is fitted. A seal 46 such as an additional O-ring is fitted to the sealing groove 13. The first constant diameter section 14A is set to have a slightly greater inner diameter dimension than the second constant diameter section 14B.

The constant diameter sections 14A and 14B, the stepped section 15, the short straight section 16, and the tapered section 17 with reduced-diameter tip of the hole part 11 define housing space part E for housing the stop ring 3. (In some cases, the short straight section 16 is omissible.)

As described above, some structures of the third embodiment are common to those of the first embodiment already described.

As described below, however, differences are present in terms of significant structural elements, and operation and effect.

As shown in FIG. 21(B), the tapered section 17 with reduced-diameter tip is defined at the hole part 11 of the cap nut 2 by a base-end steep slope tapered part 17A, an intermediate gentle slope tapered part 17B, an intermediate steep slope tapered part 17C, a tip gentle slope tapered part 17D, etc.

The base-end steep slope tapered part 17A and the intermediate steep slope tapered part 17C are set to slope (tilt) angles equal to each other. These steep slope tapered parts 17A and 17C are also set to width dimensions equal to each other.

As clearly seen from FIG. 21(B), the intermediate gentle slope tapered part 17B is set to a slope (tilt) angle equal to the value of the slope (tilt) angle of the tip gentle slope tapered part 17D, or the slope (tilt) angle of the tapered part 17D is set to be slightly greater. Additionally, the latter tapered part 17D has a smaller width dimension.

As described above by referring to FIG. 21(A), a constant diameter section (straight section) 14 is defined by the first and second constant diameter sections 14A and 14B having inner diameter dimensions slightly different from each other. Alternatively, in response to need, the first constant diameter section 14A and the second constant diameter section 14B may have inner diameters completely equal to each other.

The stop ring 3 will be described next. As shown in FIGS. 22 and 19 to 21, the stop ring 3 is fitted in the housing space part E of the cap nut 2. The stop ring 3 has a substantially short cylindrical shape, and has an outer peripheral surface provided with a base outer diameter part 24 extending from a base end to an intermediate range and slidably fitted to the straight section 14 of the hole part 11 of the cap nut 2, and a substantially cylindrical thin part 35 formed continuously at a tip side across a stepped part 25, having a small diameter, and having a tapered shape increased gently in diameter toward the tip.

An inner peripheral surface 27 includes a base inner diameter part 28 provided at an intermediate area in the axial direction, and the pipe P is inserted into the base inner diameter part 28 (as shown in FIG. 19).

The base inner diameter part 28 has a base end where an inner bulge 29 with a small diameter inner peripheral surface part 29A is provided continuously. The inner bulge 29 has one end surface (a surface perpendicular to the axis) functioning as a stepped surface 30.

A sign 32 is a curved (convex) pressure-contacting slope surface formed at a base end of the stop ring 3. As shown in FIGS. 19 and 20, the pressure-contacting slope surface 32 contacts the slope surface 5 with reduced-diameter tip of the joint body 1 under pressure to exert hermetic action by means of metal touch.

In an example illustrated in FIG. 22(A), an annular small projecting strip 40 is provided at a point of intersection between the inner peripheral edge of the curved pressure-contacting slope surface 32 and the small diameter inner peripheral surface part 29A.

This will be described more specifically. As shown in FIGS. 19, 20, and 22(A), the stop ring 3 includes the annular small projecting strip 40 to be hooked from an inner diameter side on an annular tip edge part 20 defined by a tip of the slope surface 5 with reduced-diameter tip of the joint body 1 and a joint body hole part 6.

As clearly seen from FIG. 22(A), the small projecting strip 40 has an overturned triangular sectional shape. This overturned triangle is defined by a short leg resulting from inverting the inner edge of the curved (convex) pressure-contacting slope surface 32 outward across a small curved recess 21, and by the small diameter inner peripheral surface part 29A.

As descried above, as shown in FIGS. 19 and 20, the annular small projecting strip 40 has a shape hooked from an inner diameter side on the annular tip edge part 20 of the joint body 1. This makes it possible to prevent the base end of the stop ring 3 from excessively deforming radially outwardly. As shown in FIG. 22(B), in some cases, the annular small projecting strip 40 shown in FIG. 22(A) is preferably omitted.

As shown in FIG. 22, at least a back portion 31 of a pipe insertion hole part 3A of the stop ring 3 is formed into a tapered shape with diameter reduced backward. Specifically, in FIG. 22, at least the back portion 31 is formed into a tapered shape with an extremely small slope angle θ, which may be equal to or greater than 0.5° and equal to or less than 2°, and is configured in such a manner that the tip part 10 of the pipe P contacts the back portion 31 of the inner peripheral surface 27 of the pipe insertion hole part 3A under pressure in a pipe insertion finished state shown in FIG. 20.

The stop ring 3 includes the plastically-deformable and substantially cylindrical thin part 35 formed integrally at a tip side thereof. The substantially cylindrical thin part 35 includes a tip head 37 provided with a pipe extraction preventing tooth part 36.

Figure 23:
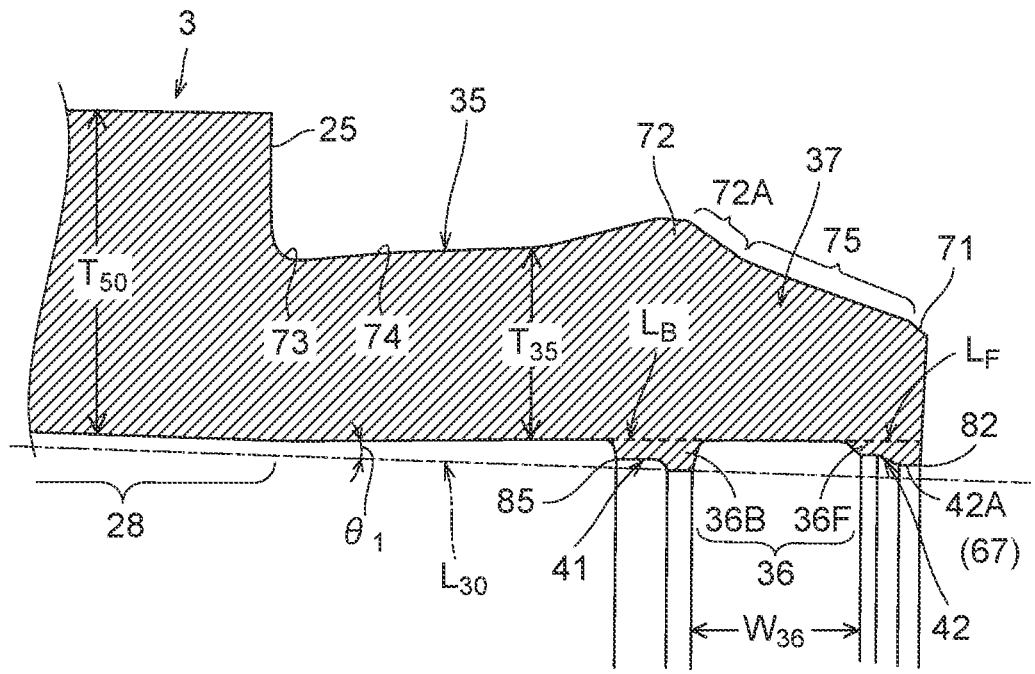
FIG. 23 is a principal part enlarged sectional view of the stop ring.

As shown in an enlarged sectional view in FIG. 23, the tooth part 36 includes a back tooth 36B and a front tooth 36F arranged at a tiny interval $W_{36}$.

The substantially cylindrical thin part 35 has a conical cylindrical shape slightly increased in diameter toward the tip (see FIGS. 22 and 23).

In FIGS. 22(A) and 23, a base short cylindrical part 50 defined by the base inner diameter part 28 and the base outer diameter part 24 has a thickness dimension called $T_{50}$, and an average thickness dimension of the substantially cylindrical thin part 35 is called $T_{35}$. The substantially cylindrical thin part 35 is formed to a relatively large thickness so as to establish the following: $0.40 \cdot T_{50} \leq T_{35} \leq 0.75 \cdot T_{50}$ (formula 1). (In FIG. 23, the average thickness dimension $T_{35}$ is calculated while the front tooth 36F and the back tooth 36B partitioned by dotted lines $L_F$ and $L_B$ are excluded from the calculation.)

In other words, the average thickness dimension $T_{35}$ of the substantially cylindrical thin part 35 corresponds to 40 to 75% of the thickness dimension $T_{50}$ of the base short cylindrical part 50 and is sufficiently large.

Preferably, $T_{35}$ is set as follows: $0.43 \cdot T_{50} \leq T_{35} \leq 0.65 \cdot T_{50}$ (formula 2).

More desirably, $T_{35}$ is set as follows: $0.45 \cdot T_{50} \leq T_{35} \leq 0.55 \cdot T_{50}$ (formula 3).

In each of the foregoing formulas, being less than the lower limit value makes it difficult to withstand an inner pressure. Conversely, exceeding the upper limit value makes a level difference dimension of the stepped part 25 excessively small, making it difficult for a worker to detect increase in resistance to the threaded movement of the cap nut 2 (described later). Being less than the lower limit value or exceeding the upper limit value also prevents the tip head 37 from biting (being compressed) into the outer peripheral surface 10A of the pipe P reliably and smoothly, as shown in FIGS. 26 to 33 (described later).

The back tooth 36B and the front tooth 36F are names derived from regarding a direction toward the tip (right) in FIGS. 19, 20, and 22 as "frontward."

Figure 24:
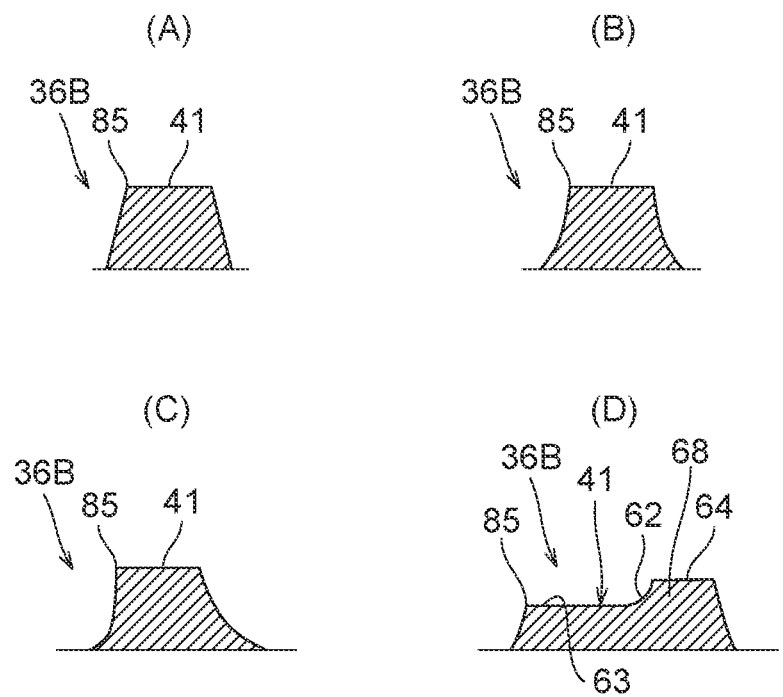
FIG. 24 includes explanatory views illustrating the sectional shape of a back tooth.

As shown in FIGS. 24(D) and 23, the sectional shape of the back tooth 36B is a substantially trapezoidal shape, and a first tip side 41 composed of an upper side of the substantially trapezoidal shape includes a short posterior half side part 63 and a tall anterior half side part 64 defined across a curved intermediate level difference part 62. In another case, the sectional shape of the back tooth 36B is a trapezoidal or substantially trapezoidal shape with a linear first tip side 41 as an upper side (see FIGS. 24(A), 24(B), 24(C), and 24(D)). FIG. 24 can be seen as an enlarged view showing the back tooth 36B in an area X in FIG. 22 in an enlarged manner.

FIG. 24(A) illustrates a case where the sectional shape of the back tooth 36B is a trapezoidal shape. FIG. 24(B) illustrates a substantially trapezoidal shape with right and left legs having recessed curved shapes. FIG. 24(C) illustrates a case where, of the right and left legs of a trapezoid, the back leg is steep and the front leg has a recessed curved shape.

Figure 25:
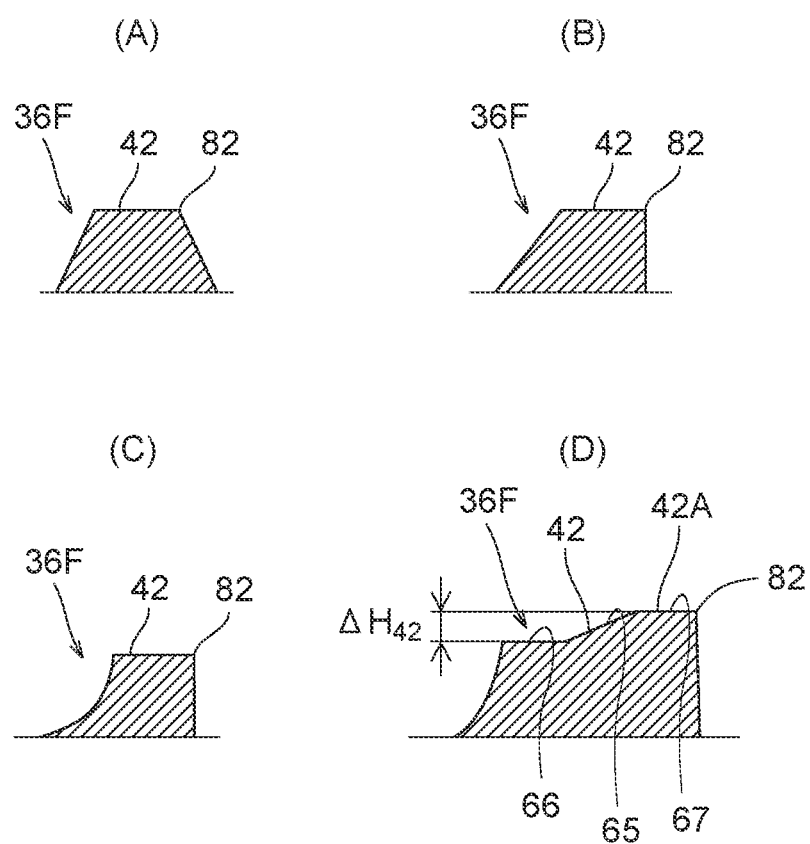
FIG. 25 includes explanatory views illustrating the sectional shape of a front tooth.

As shown in FIGS. 25 and 23, the sectional shape of the front tooth 36F is a trapezoidal or substantially trapezoidal shape with a linear second tip side 42 as an upper side (see FIGS. 25(A) to 25(C)). Desirably, the linear second tip side 42 in each of FIGS. 25(A) to 25(C) has a shape gently sloping upward in the rightward direction (frontward). The reason therefor is that this allows increase in resistance to coming off of the pipe P. In another case, as shown in FIG. 25(D), the front tooth 36F desirably has a substantially trapezoidal shape with the second tip side 42 of a polygonal line shape as an upper side. Specifically, the second tip side 42 of the front tooth 36F shown in FIG. 25(D) has a polygonal line shape with a short posterior half side part 66 and a tall anterior half side part 67 defined across a slope surface 65 sloping downward and backward. (The anterior half side part 67 may also be called a tip part 42A.) FIG. 25 can be seen as an enlarged sectional view showing the front tooth 36F in the area X in FIG. 22 in an enlarged manner.

FIG. 25(A) illustrates a case where the sectional shape of the front tooth 36F is a trapezoidal shape. FIG. 25(B) illustrates a trapezoidal shape with a steep front leg. FIG. 25(C) illustrates a case where, of the right and left legs of a trapezoid, the front leg is steep and the back leg has a recessed curved shape.

In each of these cases, each of the back tooth 36B and the front tooth 36F has a sectional shape with a straight upper side or an upper side of a polygonal line shape.

The substantially cylindrical thin part 35 including the back tooth 36B and the front tooth 36F at the tip has a conical cylindrical shape increased in diameter toward the tip as viewed in its entirety (as already described). The first tip side 41 of the back tooth 36B and the second tip side 42 of the front tooth 36F provided at the tip of the cylindrical part 35 are formed substantially parallel to each other, and in a free state, the tip part 42A (anterior half side part 67) of the second tip side 42 of the front tooth 36F is located slightly radially outwardly from the first tip side 41 of the back tooth 36B as shown in FIG. 23. Specifically, while the first tip side 41 of the back tooth 36B abuts on a straight line $L_{30}$ parallel to an axis $L_3$ of the stop ring 3 (see FIG. 22), the second tip side 42 of the front tooth 36F is located at a tiny gap from the line $L_{30}$ (see FIG. 23). In other words, while the substantially cylindrical thin part 35 is in a free state, the dimension (radius) of the second tip side 42 from an axis $L_P$ of the pipe P, specifically, from the axis $L_3$ of the stop ring 3, is slightly greater than the corresponding dimension (radius) of the first tip side 41.

In other words, the first tip side 41 and the second tip side 42 differ from each other in dimension from the axis $L_P$ of the pipe P and from the axis $L_3$ of the stop ring 3 (arranged on uneven parallel sides).

As the cap nut 2 threadedly moves forward, the substantially cylindrical thin part 35 in a free state described above deforms sequentially as shown in FIGS. 26 to 32. In FIGS. 26 to 32, the pipe P is illustrated in its original shape and original dimension without deformation in order to facilitate understanding of the deformation of the substantially cylindrical thin part 35, the position and posture of the back tooth 36B, those of the front tooth 36F, etc. FIG. 33 shows a tightly pressure-contacting state (in a finally compressed state) and particularly shows how the pipe P is deformed. As shown in FIG. 33, a dashed line $L_{36}$ shows a radial direction position, which is a virtual cylindrical surface position of the (sunk) tooth part 36 in a tightly pressure-contacting state.

With the radial direction position (virtual cylindrical surface position) indicated by the dashed line $L_{36}$ as a target reference. FIGS. 26 to 32 show how the substantially cylindrical thin part 35, the back tooth 36B, the front tooth 36F, the tip head 37, etc. are placed sequentially to their positions and postures.

As sequentially shown in FIGS. 26 to 33, the substantially cylindrical thin part 35 and the tip head 37 thereof are deformed, specifically, compressed and deformed radially inwardly. As the shape of the tapered section 17 with reduced-diameter tip has already been described by referring to FIG. 21(B), the following description is intended for the shapes of the substantially cylindrical thin part 35 and the tip head 37 thereof.

In FIG. 23, the tip head 37 includes a first convex part 71 composed of an extreme tip outer peripheral corner, and a second convex part 72 of a low triangular bulging shape formed at the same axial direction position as the axial direction position of the back tooth 36B and formed at the outer periphery of the substantially cylindrical thin part 35.

The outer peripheral surface of the substantially cylindrical thin part 35 is defined by a curved part 73 at an inner edge of the stepped part 25, a cylindrical straight part 74 extending from the curved part 73, the low triangular bulge of the second convex part 72, and a tilt part 75 reduced in diameter toward the tip.

As clearly seen from FIG. 23, the inner peripheral surface of the substantially cylindrical thin part 35 forms a substantially conical surface increased in diameter toward the tip at a tiny slope angle θ1 (from a horizon) defined toward the tip relative to an inner diameter part 28 (see FIG. 22). The back tooth 36B and the front tooth 36F project while being arranged at the tiny interval $W_{36}$, and the front tooth 36F has a right-angled edge 82 formed at the front end (tip) of the second tip side 42 thereof (see FIGS. 25(B), 25(C), and 25(D)).

The back tooth 36B has an edge 85 formed at the back end of the first tip side 41 thereof (see FIG. 24).

In a tightly pressure-contacting state shown in FIG. 33, the first tip side 41 of the back tooth 36B contacts the pipe outer peripheral surface 10A under pressure in such a manner as to bite into the outer peripheral surface 10A and the second tip side 42 of the front tooth 36F contacts the pipe outer peripheral surface 10A under pressure in such a manner as to bite into the outer peripheral surface 10A, thereby exerting a double sealing function. In the tightly pressure-contacting state shown in FIG. 33, further, pipe extraction resistances $Z_B$ and $Z_F$ are generated using the first tip side 41 and the second tip side 42 respectively. As the double sealing function is exerted by the first tip side 41 and the second tip side 42 in the tightly pressure-contacting state, a sealing member such as an O-ring is omitted completely from the inner peripheral surface and the outer peripheral surface of the stop ring 3 (as shown in FIG. 19).

Figure 26:
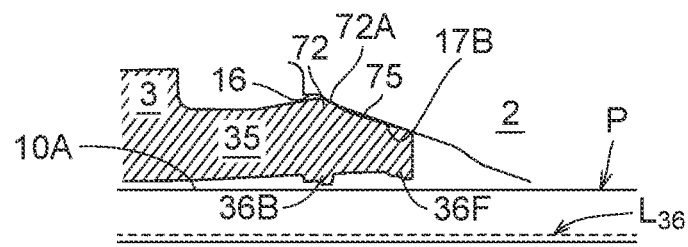
FIG. 26 is a principal part enlarged explanatory sectional view showing an initially set state of a tip head.

Steps shown in FIGS. 26 to 33 will be described sequentially by referring to FIGS. 21(B), 23, etc. FIG. 26 shows an initially set state in which the second convex part 72 is fitted in the short straight section 16 of the cap nut 2, the tilt part 75 (shown in FIG. 23) is fitted to the intermediate gentle slope tapered part 17B (shown in FIG. 21(B)), and a frontward tilt section 72A of the second convex part 72 is fitted to the base-end steep slope tapered part 17A.

Next, in response to threaded movement of the cap nut 2, the tip head 37 enters the tapered section 17 while slidably contacting the tapered section 17. Then, as shown in FIG. 27, the second convex part 72 is pressed radially inwardly with the base-end steep slope tapered part 17A (see FIG.

21(B)) to contact the outer peripheral surface 10A of the pipe P under pressure. This is called a first squeezing step. In this step, it is preferable to set the dimension of each part in advance in such a manner as to cause the curved pressure-contacting slope surface 32 of the stop ring 3 (shown in FIG. 19) to contact the slope surface 5 of the flare joint body 1F lightly.

Figure 27:
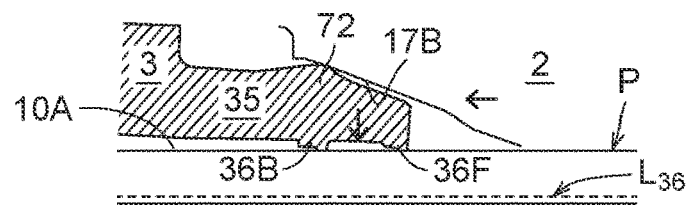
FIG. 27 is a principal part enlarged explanatory sectional view for explaining the motion of the tip head sequentially.
Figure 28:
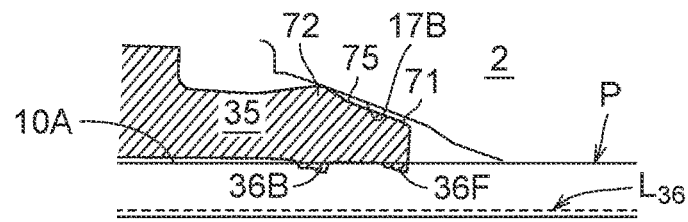
FIG. 28 is a principal part enlarged explanatory sectional view for explaining the motion of the tip head sequentially.
Figure 29:
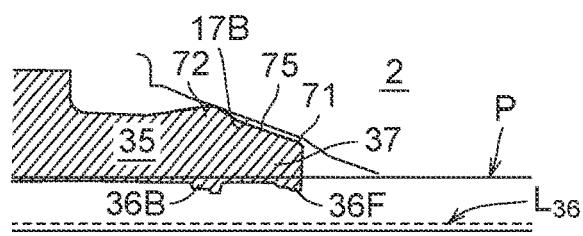
FIG. 29 is a principal part enlarged explanatory sectional view for explaining the motion of the tip head sequentially.

Next, as shown in FIGS. 27 and 28, (in response to the threaded movement of the cap nut 2), the second convex part 72 is driven onto the intermediate gentle slope tapered part 17B (contacts the intermediate gentle slope tapered part 17B under pressure) and is further compressed as shown in FIG. 29. In this step, only the second convex part 72 contacts the tapered part 17B under pressure. In the first half of the compression, the back tooth 36B first enters the pipe outer peripheral surface 10A (as shown in FIG. 28). In the latter half of the compression, the front tooth 36F further enters the pipe outer peripheral surface 10A (as shown in FIG. 29).

As shown in FIGS. 28 and 29, the tilt part 75 (see FIG. 23) forms a tiny gap from the intermediate gentle slope tapered part 17B (in a non-contacting state).

Figure 30:
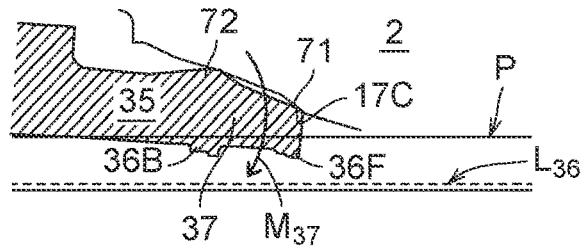
FIG. 30 is a principal part enlarged explanatory sectional view for explaining the motion of the tip head sequentially.

Next, as shown in FIG. 30, a two-point contact state is produced in which the first convex part 71 and the second convex part 72 abut on the tapered section 17 of the cap nut 2. In the two-point contact state in which the first convex part 71 on the front side abuts on the intermediate steep slope tapered part 17C and the second convex part 72 on the back side abuts on the intermediate gentle slope tapered part 17B, the tip head 37 rotates to be deformed as shown by an arrow $M_{37}$.

After the first squeezing step shown in FIG. 27, a second squeezing step shown in FIG. 30 is performed. In FIG. 30, the front tooth 36F makes sinking motion while rotating to as much as 2° to 2.5° degrees.

Figure 31:
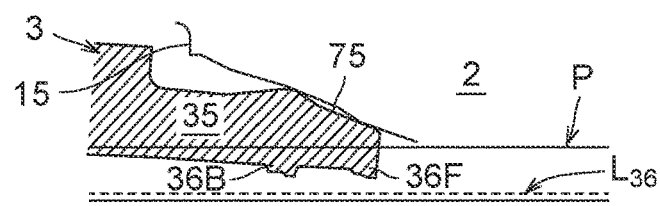
FIG. 31 is a principal part enlarged explanatory sectional view for explaining the motion of the tip head sequentially.
Figure 32:
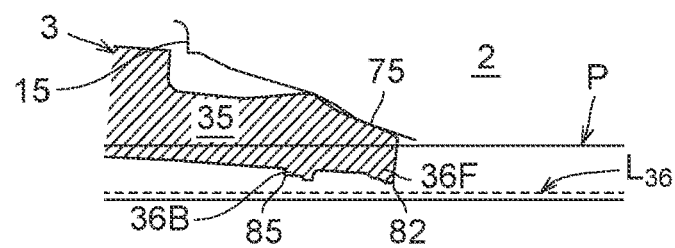
FIG. 32 is a principal part enlarged explanatory sectional view for explaining the motion of the tip head sequentially.
Figure 33:
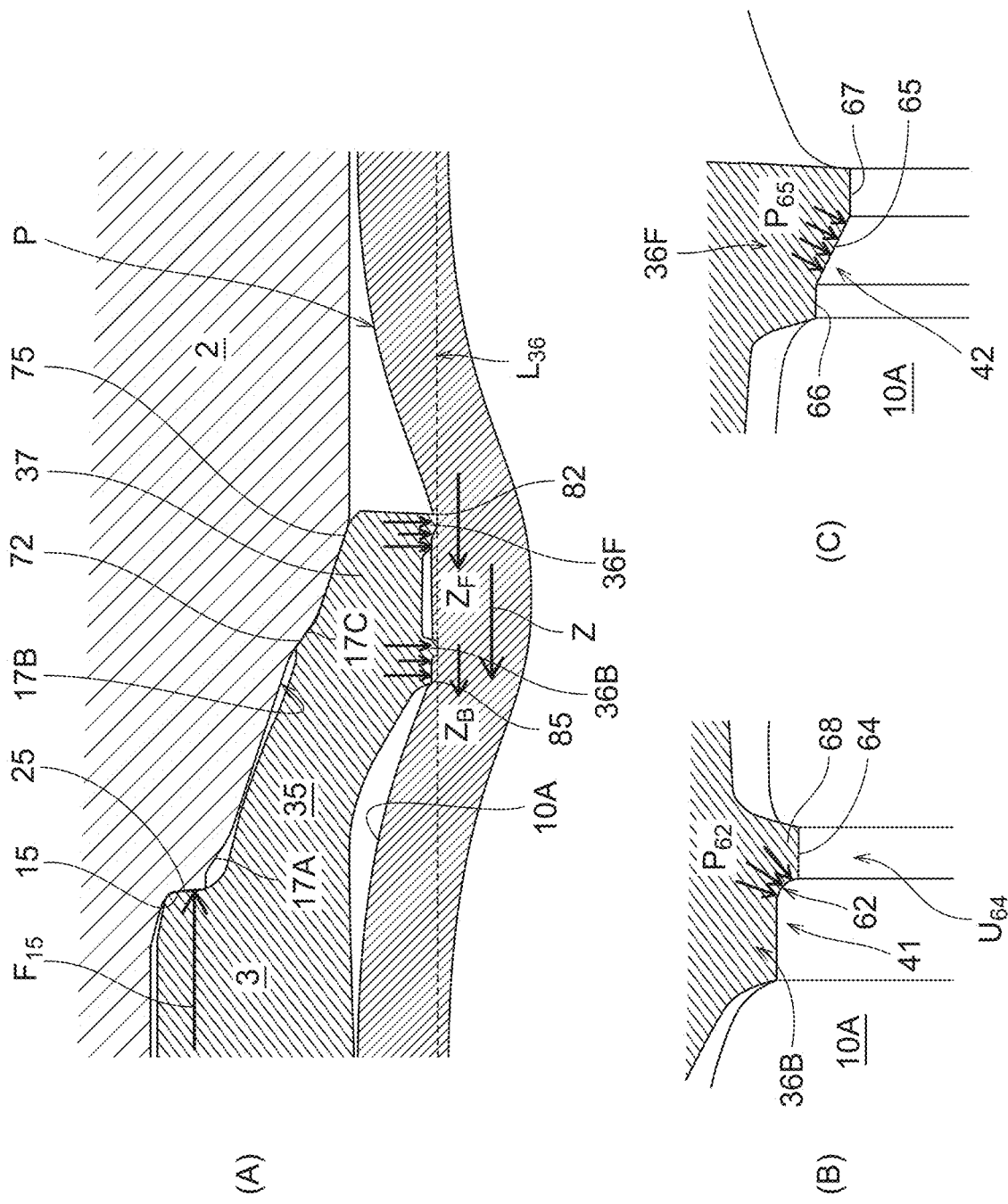
FIG. 33 is an explanatory view showing a tightly pressure-contacting state including a principal part enlarged explanatory sectional view (A), a partially non-sectional explanatory view (B) showing a principal part of (A) in a still enlarged manner, and a partially non-sectional explanatory view (C) showing a principal part of (A) in a still enlarged manner.

Next, as shown in FIGS. 31 to 32, the tilt part 75 of the tip head 37 is placed in a posture adapted to the tip gentle slope tapered part 17D. In the latter half of such compression, the compression proceeds mainly at the front tooth 36F.

Then, as shown in FIG. 33, the stepped part 25 of the stop ring 3 comes to abut on the stepped section 15 of the cap nut 2 to complete the connection work. Specifically, in a tightening finished state of the cap nut 2, the stepped part 25 composed of the tip surface of the base short cylindrical part 50 of the stop ring 3 and the stepped section 15 of the hole part 11 of the cap nut 2 abut on each other to allow a worker to detect increase in resistance to the threaded movement of the cap nut 2.

While the working steps have been described sequentially on the basis of FIGS. 26 to 33, the present invention can be considered as follows. The dimension, shape, and structure of each part are determined in such a manner as to perform the first squeezing step in which the tip head 37 enters the tapered section 17 with reduced-diameter tip while slidably contacting the tapered section 17 in response to threaded movement of the cap nut 2 to press the second convex part 72 radially inwardly with the base-end steep slope tapered part 17A, thereby pressing the back tooth 36B against the outer peripheral surface 10A of the pipe P. and the subsequent second squeezing step in which the first convex part 71 is pressed radially inwardly with the intermediate steep slope tapered part 17C, thereby pressing the front tooth 36F against the outer peripheral surface 10A of the pipe P.

As shown in FIG. 33, in the tightly pressure-contacting state, the anterior half side part 64 of the first tip side 41 of the back tooth 36B (see FIG. 24(D)) and the anterior half side part 67 of the second tip side 42 of the front tooth 36F (see FIG. 25(D)) are at an equal distance from the axis $L_P$ of the pipe P.

Specifically, the dashed line $L_{36}$ shown in FIG. 33 shows the equal radius (equal distance) from the axis $L_P$ of the pipe P, and the anterior half side part 64 and the anterior half side part 67 (see FIGS. 24(D) and 25(D)) are sunk (bite) into the pipe outer peripheral surface 10A along the dashed line $L_{36}$.

As described above, by setting the shape of the outer peripheral surface of the tip head 37 and setting the slope angle and axial direction position (dimension) of the tapered section 17 with reduced-diameter tip appropriately, the anterior half side part 64 of the back tooth 36B (see FIG. 24(D)) and the anterior half side part 67 of the front tooth 36F (see FIG. 25(D)) are sunk, specifically, bite into the same depth in the tightly pressure-contacting state in such a manner as to be located at the equal distance $L_{36}$ from the pipe axis $L_P$.

Operation and function in the tightly pressure-contacting state will be described below on the basis of FIGS. 24(D), 25(D), 33(A), 33(B), and 33(C).

Assuming that the pipe P receives external force (rotation torque) in the tightly pressure-contacting state to rotate about the axis $L_P$ thereof, the anterior half side part 64 of the back tooth 36B forms a closed annular small recessed peripheral groove $U_{64}$ at the pipe outer peripheral surface 10A as shown in the enlarged view of FIG. 33(B). The closed annular small recessed peripheral groove $U_{64}$ functions as a guide groove (rail groove).

A small projecting strip 68 functions as what is called a rail to restrict the rotation of the pipe P so as to locate the small recessed peripheral groove $U_{64}$ on a plane perpendicular to the pipe axis $L_P$. Specifically, the rotation of the pipe P is restricted so as not to cause meandering rotation or spiral rotation.

As described above, even if the pipe P rotates, the engagement between the small projecting strip 68 and the small recessed peripheral groove $U_{64}$ prevents (suppresses) the meandering rotation and spiral rotation of the pipe P, making it possible to prevent sealing break.

As shown in FIG. 33(B), further, contact of the curved intermediate level difference part 62 with a small projecting corner of the pipe outer peripheral surface 10A under pressure (see arrows $P_{62}$) strongly prevents the pipe P from coming off, specifically, from moving axially outwardly due to inner pressure, for example.

In particular, a sealing (hermetic) function is exerted by the generation of a high surface pressure indicated by the arrows $P_{62}$ at the curved intermediate level difference part 62 on the back side surface of the small projecting strip 68.

Next, as shown in FIGS. 33(A) and 33(C), in the foregoing tightly pressure-contacting state, the second tip side 42 of the front tooth 36F tightly contacts the outer peripheral surface 10A under pressure in a polygonal line shape. Referring to FIG. 19, if external force acting in a bending direction is received in an area rightward of the pipe P and beyond the range of the drawing, the front tooth 36F in the foregoing tightly pressure-contacting state in a polygonal line shape is mainly responsible for a pipe extraction preventing function of preventing the pipe P from coming off (toward the right of this drawing). In FIG. 33(C), arrows $P_{65}$ show "surface pressure" indicating that the slope surface 65 tightly contacts the pipe outer peripheral surface 10A under pressure.

Like FIG. 33(B), FIG. 33(C) shows a non-sectional view of the pipe P.

In each of the sectional shapes shown in FIGS. 25(A), 25(B), and 25(C), the second tip side 42 is desirably formed into a shape sloping upward toward the front (rising in a direction toward the edge 82) (not shown in the drawings). Specifically, the second tip side 42 of the shape sloping upward toward the front increases the operation and effect of preventing coming off of the pipe P.

As shown in FIGS. 33(B) and 33(C), the back tooth 36B and the front tooth 36F provided with the anterior half side parts 64 and 67 respectively having small widths make it possible to solve the problem (ii) described above by referring to FIG. 50. Specifically, this achieves the advantage of facilitating biting into the outer peripheral surface 10A of the pipe P. Additionally, the curved intermediate level difference part 62 of the back tooth 36B and the slope surface 65 of the front tooth 36F shown in FIGS. 33(B) and 33(C) exert an excellent sealing function (performance). Furthermore, on the occurrence of unintentional rotation of the pipe P, the small projecting strip 68 at the back tooth 36B is guided along the small recessed peripheral groove $U_{64}$ of the pipe P to achieve improvement of the sealing performance.

Additionally, the front tooth 36F of a polygonal line shape functions to block (prevent) movement in the pipe extracting direction, thereby avoiding influence on the back tooth 36B. Furthermore, even on the occurrence of bending of the pipe P, the front tooth 36F exerts strong force of preventing the extraction while the back tooth 36B effectively prevents spiral rotation or meandering rotation even on the occurrence of rotation of the pipe P. Also, on the occurrence of internal pressure acting on the pipe P, the surface pressure $P_{62}$ is increased to cause the curved intermediate level difference part 62 to exert both hermetic action and a pipe extraction preventing function.

As described above, the configuration of the third embodiment of the present invention can be said to exert the function of preventing extraction of the pipe P and the sealing function sufficiently by causing the back tooth 36B and the front tooth 36F to work cooperatively.

Figure 34:
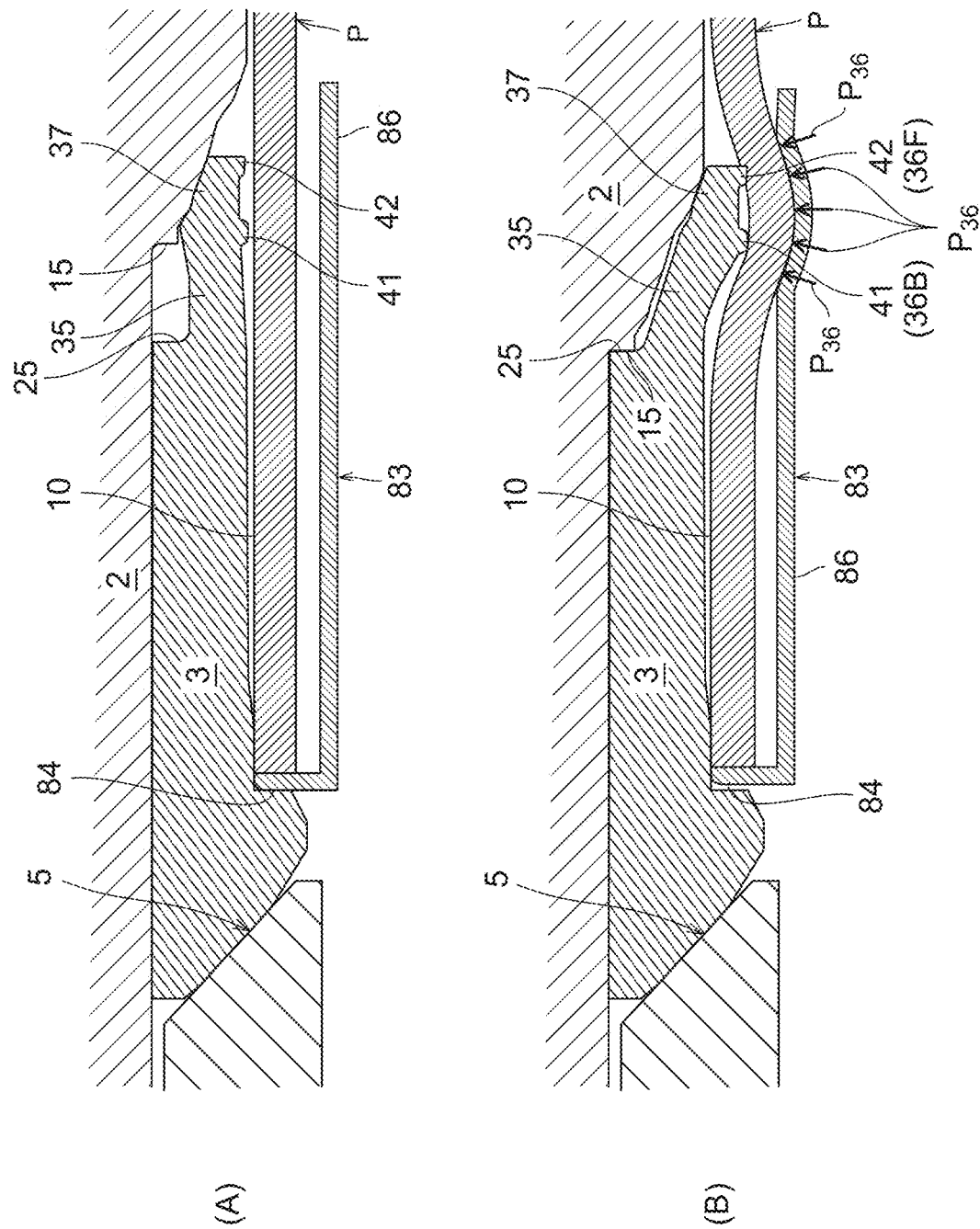
FIG. 34 is a view showing another example including a principal part enlarged sectional view (A) of an initially set state (of the tip head) and a principal part enlarged sectional view (B) showing a tightly pressure-contacting state.

A modification shown in FIG. 34 will be described next. A support incore 83 is provided. Specifically, the incore 83 includes a cylindrical part 86 having one end provided with an outer flange 84. The states of FIGS. 19 and 20 correspond to the states of FIGS. 34(A) and 34(B) respectively. A sign given to a structure same as that given to a corresponding structure of the embodiment described by referring to FIGS. 19 to 33 means that these structures function in the same way. The incore 83 works effectively if the pipe P has a small thickness dimension (if the pipe P is thin). A material of the incore 83 is SUS or Cu.

As described above in detail, according to the third embodiment of the present invention shown in FIGS. 19 to 34, a pipe joint includes: the flare joint body 1 including the male screw part 9 and the slope surface 5 with reduced-diameter tip; the cap nut 2 including the female screw part 12 threadedly attached to the male screw part 9 and provided at a base end of the hole part 11, and the housing space part E with the constant diameter section 14, the stepped section 15, and the tapered section 17 with reduced-diameter tip provided at an intermediate area of the hole part 11; and the stop ring 3 fitted in the housing space part E, including the base-end pressure-contacting slope surface 32 contacting the slope surface 5 with reduced-diameter tip under pressure, and having a tip provided with the plastically-deformable and substantially cylindrical thin part 35 and the pipe extraction preventing tooth part 36 formed at the tip head 37 of the substantially cylindrical thin part 35. In this pipe joint, the tooth part 36 includes the back tooth 36B and the front tooth 36F arranged at the tiny interval $W_{36}$, as the cap nut 2 threadedly moves forward, the first tip side 41 of the back tooth 36B and the second tip side 42 of the front tooth 36F of the stop ring 3 come into a state of tightly contacting the outer peripheral surface 10A of the straight tip part 10 of the connection target pipe P under pressure to generate the pipe extraction resistance Z, the stop ring 3 includes the base inner diameter part 28 to which the pipe P is to be inserted and the base outer diameter part 24 fitted in the housing space part E of the cap nut 2, and, with the thickness dimension of the base short cylindrical part 50 defined by the base inner diameter part 28 and the base outer diameter part 24 called $T_{50}$ and with an average thickness dimension of the substantially cylindrical thin part 35 called $T_{35}$, a relational expression of $0.40 \cdot T_{50} \le T_{35} \le 0.75 \cdot T_{30}$ is established. Thus, the stop ring 3 does not rotate together with the cap nut 2 as the cap nut 2 threadedly moves forward but the stop ring 3 continues to be at standstill integrally with the pipe P. This makes it possible to prevent the occurrence of relative slip between the slope surface 5 of the joint body 1 and the pressure-contacting slope surface 32. It becomes possible to omit the "preliminary working" requiring a specific jig described as the unsettled problem (i) of the conventional pipe joint (shown in FIG. 50).

In response to this, working efficiency at a pipe connection site is improved dramatically.

Furthermore, resistance to pipe extraction is generated in the double tightly pressure-contacting state of the back tooth 36B and the front tooth 36F and is thus sufficiently strong. Additionally, this double pressure-contacting state makes it possible to prevent the rotation of the pipe P about its axis more reliably than the pawl 61 having a triangular section of the conventional pipe joint (shown in FIG. 50). In particular, the average thickness dimension $T_{35}$ of the substantially cylindrical thin part 35 corresponds to 40 to 75% of the thickness dimension $T_{50}$ of the base short cylindrical part 50 and is sufficiently large. This allows the back tooth 36B and the front tooth 36F at the tip of the substantially cylindrical thin part 35 to tightly contact the pipe outer peripheral surface 10A under pressure with strength equal to or greater than that of the pipe P. Additionally, despite the sufficient largeness of the thickness dimension $T_{35}$ of the substantially cylindrical thin part 35, it has been clearly shown (from a result of experiment) that it is still possible to control rotation torque of the cap nut 2 for its threaded movement sufficiently low. Regarding metal sealing performance, it can be maintained sufficiently high as a result of the double sealing using the back tooth 36B and the front tooth 36F.

According to the present invention, a pipe joint includes: the flare joint body 1 including the male screw part 9 and the slope surface 5 with reduced-diameter tip; the cap nut 2 including the female screw part 12 threadedly attached to the male screw part 9 and provided at a base end of the hole part 11, and the housing space part E with the constant diameter section 14, the stepped section 15, and the tapered section 17 with reduced-diameter tip provided at an intermediate area of the hole part 11; and the stop ring 3 fitted in the housing space part E, including the base-end pressure-contacting slope surface 32 contacting the slope surface 5 with reduced-diameter tip under pressure, and having a tip provided with the plastically-deformable and substantially cylindrical thin part 35 and the pipe extraction preventing tooth part 36 formed at the tip head 37 of the substantially cylindrical thin part 35. In this pipe joint, the tooth part 36 includes the back tooth 36B and the front tooth 36F arranged at the tiny interval $W_{36}$, the back tooth 36B has a substantially trapezoidal sectional shape and the first tip side 41 composed of the upper side of the substantially trapezoidal shape includes the short posterior half side part 63 and the tall anterior half side part 64 defined across the curved intermediate level difference part 62, and the front tooth 36F has a substantially trapezoidal sectional shape and the second tip side 42 composed of the upper side of the substantially trapezoidal shape has a polygonal line shape with the short posterior half side part 66 and the tall anterior half side part 67 defined across the slope surface 65 sloping downward and backward. Thus, if a fluid to be hermetically sealed is gas such as a coolant, the double sealing function is exerted to obtain high hermetic performance stably. The slope surface 65 and the tall anterior half side part 67 of the front tooth 36F easily bite (are sunk) into the outer peripheral surface 10A of the pipe P to prevent coming off of the pipe P reliably. In particular, the slope surface 65 functions to prevent coming off of the pipe P reliably while bending force acts on the pipe P to generate the force of extracting the pipe P in the vicinity of the pipe joint.

Even if the pipe P rotates, the back tooth 36B is sunk into the pipe outer peripheral surface 10A while the tall anterior half side part 64 forms the small projecting strip 68 to form the small recessed peripheral groove $U_{64}$. This achieves guidance for reducing or preventing spiral rotation or meandering rotation of the pipe P to maintain high hermetic performance.

As the cap nut 2 threadedly moves forward, the first tip side 41 of the back tooth 36B and the second tip side 42 of the front tooth 36F of the stop ring 3 come into a state of tightly contacting the outer peripheral surface 10A of the straight tip part 10 of the connection target pipe P under pressure to generate the pipe extraction resistance Z, and in the tightly pressure-contacting state, the first tip side 41 of the back tooth 36B and the second tip side 42 of the front tooth 36F contact the outer peripheral surface 10A of the pipe P under pressure in such a manner as to bite into the outer peripheral surface 10A, thereby exerting a double sealing function. This configuration makes it possible to exert high hermetic performance stably if a fluid to be sealed is a "coolant."

The double sealing function is exerted in the tightly pressure-contacting state to omit a sealing member from the inner peripheral surface and the outer peripheral surface of the stop ring 3. This configuration makes a costly sealing member particularly for resistance to a coolant omissible while making it possible to maintain hermetic performance for a long time to make burdensome work omissible for forming a concave groove for sealing at the stop ring 3.

Even if the pipe P rotates about its axis $L_P$ in the foregoing tightly pressure-contacting state, the anterior half side part 64 of the first tip side 41 of the back tooth 36B bites into the outer peripheral surface 10A of the pipe P in such a manner as to form the closed annular small recessed peripheral groove $U_{64}$ to prevent meandering or spiral rotation of the pipe P. Furthermore, the curved intermediate level difference part 62 of the first tip side 41 contacts the back side surface of the small recessed peripheral groove $U_{64}$ under pressure to exert a sealing function. In this configuration, the sealing function by the curved intermediate level difference part 62 can also be maintained constantly favorably (without being unstable).

While the back tooth 36B and the front tooth 36F are in the state of tightly contacting the outer peripheral surface 10A of the pipe P under pressure, the front tooth 36F takes on the pipe extraction resistance Z greater than the pipe extraction resistance $Z_B$ taken on by the back tooth 36B, and the front tooth 36F is responsible for a pipe extraction preventing function of preventing the pipe P from coming off in response to receipt of external force in a bending direction using the second tip side 42 of the front tooth 36F tightly contacting the outer peripheral surface 10A under pressure in the polygonal line shape. In this configuration, the front tooth 36F prevents extraction of the pipe P even if the pipe P is in a bent state and maintains the back tooth 36B so as to always exert a favorable hermetic function. In this way, the front tooth 36F works cooperatively with the back tooth 36B to maintain high pipe extraction resistance and high hermetic performance stably.

In the tightly pressure-contacting state, the back tooth 36B and the front tooth 36F are configured to bite into the outer peripheral surface 10A of the pipe P to the same depth in such a manner that the first tip side 41 and the second tip side 42 are at the equal distance $L_{36}$ from the axis $L_P$ of the pipe P. Thus, (as shown in FIG. 33,) the back tooth 36B and the front tooth 36F are allowed to work cooperatively in the most well-balanced manner to exert high pipe extraction resistance and high hermetic (sealing) performance.

At the hole part 11 of the cap nut 2, the tapered section 17 with reduced-diameter tip is defined by the base-end steep slope tapered part 17A, the intermediate gentle slope tapered part 17B, the intermediate steep slope tapered part 17C, and the tip gentle slope tapered part 17D. In this configuration, as described above by referring to FIGS. 26 to 33 sequentially, the back tooth 36B and the front tooth 36F are to bite (to be squeezed) into the pipe outer peripheral surface 10A with a time difference therebetween to allow compression successfully. Furthermore, even with the relatively large average thickness dimension $T_{35}$ and the small (short) axial direction dimension of the substantially cylindrical thin part 35, it is still possible to make a smooth shift to the final tightly pressure-contacting state shown in FIG. 33 in response to the threaded movement of the cap nut 2. In particular, in the steps shown in FIGS. 26 to 28 in the first half, the compression proceeds mainly at the back tooth 36B. In the last half shown in FIGS. 29 to 31, the rotation and deformation of the tip head 37 in the direction of the arrow $M_{37}$ allows implementation of the compression mainly at the front tooth 36F. As a result, as shown in FIG. 33, the back tooth 36B and the front tooth 36F are allowed to bite into the pipe outer peripheral surface 10A equally.

Furthermore, as the base-end steep slope tapered part 17A and the intermediate steep slope tapered part 17C are provided separately, the step of entirely pressing the stop ring 3 axially inwardly can be performed separately as two or more steps. The step of pressing the stop ring 3 causes the pressure-contacting slope surface 32 to closely contact the slope surface 5 with reduced-diameter tip of the joint body 1 to establish metal sealing (pressure contact). While the back tooth 36B and the front tooth 36F are compressed little by little sequentially into the pipe outer peripheral surface 10A, the metal sealing (pressure contact) is reinforced little by little.

The foregoing description can mean that it is possible to perform operations at two sites differing each other in the axial direction, specifically, perform the operation of compression and the operation of metal sealing (pressure contact) using the back tooth 36B and the front tooth 36F simultaneously in a well-balance manner.

The presence of the base-end steep slope tapered part 17A allows reduction in the total number of times the cap nut 2 rotates. Specifically, the back tooth 36B and the front tooth 36F do not contact the pipe P immediately after start of the compression of the cylindrical part 35 shown in FIG. 26. This can reduce the rotation torque of the cap nut 2. Compressing the cylindrical part 35 rapidly at this time using the base-end steep slope tapered part 17A is considered to be rational as it allows reduction in the total number of times the cap nut 2 rotates.

At the hole part 11 of the cap nut 2, the tapered section 17 with reduced-diameter tip is defined by the base-end steep slope tapered part 17A, the intermediate gentle slope tapered part 17B, the intermediate steep slope tapered part 17C, and the tip gentle slope tapered part 17D, the tip head 37 of the substantially cylindrical thin part 35 includes the first convex part 71 composed of an extreme tip outer peripheral corner and the second convex part 72 of a low triangular bulging shape formed at an axial direction position corresponding to an axial direction position of the back tooth 36B and formed at the outer periphery of the tip head 37, and the first squeezing step and the subsequent second squeezing step are performed. In the first squeezing step, the tip head 37 enters the tapered section 17 with reduced-diameter tip while slidably contacting the tapered section 17 in response to the threaded movement of the cap nut 2 to press the second convex part 72 radially inwardly with the base-end steep slope tapered part 17A, thereby pressing the back tooth 36B against the outer peripheral surface 10A of the pipe P. In the second squeezing step, the first convex part 71 is pressed radially inwardly with the intermediate steep slope tapered part 17C, thereby pressing the front tooth 36F against the outer peripheral surface 10A of the pipe P. In this configuration, the back tooth 36B and the front tooth 36F can be squeezed (compressed) successfully for the first time and for the second time with a time difference therebetween. Furthermore, even with the relatively large average thickness dimension $T_{35}$ and the small axial direction dimension of the substantially cylindrical thin part 35, it is still possible to make a smooth shift to the tightly pressure-contacting state shown in FIG. 33 in response to the threaded movement of the cap nut 2.

In particular, in the first squeezing step in the first half (shown in FIGS. 26 to 28), the squeezing proceeds mainly at the back tooth 36B. In the second squeezing step in the last half (shown in FIGS. 29 to 31), the squeezing proceeds mainly at the front tooth 36F. As a result, as shown in FIG. 33, the back tooth 36B and the front tooth 36F are allowed to bite (to be sunk) equally (to the radial direction depth position indicated by the dashed line $L_{35}$).

As the compression proceeds in two separate steps including the first squeezing step and the second squeezing step, it becomes possible to reduce rotation torque of a work tool (the rotation torque can be applied equally) used for tightening the cap nut 2.

Additionally, the pressure-contacting slope surface 32 of the stop ring 3 closely contacts the slope surface 5 with reduced-diameter tip of the joint body 1 to establish metal sealing (pressure contact). At this time, this metal sealing (pressure contact) is advantageously reinforced little by little in two separate stages without being established rapidly at one time.

In other words, a time difference is provided between the first squeezing step and the second squeezing step, so that each of the operation of squeezing the back tooth 36B and the front tooth 36F and the operation of establishing metal sealing (pressure contact) using the pressure-contacting slope surface 32 and the slope surface 5 proceeds separately in two stages while these operations are performed simultaneously in a well-balance manner. By doing so, as shown in FIG. 33, the back tooth 36B and the front tooth 36F are squeezed equally to the same depth indicated by the dashed line $L_{36}$. This makes it possible to exert large pipe extraction resistance ($Z_B+Z_F$) and to exert excellent hermetic performance on a coolant, for example, using double sealing by means of metal touch.

In a tightening finished state of the cap nut 2, the stepped part 25 composed of the tip surface of the base short cylindrical part 50 of the stop ring 3 and the stepped section 15 of the hole part 11 of the cap nut 2 abut on each other to allow a worker to detect increase in resistance to the threaded movement of the cap nut 2. This produces an advantage that tightening torque of a work tool such as a spanner or a wrench is increased rapidly to allow detection of finish of the work (finish of the connection work). In FIG. 33, an arrow $F_{15}$ indicates a vector of force generated at a moment when the stepped part 25 abuts on the stepped section 15.

The support incore 83 is provided that supports the tip part 10 of the pipe P from an inner peripheral side while the back tooth 36B and the front tooth 36F of the stop ring 3 are in the state of tightly contacting the outer peripheral surface 10A of the pipe P under pressure. If the pipe P is a soft metallic material or if the pipe P is subjected to large fluctuations in outer diameter dimension or thickness dimension as a result of overseas standards, for example, the incore 83 is squeezed into the back tooth 36B and the front tooth 36F, making it possible to support the pipe P in such a manner as to prevent the pipe P from being deformed excessively radially inwardly, as indicated by arrows $P_{36}$ in FIG. 34(B).

In other words, if the pipe P is soft or if a large difference is generated in dimensional tolerance or in outer diameter dimension of the pipe P, or in the pipe thickness dimension itself (as a result of differences in standard between countries, for example), the support incore 83 is used to make the pipe joint having the configuration of the present invention available.

A fourth embodiment of the present invention will be described next using FIGS. 35 to 48.

As shown in FIGS. 35 to 48, a pipe joint J includes a joint body 1 and a cap nut 2. A pipe P has a tip having the same shape as those of the first, second, and third embodiments.

This joint body 1 in its entirety has a straight shape and a flow path hole 6 is formed along an axis to pass through the joint body 1. A grasping part 1A having a hexagonal shape is provided at a center position in an axial direction for holding a work tool such as a spanner, and connection tubes 7, 7 are provided continuously with the grasping part 1A in the right and left sides of the axial direction. A male screw part 9 is formed at the outer peripheral surface of each connection tube 7. Two cap nuts 2, 2 are configured to be threadedly attached to the corresponding ones of the right and left male screw parts 9, 9.

Figure 38:
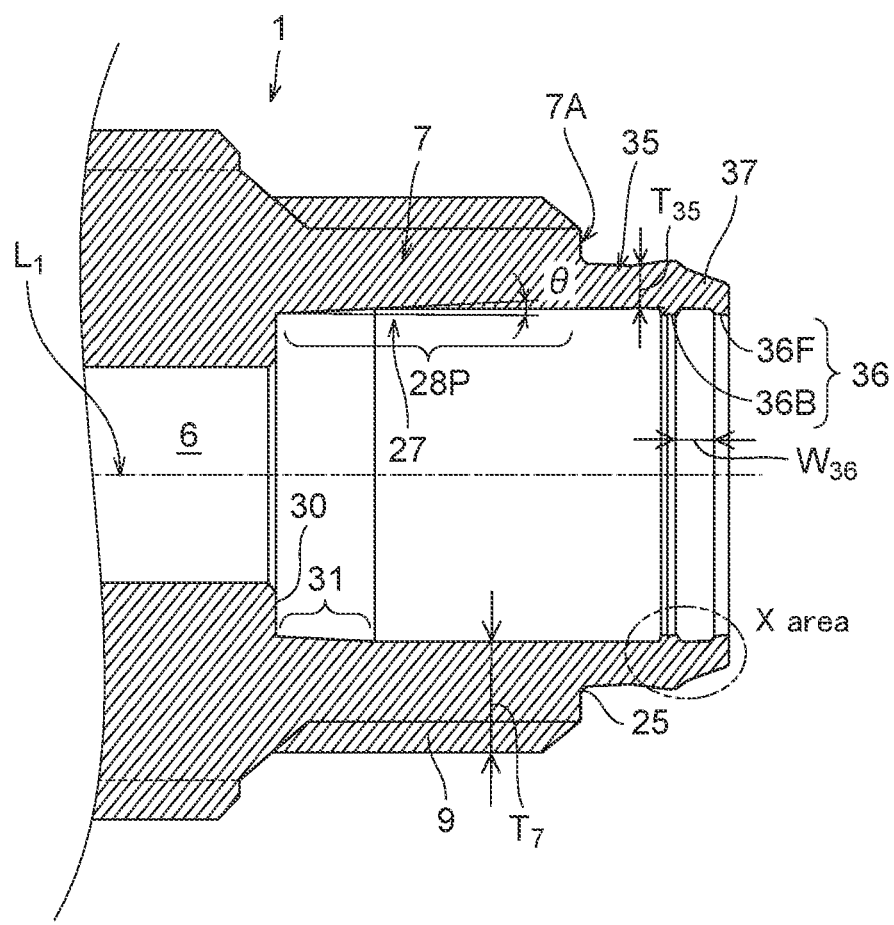
FIG. 38 is a sectional view of a joint body according to an example.

As shown in FIGS. 37 and 38, a substantially cylindrical thin part 35 extends integrally from a tip surface 7A of the connection tube 7. In other words, the joint body 1 includes the connection tube 7 having the outer peripheral surface provided with the male screw part 9, and the substantially cylindrical thin part 35 formed continuously at a tip side (across the tip surface 7A as a stepped part).

The flow path hole (hole part) 6 includes a stepped part 30 and has larger diameters at right and left outer portions than a base diameter at the center. The pipe P is inserted into the stepped part 30 (or into the vicinity of the stepped part 30). In this way, a pipe insertion hole part 28P having a (slightly) large diameter is defined by the stepped part 30. (As a preceding description), by using the pipe insertion hole part 28P, a back portion 31 is formed into a tapered shape with diameter reduced backward so as to cause a pipe outer peripheral surface 10A to contact an inner peripheral surface 27 of the hole part 28P under pressure in a pipe insertion finished state (see FIG. 36).

Figure 39:
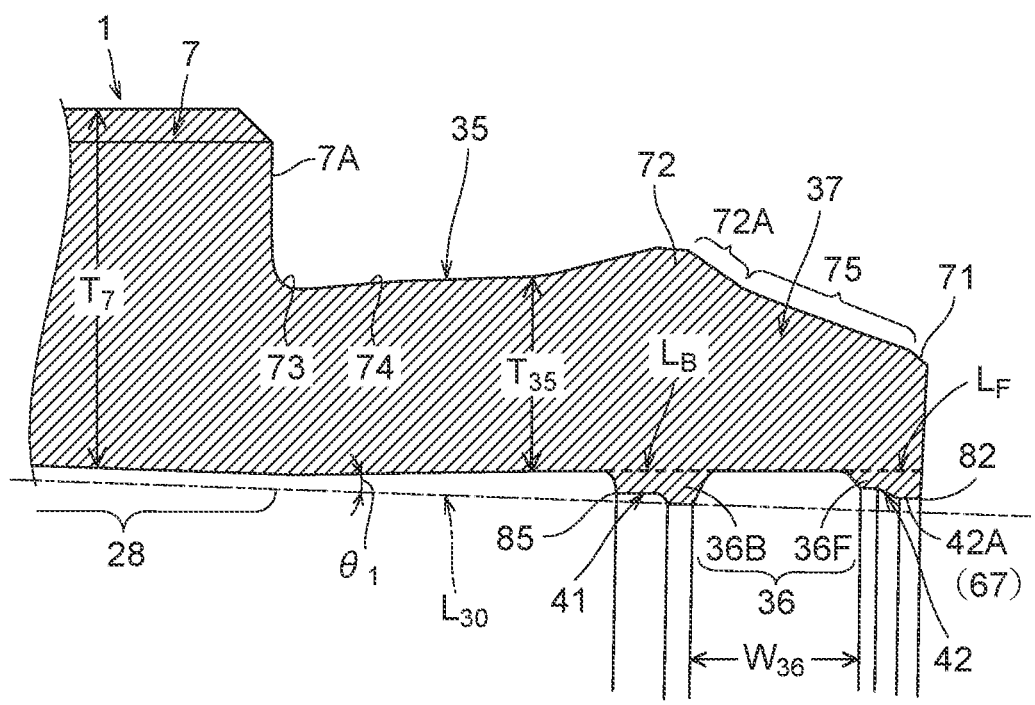
FIG. 39 is a principal part enlarged sectional view of the joint body.

As shown in FIG. 38, an inner diameter dimension at a base end of the substantially cylindrical thin part 35 agrees with an inner diameter dimension at a tip of the pipe insertion hole part 28P, and the inner peripheral surface of the substantially cylindrical thin part 35 has a tapered shape increased gently in diameter toward the tip (see an angle θ1 in FIG. 39).

Additionally, an extraction preventing tooth part 36 is provided at an inner peripheral surface of a tip head 37 of the substantially cylindrical thin part 35. As shown in an enlarged sectional view in FIG. 39, the tooth part 36 includes a back tooth 36B and a front tooth 36F arranged at a tiny interval $W_3$.

As described above, the joint body 1 itself according to the present invention includes the extraction preventing tooth part 36, namely, the back tooth 36B and the front tooth 36F as an integral part to exert pipe extraction resistance.

Figure 35:
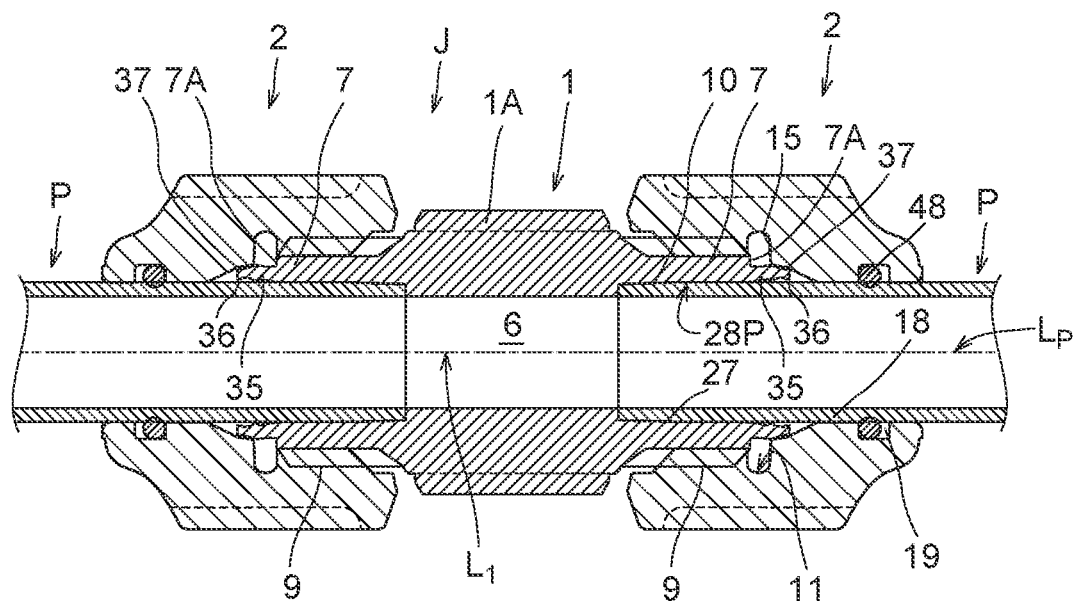
FIG. 35 is a sectional view showing a fourth embodiment of the present invention and showing a state in which pipe connection work is being done.
Figure 36:
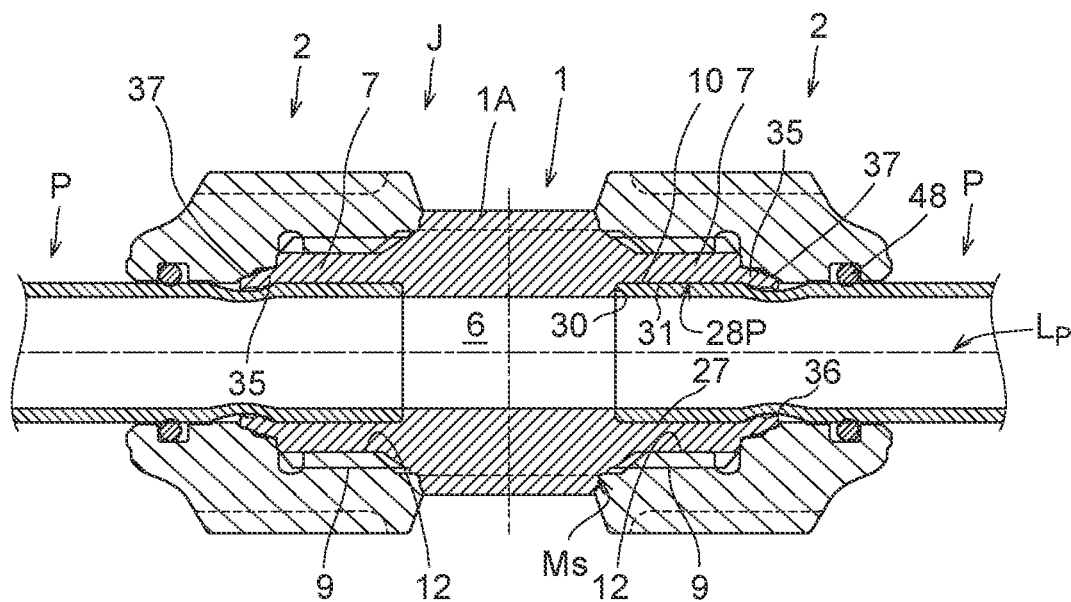
FIG. 36 is a sectional view showing a pipe connection finished state.

While the entire shape shown in FIGS. 35 and 36 is a straight shape, it may be determined freely and may be a T-shape, a Y-shape, an X shape, or an elbow shape, for example. The substantially cylindrical thin part 35 is provided at each of both ends for connection in the illustrations of FIGS. 35 and 36. As an option, this specific substantially cylindrical thin part 35 may be provided only at one of the ends and the other end may be configured as a connection structure with a taper male screw, a parallel female screw, or a tubular part for welding, for example.

As shown in FIGS. 35 to 37, the cap nut 2 includes a hole part 11 provided in an axial direction. The hole part 11 has a base end provided with a female screw part 12 to which the male screw part 9 is threadedly attached. The hole part 11 includes a clearance groove 13 having a small width dimension, a stepped section 15, a short straight section 16 having a small width dimension $W_{16}$, a tapered section 17 with reduced-diameter tip, and a straight section 18 (having an inner diameter dimension slightly greater than the outer diameter of the connection target pipe P) that are formed sequentially from the female screw part 12 toward the tip. In some cases, the short straight section 16 is omissible (in a short-diameter shape).

The straight section 18 is provided with a concave groove 19 to which a seal 48 such as an O-ring is fitted. A metal seal Ms (see FIG. 36) is formed by establishing pressure contact of metals between a base end portion of the cap nut 2 and the vicinity of a tip surface of the grasping part 1A of the joint body 1 while the cap nut 2 is threadedly attached, thereby omitting a sealing member. The material of the cap nut 2 is yellow copper (brass) or aluminum.

The configuration of the tapered section 17 with reduced-diameter tip is as follows. Specifically, as shown in FIG. 37(B), the tapered section 17 with reduced-diameter tip is defined by a base-end steep slope tapered part 17A, an intermediate gentle slope tapered part 17B, an intermediate steep slope tapered part 17C, a tip gentle slope tapered part 17D, etc.

The base-end steep slope tapered part 17A and the intermediate steep slope tapered part 17C are set to slope (tilt) angles equal to each other. These steep slope tapered parts 17A and 17C are also set to width dimensions equal to each other.

As clearly seen from FIG. 37(B), the intermediate gentle slope tapered part 17B is set to a slope (tilt) angle equal to the value of the slope (tilt) angle of the tip gentle slope tapered part 17D, or the slope (tilt) angle of the latter tapered part 17D is set to be slightly greater. Additionally, the latter tapered part 17D has a smaller width dimension.

In FIGS. 38(A) and 39, an average thickness dimension of the substantially cylindrical thin part 35 is called $T_{35}$ and an average thickness dimension of the connection tube 7 is called $T_7$. Then, the thickness dimension $T_{35}$ of the substantially cylindrical thin part 35 is set to a relatively large thickness so as to establish the following: $0.40 \cdot T_7 \leq T_{35} \leq 0.75 \cdot T_7$ (formula 4).

In FIG. 39, the average thickness dimension $T_{35}$ is calculated while the front tooth 36F and the back tooth 36B partitioned by dotted lines $L_F$ and $L_B$ are excluded from the calculation. Furthermore, as the connection tube 7 includes the male screw part (crests and roots) formed at its outer periphery, different thickness dimensions thereof are defined at positions in an axis (axial) direction. The average thickness dimension $T_7$ is determined by calculating an average of these thickness dimensions.

As described above, according to the present invention, the average thickness dimension $T_{35}$ of the substantially cylindrical thin part 35 is set to a sufficiently large dimension, which is from 40 to 75% of the thickness dimension $T_7$ of the connection tube 7.

Preferably, $T_{35}$ is set as follows: $0.43 \cdot T_7 \leq T_{35} \leq 0.65 \cdot T_7$ (formula 5).

More desirably, $T_{35}$ is set as follows: $0.45 \cdot T_7 \leq T_{35} \leq 0.55 \cdot T_7$ (formula 6).

In each of the foregoing formulas, being less than the lower limit value makes it difficult for the substantially cylindrical thin part 35 to withstand an inner pressure. Conversely, exceeding the upper limit value makes a level difference dimension of the tip surface 7A (of a shape like a step) excessively small, making it difficult for a worker to detect increase in resistance to threaded movement of the cap nut 2 (described later). Being less than the lower limit value or exceeding the upper limit value also prevents the tip head 37 from biting (being compressed) into the outer peripheral surface 10A of the pipe P reliably and smoothly, as shown in FIGS. 40 to 47 (described later).

As shown in FIGS. 38 and 39, the tooth part 36 includes the back tooth 36B and the front tooth 36F arranged at the tiny interval $W_{36}$. The sectional shapes of the back tooth 36B and the front tooth 36F are the same as those of the third embodiment described above and are the same as those illustrated in FIGS. 24 and 25.

As shown in FIGS. 24(D) and 39, the sectional shape of the back tooth 36B is a substantially trapezoidal shape, and a first tip side 41 composed of an upper side of the substantially trapezoidal shape includes a short posterior half side part 63 and a tall anterior half side part 64 defined across a curved intermediate level difference part 62.

In another case, the sectional shape of the back tooth 36B is a trapezoidal or substantially trapezoidal shape with a linear first tip side 41 as an upper side (see FIGS. 24(A), 24(B), and 24(C)). FIG. 24 can be seen as an enlarged view showing the back tooth 36B in an area X in FIG. 38 in an enlarged manner.

FIG. 24(A) illustrates a case where the sectional shape of the back tooth 36B is a trapezoidal shape. FIG. 24(B) illustrates a substantially trapezoidal shape with right and left legs having recessed curved shapes. FIG. 24(C) illustrates a case where, of the right and left legs of a trapezoid, the back leg is steep and the front leg has a recessed curved shape.

As shown in FIGS. 25 and 39, the sectional shape of the front tooth 36F is a trapezoidal or substantially trapezoidal shape with a linear second tip side 42 as an upper side (see FIGS. 25(A) to 25(C)). Desirably, the linear second tip side 42 in each of FIGS. 25(A) to 25(C) has a shape gently sloping upward in the rightward direction (frontward). The reason therefor is that this allows increase in resistance to coming off of the pipe P. In another case, as shown in FIG. 25(D), the front tooth 36F desirably has a substantially trapezoidal shape with the second tip side 42 of a polygonal line shape as an upper side. Specifically, the second tip side 42 of the front tooth 36F shown in FIG. 25(D) has a polygonal line shape with a short posterior half side part 66 and a tall anterior half side part 67 defined across a slope surface 65 sloping downward and backward. (The anterior half side part 67 may also be called a tip part 42A.) FIG. 25 can be seen as an enlarged sectional view showing the front tooth 36F in the area X in FIG. 38 in an enlarged manner.

FIG. 25(A) illustrates a case where the sectional shape of the front tooth 36F is a trapezoidal shape. FIG. 25(B) illustrates a trapezoidal shape with a steep front leg. FIG. 25(C) illustrates a case where, of the right and left legs of a trapezoid, the front leg is steep and the back leg has a recessed curved shape.

In each of these cases, each of the back tooth 36B and the front tooth 36F has a sectional shape with a straight upper side or an upper side of a polygonal line shape, which can be designated as what is called a "table top mounting type."

The substantially cylindrical thin part 35 including the back tooth 36B and the front tooth 36F at the tip has a conical cylindrical shape increased in diameter toward the tip as viewed in its entirety (as already described). The first tip side 41 of the back tooth 36B and the second tip side 42 of the front tooth 36F provided at the tip of the cylindrical part 35 are formed substantially parallel to each other, and in a free state, the tip part 42A (anterior half side part 67) of the second tip side 42 of the front tooth 36F is located slightly radially outwardly from the first tip side 41 of the back tooth 36B as shown in FIG. 39. Specifically, while the first tip side 41 of the back tooth 36B abuts on a straight line $L_{30}$ parallel to an axis $L_1$ of the joint body 1 (see FIG. 38), the second tip side 42 of the front tooth 36F is located at a tiny gap from the line $L_{30}$ (see FIG. 39). In other words, while the substantially cylindrical thin part 35 is in a free state, the dimension (radius) of the second tip side 42 from a pipe axis $L_P$ is slightly greater than the corresponding dimension (radius) of the first tip side 41.

In other words, the first tip side 41 and the second tip side 42 differ from each other in dimension from the pipe axis $L_P$.

As the cap nut 2 threadedly moves forward, the substantially cylindrical thin part 35 in a free state described above deforms sequentially as shown in FIGS. 40 to 46. In FIGS. 40 to 46, the pipe P is illustrated in its original shape and original dimension without deformation in order to facilitate understanding of the deformation of the substantially cylindrical thin part 35, the position and posture of the back tooth 36B, those of the front tooth 36F, etc. FIG. 47 shows a tightly pressure-contacting state (in a finally compressed state) and particularly shows how the pipe P is deformed. As shown in FIG. 47, a dashed line $L_{36}$ shows a radial direction position, which is a virtual cylindrical surface position of the (sunk) tooth part 36 in a tightly pressure-contacting state.

With the radial direction position (virtual cylindrical surface position) indicated by the dashed line $L_{36}$ as a target reference, FIGS. 40 to 46 show how the substantially cylindrical thin part 35, the back tooth 36B, the front tooth 36F, the tip head 37, etc. are placed sequentially to their positions and postures.

As sequentially shown in FIGS. 40 to 47, the substantially cylindrical thin part 35 and the tip head 37 thereof are deformed, specifically, compressed and deformed radially inwardly. As the shape of the tapered section 17 with reduced-diameter tip has already been described by referring to FIG. 37(B), the following description is intended for the shapes of the substantially cylindrical thin part 35 and the tip head 37 thereof.

In FIG. 39, the tip head 37 includes a first convex part 71 composed of an extreme tip outer peripheral corner, and a second convex part 72 of a low triangular bulging shape formed at the same axial direction position as the axial direction position of the back tooth 36B and formed at the outer periphery of the substantially cylindrical thin part 35.

The outer peripheral surface of the substantially cylindrical thin part 35 is defined by a curved part 73 at an inner edge of the tip surface 7A, a cylindrical straight part 74 extending from the curved part 73, the low triangular bulge of the second convex part 72, and a tilt part 75 reduced in diameter toward the tip.

As clearly seen from FIG. 39, the inner peripheral surface of the substantially cylindrical thin part 35 forms a substantially conical surface increased in diameter toward the tip at a tiny slope angle $\theta 1$ (from a horizon) defined toward the tip relative to an inner diameter part 28 (see FIG. 38). The back tooth 36B and the front tooth 36F project while being arranged at the tiny interval $W_{36}$, and the front tooth 36F has a right-angled edge 82 formed at the front end (tip) of the second tip side 42 thereof.

The back tooth 36B has an edge 85 formed at the back end of the first tip side 41 thereof (see FIG. 47).

In a tightly pressure-contacting state shown in FIG. 47, the first tip side 41 of the back tooth 36B contacts the pipe outer peripheral surface 10A under pressure in such a manner as to bite into the outer peripheral surface 10A and the second tip side 42 of the front tooth 36F contacts the pipe outer peripheral surface 10A under pressure in such a manner as to bite into the outer peripheral surface 10A, thereby exerting a double sealing function. In the tightly pressure-contacting state shown in FIG. 47, further, pipe extraction resistances $Z_B$ and $Z_F$ are generated using the first tip side 41 and the second tip side 42 respectively. As the double sealing function is exerted by the first tip side 41 and the second tip side 42 in the tightly pressure-contacting state, a sealing member such as an O-ring is omissible from the inner peripheral surface and the outer peripheral surface of the joint body 1 (as shown in FIG. 35).

Figure 40:
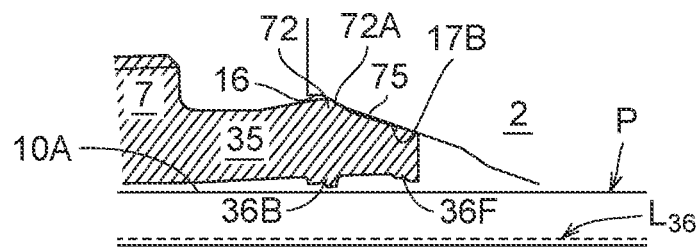
FIG. 40 is a principal part enlarged explanatory sectional view showing an initially set state of a tip head.

Steps shown in FIGS. 40 to 47 will be described sequentially by referring to FIGS. 37(B), 39, etc. FIG. 40 shows an initially set state in which the second convex part 72 is fitted in the short straight section 16 of the cap nut 2, the tilt part 75 (shown in FIG. 39) is fitted to the intermediate gentle slope tapered part 17B (shown in FIG. 37(B)), and a frontward tilt section 72A of the second convex part 72 is fitted to the base-end steep slope tapered part 17A.

Figure 41:
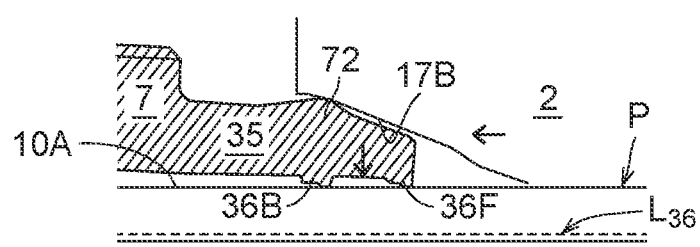
FIG. 41 is a principal part enlarged explanatory sectional view for explaining the motion of the tip head sequentially.

Next, in response to threaded movement of the cap nut 2, the tip head 37 enters the tapered section 17 while slidably contacting the tapered section 17. Then, as shown in FIG. 41, the second convex part 72 is pressed radially inwardly with the base-end steep slope tapered part 17A (see FIG. 37(B)) to contact the outer peripheral surface 10A of the pipe P under pressure. This is called a first squeezing step.

Figure 42:
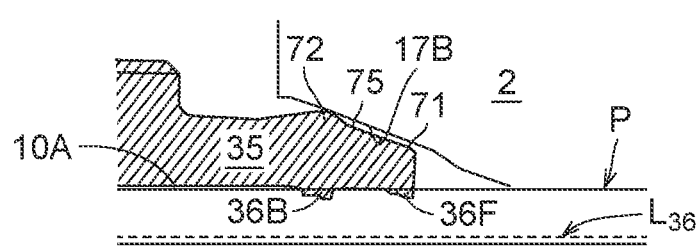
FIG. 42 is a principal part enlarged explanatory sectional view for explaining the motion of the tip head sequentially.
Figure 43:
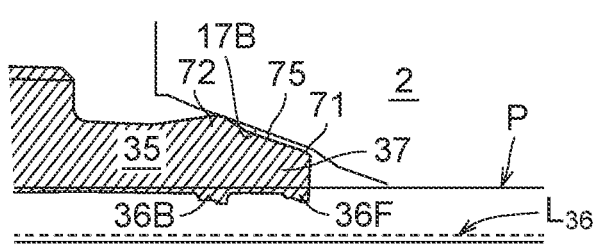
FIG. 43 is a principal part enlarged explanatory sectional view for explaining the motion of the tip head sequentially.

Next, as shown in FIGS. 41 and 42, (in response to the threaded movement of the cap nut 2), the second convex part 72 is driven onto the intermediate gentle slope tapered part 17B (contacts the intermediate gentle slope tapered part 17B under pressure) and is further compressed as shown in FIG. 43. In this step, only the second convex part 72 contacts the tapered part 17B under pressure. In the first half of the compression, the back tooth 36B first enters the pipe outer peripheral surface 10A (as shown in FIG. 42). In the latter half of the compression, the front tooth 36F further enters the pipe outer peripheral surface 10A (as shown in FIG. 43).

As shown in FIGS. 42 and 43, the tilt part 75 (see FIG. 39) forms a tiny gap from the intermediate gentle slope tapered part 17B (in a non-contacting state).

Figure 44:
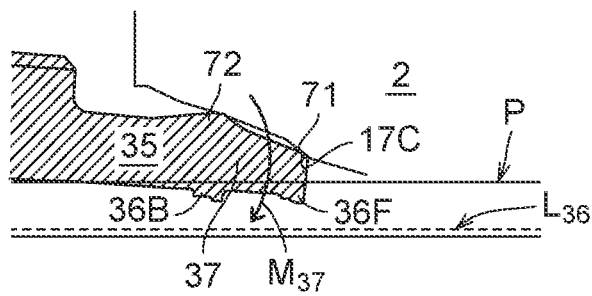
FIG. 44 is a principal part enlarged explanatory sectional view for explaining the motion of the tip head sequentially.

Next, as shown in FIG. 44, a two-point contact state is produced in which the first convex part 71 and the second convex part 72 abut on the tapered section 17 of the cap nut 2. In the two-point contact state in which the first convex part 71 on the front side abuts on the intermediate steep slope tapered part 17C, the tip head 37 rotates to be deformed as shown by an arrow $M_{37}$.

After the first squeezing step shown in FIG. 41, a second squeezing step shown in FIG. 44 is performed. In FIG. 44, the front tooth 36F makes sinking motion while rotating to as much as 2° to 2.5° degrees.

Figure 45:
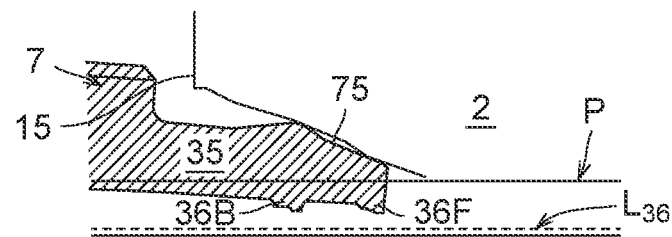
FIG. 45 is a principal part enlarged explanatory sectional view for explaining the motion of the tip head sequentially.
Figure 46:
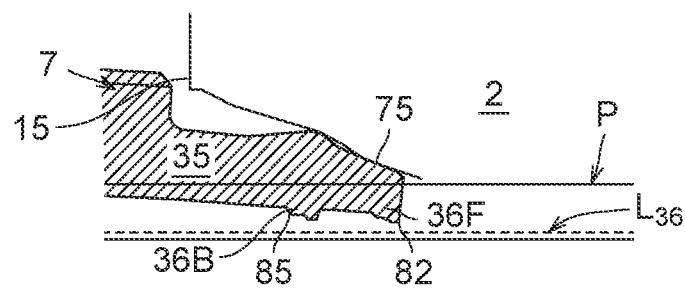
FIG. 46 is a principal part enlarged explanatory sectional view for explaining the motion of the tip head sequentially.
Figure 47:
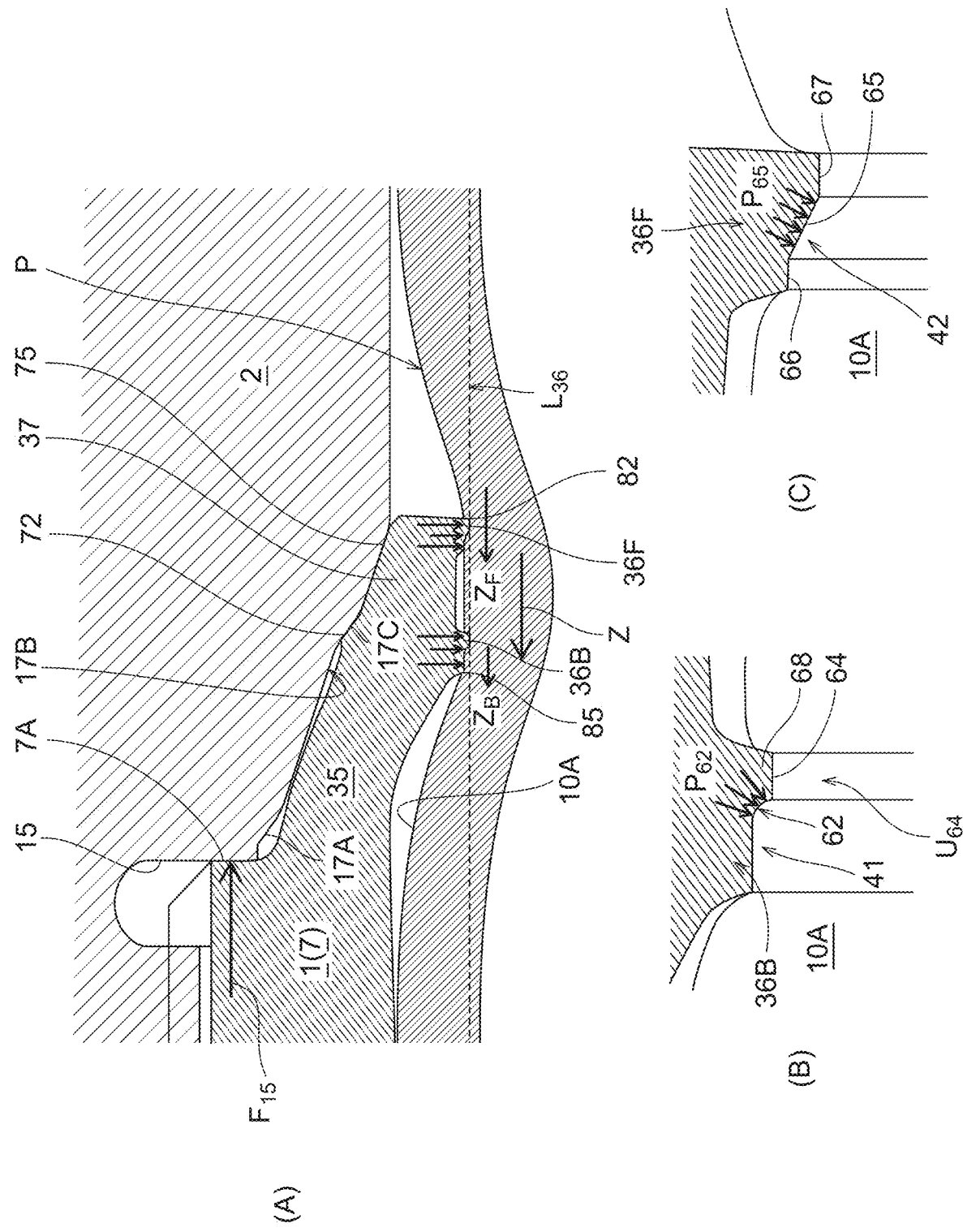
FIG. 47 is an explanatory view showing a tightly pressure-contacting state including a principal part enlarged explanatory sectional view (A), a partially non-sectional explanatory view (B) showing a principal part of (A) in a still enlarged manner, and a partially non-sectional explanatory view (C) showing a principal part of (A) in a still enlarged manner.

Next, as shown in FIGS. 45 to 46, the tilt part 75 of the tip head 37 is placed in a posture adapted to the tip gentle slope tapered part 17D. In the latter half of such compression, the compression proceeds mainly at the front tooth 36F.

Then, as shown in FIG. 47, the tip surface 7A comes to abut on the stepped section 15 of the cap nut 2 to complete the connection work. Specifically, in a tightening finished state of the cap nut 2, the tip surface 7A of the connection tube 7 of the joint body 1 and the stepped section 15 of the cap nut 2 abut on each other to allow a worker to (manually) detect increase in resistance to the threaded movement of the cap nut 2.

While the working steps have been described sequentially on the basis of FIGS. 40 to 47, the present invention can be considered as follows. The dimension, shape, and structure of each part are determined in such a manner as to perform the first squeezing step in which the tip head 37 enters the tapered section 17 with reduced-diameter tip while slidably contacting the tapered section 17 in response to threaded movement of the cap nut 2 to press the second convex part 72 radially inwardly with the base-end steep slope tapered part 17A, thereby pressing the back tooth 36B against the outer peripheral surface 10A of the pipe P. and the subsequent second squeezing step in which the first convex part 71 is pressed radially inwardly with the intermediate steep slope tapered part 17C, thereby pressing the front tooth 36F against the outer peripheral surface 10A of the pipe P.

As shown in FIG. 47, in the tightly pressure-contacting state, the anterior half side part 64 of the first tip side 41 of the back tooth 36B and the anterior half side part 67 of the second tip side 42 of the front tooth 36F are at an equal distance from the axis $L_P$ of the pipe P.

Specifically, the dashed line $L_{36}$ shown in FIG. 47 shows the equal radius (equal distance) from the axis $L_P$ of the pipe P, and the anterior half side part 64 and the anterior half side part 67 are sunk (bite) into the pipe outer peripheral surface 10A along the dashed line $L_{36}$.

As described above, by setting the shape of the outer peripheral surface of the tip head 37 and setting the slope angle and axial direction position (dimension) of the tapered section 17 with reduced-diameter tip appropriately, the anterior half side part 64 of the back tooth 36B and the anterior half side part 67 of the front tooth 36F are sunk, specifically, bite into the same depth in the tightly pressure-contacting state in such a manner as to be located at the equal distance $L_{36}$ from the pipe axis $L_P$.

Operation and function in the tightly pressure-contacting state will be described below on the basis of FIGS. 24(D), 25(D), 47(A), 47(B), and 47(C).

Assuming that the pipe P receives external force (rotation torque) in the tightly pressure-contacting state to rotate about the axis $L_P$ thereof, the anterior half side part 64 of the back tooth 36B forms a closed annular small recessed peripheral groove $U_{64}$ at the pipe outer peripheral surface 10A as shown in the enlarged view of FIG. 47(B). The closed annular small recessed peripheral groove $U_{64}$ functions as a guide groove (rail groove).

A small projecting strip 68 functions as what is called a rail to restrict the rotation of the pipe P so as to locate the small recessed peripheral groove $U_{64}$ on a plane perpendicular to the pipe axis $L_P$. Specifically, the rotation of the pipe P is restricted so as not to cause meandering rotation or spiral rotation.

As described above, even if the pipe P rotates, the engagement between the small projecting strip 68 and the small recessed peripheral groove $U_{64}$ prevents (suppresses) meandering rotation and spiral rotation, making it possible to prevent sealing break.

As shown in FIG. 47(B), further, contact of the curved intermediate level difference part 62 with a small projecting corner of the pipe outer peripheral surface 10A under pressure (see arrows $P_{62}$) strongly prevents the pipe P from coming off, specifically, from moving axially outwardly due to inner pressure, for example.

In particular, a sealing (hermetic) function is exerted by the generation of a high surface pressure indicated by the arrows $P_{62}$ at the curved intermediate level difference part 62 on the back side surface of the small projecting strip 68.

Next, as shown in FIGS. 47(A) and 47(C), in the foregoing tightly pressure-contacting state, the second tip side 42 of the front tooth 36F tightly contacts the outer peripheral surface 10A under pressure in a polygonal line shape. Referring to FIG. 36, if external force acting in a bending direction is received in an area rightward of the pipe P and beyond the range of the drawing, the front tooth 36F in the foregoing tightly pressure-contacting state in a polygonal line shape is mainly responsible for a pipe extraction preventing function of preventing the pipe P from coming off (toward the right of this drawing). In FIG. 47(C), arrows $P_{65}$ show "surface pressure" indicating that the slope surface 65 tightly contacts the pipe outer peripheral surface 10A under pressure.

Like FIG. 47(B), FIG. 47(C) shows a non-sectional view of the pipe P.

In each of the sectional shapes shown in FIGS. 25(A), 25(B), and 25(C), the second tip side 42 is desirably formed into a shape sloping upward toward the front (rising in a direction toward the edge 82) (not shown in the drawings). Specifically, the second tip side 42 of the shape sloping upward toward the front increases the operation and effect of preventing coming off of the pipe P.

As shown in FIGS. 47(B) and 47(C), the back tooth 36B and the front tooth 36F provided with the anterior half side parts 64 and 67 respectively having small widths make it possible to solve the problem (ii) described above by referring to FIG. 50. Specifically, this achieves the advantage of facilitating biting into the outer peripheral surface 10A of the pipe P. Additionally, the curved intermediate level difference part 62 of the back tooth 36B and the slope surface 65 of the front tooth 36F shown in FIGS. 47(B) and 47(C) exert an excellent sealing function (performance). Furthermore, on the occurrence of unintentional rotation of the pipe P, the small projecting strip 68 at the back tooth 36B is guided along the small recessed peripheral groove $U_{64}$ of the pipe P to effectively prevent meandering of the sealing surface, thereby achieving improvement of the sealing performance.

Additionally, the front tooth 36F of a polygonal line shape functions to block (prevent) movement in the pipe extracting direction, thereby avoiding influence on the back tooth 36B. Furthermore, even on the occurrence of bending of the pipe P, the front tooth 36F exerts strong force of preventing the extraction while the back tooth 36B effectively prevents spiral rotation or meandering rotation even on the occurrence of rotation of the pipe P. Also, on the occurrence of internal pressure acting on the pipe P, the surface pressure $P_{62}$ is increased to cause the curved intermediate level difference part 62 to exert both hermetic action and a pipe extraction preventing function.

As described above, the configuration of the present invention can be said to exert the function of preventing extraction of the pipe P and the sealing function sufficiently by causing the back tooth 36B and the front tooth 36F to work cooperatively.

Figure 48:
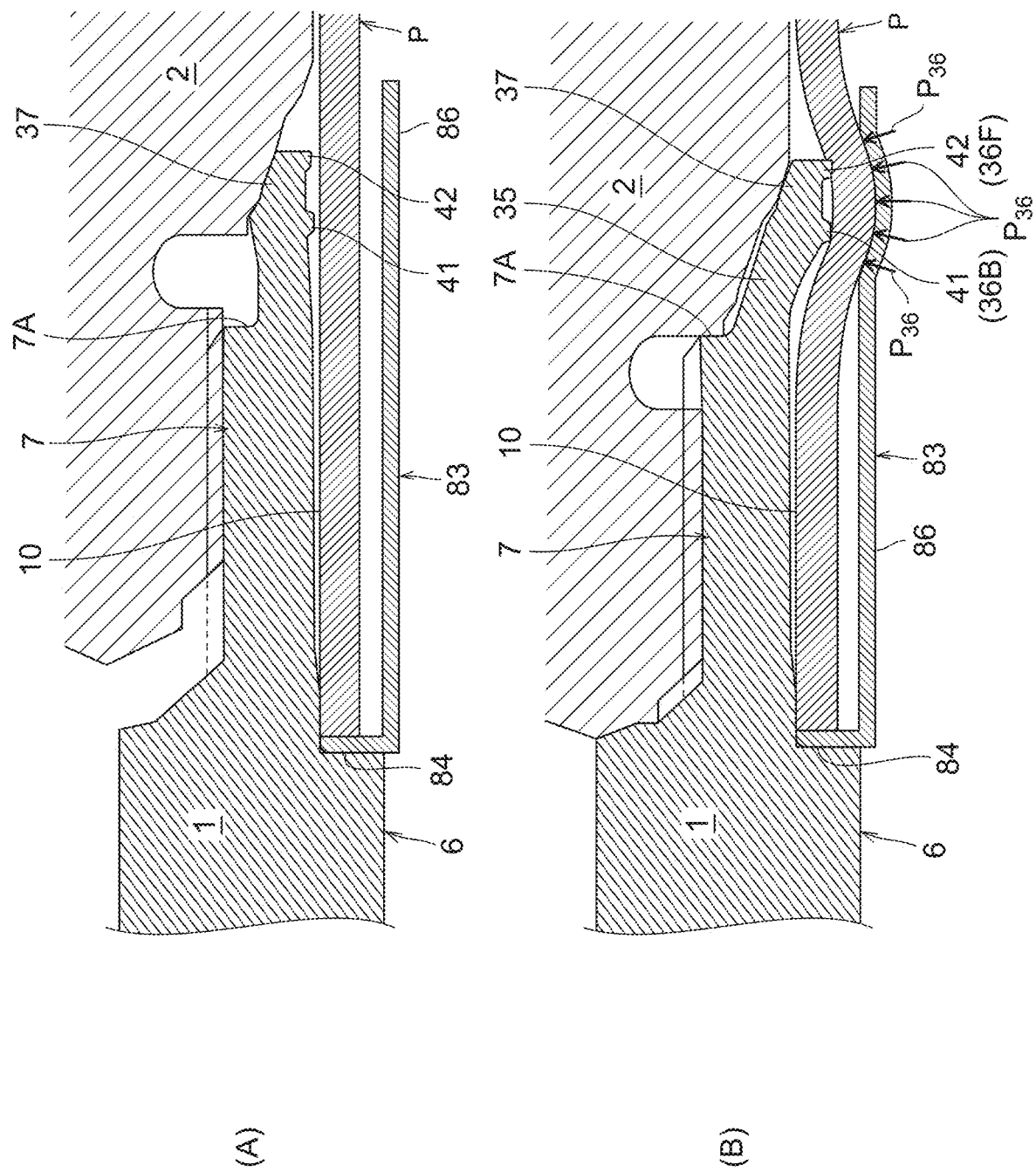
FIG. 48 is a view showing another example including a principal part enlarged sectional view (A) of an initially set state (of a tip head) and a principal part enlarged sectional view (B) showing a tightly pressure-contacting state.

Another modification shown in FIG. 48 will be described next. A support incore 83 is provided. Specifically, the incore 83 includes a cylindrical part 86 having one end provided with an outer flange 84. The states of FIGS. 48(A) and 48(B) correspond to the states of FIGS. 35 and 36 respectively. A sign given to a structure same as that given to a corresponding structure of the (fourth) embodiment described by referring to FIGS. 35 to 47 means that these structures function in the same way. The incore 83 works effectively if the pipe P has a small thickness dimension (if the pipe P is thin).

As described above in detail, according to the fourth embodiment of the present invention shown in FIGS. 35 to 48, the joint body 1 itself includes the extraction preventing tooth part 36 as an integral part that comes into a state of tightly contacting the outer peripheral surface of the connection target pipe P under pressure to generate the pipe extraction resistance Z in response to threaded movement of the cap nut 2 toward the male screw part 9 of the joint body 1, the extraction preventing tooth part 36 is provided at the tip of the substantially cylindrical thin part 35 projecting continuously from the tip surface 7A of the connection tube 7 with an outer periphery provided with the male screw part 9, the tooth part 36 includes the back tooth 36B and the front tooth 36F arranged at the tiny interval $W_{36}$, and, an average thickness dimension of the substantially cylindrical thin part 35 called $T_{35}$ and an average thickness dimension of the connection tube 7 called $T_7$ are set in such a manner as to establish a relational expression of $0.40 \cdot T_7 \leq T_{35} \leq 0.75 \cdot T_7$. This completely prevents the substantially cylindrical thin part 35 from rotating (co-rotating) together with the cap nut 2 as the cap nut 2 threadedly moves forward, making it possible to omit the "preliminary working" requiring a specific jig described as the unsettled problem (i) of the conventional pipe joint (shown in FIG. 50).

In response to this, working efficiency at a pipe connection site is improved dramatically.

Furthermore, resistance to pipe extraction is generated in the double tightly pressure-contacting state of the back tooth 36B and the front tooth 36F and is thus sufficiently strong. Additionally, this double pressure-contacting state makes it possible to prevent the rotation of the pipe P about its axis more reliably than the pawl 61 having a triangular section of the conventional pipe joint (shown in FIG. 50). In particular, the average thickness dimension $T_{35}$ of the substantially cylindrical thin part 35 corresponds to 40 to 75% of the average thickness dimension $T_7$ of the connection tube 7 and is sufficiently large. This allows the back tooth 36B and the front tooth 36F at the tip of the substantially cylindrical thin part 35 to tightly contact the pipe outer peripheral surface 10A under pressure with strength equal to or greater than that of the pipe P. Additionally, despite the sufficient largeness of the thickness dimension $T_{35}$ of the substantially cylindrical thin part 35, it has been clearly shown (from a result of experiment) that it is still possible to control rotation torque of the cap nut 2 for its threaded movement sufficiently low. Regarding metal sealing performance, it can be maintained sufficiently high as a result of the double sealing using the back tooth 36B and the front tooth 36F.

Furthermore, according to the present invention, a parts count is reduced, risk of loss of a small part is not caused, and a dimension in the axial direction can be reduced significantly, thereby encouraging compactness. Furthermore, sites where fluid leakage is to occur are reduced to achieve improvement of sealing performance.

The joint body 1 itself includes the extraction preventing tooth part 36 as an integral part that comes into a state of tightly contacting the outer peripheral surface of the connection target pipe P under pressure to generate the pipe extraction resistance Z in response to threaded movement of the cap nut 2 toward the male screw part 9 of the joint body 1, the extraction preventing tooth part 36 is provided at the tip of the substantially cylindrical thin part 35 projecting continuously from the tip surface 7A of the connection tube 7 with an outer periphery provided with the male screw part 9, the tooth part 36 includes the back tooth 36B and the front tooth 36F arranged at the tiny interval $W_{36}$, the back tooth 36B has a substantially trapezoidal sectional shape and the first tip side 41 composed of the upper side of the substantially trapezoidal shape includes the short posterior half side part 63 and the tall anterior half side part 64 defined across the curved intermediate level difference part 62, and the front tooth 36F has a substantially trapezoidal sectional shape and the second tip side 42 composed of the upper side of the substantially trapezoidal shape has a polygonal line shape with the short posterior half side part 66 and the tall anterior half side part 67 defined across the slope surface 65 sloping downward and backward. Thus, if a fluid to be hermetically sealed is gas such as a coolant, the double sealing function is exerted to obtain high hermetic performance stably. The slope surface 65 and the tall anterior half side part 67 of the front tooth 36F easily bite (are sunk) into the outer peripheral surface 10A of the pipe P to prevent coming off of the pipe P reliably. In particular, the slope surface 65 functions to prevent coming off of the pipe P reliably while bending force acts on the pipe P to generate the force of extracting the pipe P in the vicinity of the pipe joint.

Even if the pipe P rotates, the back tooth 36B is sunk into the pipe outer peripheral surface 10A while the tall anterior half side part 64 forms the small projecting strip 68 to form the small recessed peripheral groove $U_{64}$. This achieves guidance for reducing or preventing spiral rotation or meandering rotation of the pipe P to maintain high hermetic performance.

As the cap nut 2 threadedly moves forward, the first tip side 41 of the back tooth 36B and the second tip side 42 of the front tooth 36F of the joint body 1 come into a state of tightly contacting the outer peripheral surface 10A of the straight tip part 10 of the connection target pipe P under pressure to generate the pipe extraction resistance Z, and in the tightly pressure-contacting state, the first tip side 41 of the back tooth 36B and the second tip side 42 of the front tooth 36F contact the outer peripheral surface 10A of the pipe P under pressure in such a manner as to bite into the outer peripheral surface 10A, thereby exerting a double sealing function. This configuration makes it possible to exert high hermetic performance stably if a fluid to be sealed is a "coolant."

The double sealing function is exerted in the tightly pressure-contacting state to omit a sealing member from the inner peripheral surface and the outer peripheral surface of the joint body 1. This configuration makes a costly sealing member particularly for resistance to a coolant omissible while making it possible to maintain hermetic performance stably for a long time. Also, burdensome work for forming a concave groove for sealing at the joint body 1 is also omissible.

Even if the pipe P rotates about its axis $L_P$ in the foregoing tightly pressure-contacting state, the anterior half side part 64 of the first tip side 41 of the back tooth 36B bites into the outer peripheral surface 10A of the pipe P in such a manner as to form the closed annular small recessed peripheral groove $U_{64}$ to prevent meandering or spiral rotation of the pipe P. Furthermore, the curved intermediate level difference part 62 of the first tip side 41 contacts the back side surface of the small recessed peripheral groove $U_{64}$ under pressure to exert a sealing function. In this configuration, the sealing function by the curved intermediate level difference part 62 can also be maintained constantly favorably (without being unstable).

While the back tooth 36B and the front tooth 36F are in the state of tightly contacting the outer peripheral surface 10A of the pipe P under pressure, the front tooth 36F takes on the pipe extraction resistance $Z_F$ greater than the pipe extraction resistance $Z_B$ taken on by the back tooth 36B, and the front tooth 36F is responsible for a pipe extraction preventing function of preventing the pipe P from coming off in response to receipt of external force in a bending direction using the second tip side 42 of the front tooth 36F tightly contacting the outer peripheral surface 10A under pressure in the polygonal line shape. In this configuration, the front tooth 36F prevents extraction of the pipe P even if the pipe P is in a bent state and maintains the back tooth 36B so as to always exert a favorable hermetic function. In this way, the front tooth 36F works cooperatively with the back tooth 36B to maintain pipe extraction resistance and hermetic performance stably.

In the tightly pressure-contacting state, the back tooth 36B and the front tooth 36F are configured to bite into the outer peripheral surface 10A of the pipe P to the same depth in such a manner that the first tip side 41 and the second tip side 42 are at the equal distance $L_{36}$ from the axis $L_P$ of the pipe P. Thus, (as shown in FIG. 47,) the back tooth 36B and the front tooth 36F are allowed to work cooperatively in the most well-balanced manner to exert high pipe extraction resistance and high hermetic (sealing) performance.

At the hole part 11 of the cap nut 2, the tapered section 17 with reduced-diameter tip is defined by the base-end steep slope tapered part 17A, the intermediate gentle slope tapered part 17B, the intermediate steep slope tapered part 17C, and the tip gentle slope tapered part 17D. In this configuration, as described above by referring to FIGS. 40 to 47 sequentially, the back tooth 36B and the front tooth 36F are to bite (to be squeezed) into the pipe outer peripheral surface 10A with a time difference therebetween to allow compression successfully. Furthermore, even with the relatively large average thickness dimension $T_{35}$ and the small (short) axial direction dimension of the substantially cylindrical thin part 35, it is still possible to make a smooth shift to the final tightly pressure-contacting state shown in FIG. 47 in response to the threaded movement of the cap nut 2. In particular, in the steps shown in FIGS. 40 to 42 in the first half, the compression proceeds mainly at the back tooth 36B. In the last half shown in FIGS. 43 to 45, the rotation and deformation of the tip head 37 in the direction of the arrow $M_{37}$ allows implementation of the compression mainly at the front tooth 36F. As a result, as shown in FIG. 47, the back tooth 36B and the front tooth 36F are allowed to bite into the pipe outer peripheral surface 10A equally.

The foregoing description can mean that it is possible to perform operations at two sites differing each other in the axial direction, specifically, perform the operation of compression and the operation of metal sealing (pressure contact) using the back tooth 36B and the front tooth 36F simultaneously in a well-balance manner.

The presence of the base-end steep slope tapered part 17A allows reduction in the total number of times the cap nut 2 rotates. Specifically, the back tooth 36B and the front tooth 36F do not contact the pipe P immediately after start of the compression of the cylindrical part 35 shown in FIG. 40. This can reduce the rotation torque of the cap nut 2. Compressing the cylindrical part 35 rapidly at this time using the base-end steep slope tapered part 17A is considered to be rational as it allows reduction in the total number of times the cap nut 2 rotates.

At the hole part 11 of the cap nut 2, the tapered section 17 with reduced-diameter tip is defined by the base-end steep slope tapered part 17A, the intermediate gentle slope tapered part 17B, the intermediate steep slope tapered part 17C, and the tip gentle slope tapered part 17D, the tip head 37 of the substantially cylindrical thin part 35 includes the first convex part 71 composed of an extreme tip outer peripheral corner and the second convex part 72 of a low triangular bulging shape formed at an axial direction position corresponding to an axial direction position of the back tooth 36B and formed at the outer periphery of the tip head 37, and the first squeezing step and the subsequent second squeezing step are performed. In the first squeezing step, the tip head 37 enters the tapered section 17 with reduced-diameter tip while slidably contacting the tapered section 17 in response to the threaded movement of the cap nut 2 to press the second convex part 72 radially inwardly with the base-end steep slope tapered part 17A, thereby pressing the back tooth 36B against the outer peripheral surface 10A of the pipe P. In the second squeezing step, the first convex part 71 is pressed radially inwardly with the intermediate steep slope tapered part 17C, thereby pressing the front tooth 36F against the outer peripheral surface 10A of the pipe P. In this configuration, the back tooth 36B and the front tooth 36F can be squeezed (compressed) successfully for the first time and for the second time with a time difference therebetween. Furthermore, even with the relatively large average thickness dimension $T_{33}$ and the small axial direction dimension of the substantially cylindrical thin part 35, it is still possible to make a smooth shift to the tightly pressure-contacting state shown in FIG. 47 in response to the threaded movement of the cap nut 2.

In particular, in the first squeezing step in the first half (shown in FIGS. 40 to 42), the squeezing proceeds mainly at the back tooth 36B. In the second squeezing step in the last half (shown in FIGS. 43 to 45), the squeezing proceeds mainly at the front tooth 36F. As a result, as shown in FIG. 47, the back tooth 36B and the front tooth 36F are allowed to bite (to be sunk) equally (to the radial direction depth position indicated by the dashed line $L_{36}$).

As the compression proceeds in two separate steps including the first squeezing step and the second squeezing step, it becomes possible to reduce rotation torque of a work tool (the rotation torque can be applied equally) used for tightening the cap nut 2.

In a tightening finished state of the cap nut 2, the tip surface 7A of the connection tube 7 of the cap nut of the joint body 1 and the stepped section 15 of the hole part 11 of the cap nut 2 abut on each other to allow a worker to detect increase in resistance to the threaded movement of the cap nut 2. This produces an advantage that tightening torque of a work tool such as a spanner or a wrench is increased rapidly to allow detection of finish of the work (finish of the connection work). In FIG. 47, an arrow $F_{15}$ indicates a vector of force generated at a moment when the tip surface 7A abuts on the stepped section 15.

The support incore 83 is provided that supports the tip part 10 of the pipe P from an inner peripheral side while the back tooth 36B and the front tooth 36F of the joint body 1 are in the state of tightly contacting the outer peripheral surface 10A of the pipe P under pressure. If the pipe P is a soft metallic material or if the pipe P is subjected to large fluctuations in outer diameter dimension or thickness dimension as a result of overseas standards, for example, the incore 83 is squeezed into the back tooth 36B and the front tooth 36F, making it possible to support the pipe P in such a manner as to prevent the pipe P from being deformed excessively radially inwardly, as indicated by arrows $P_{36}$ in FIG. 48(B).

In other words, if the pipe P is soft or if a large difference is generated in dimensional tolerance or in outer diameter dimension of the pipe P, or in the pipe thickness dimension itself (as a result of differences in standard between countries, for example), the support incore 83 is used to make the pipe joint having the configuration of the present invention available.

EXPLANATION OF REFERENCE SIGNS

1 Joint body
1F Flare joint body
2 Cap nut
3 Stop ring
5 Slope surface with reduced-diameter tip
6 Flow path hole
7 Connection tube
7A Tip surface
9 Male screw part
10 Straight tip part
10A Outer peripheral surface
11 Hole part
15 Stepped section
17 Tapered section with reduced-diameter tip
17A Base-end steep slope tapered part
17B Intermediate gentle slope tapered part
17C Intermediate steep slope tapered part
17D Tip gentle slope tapered part
35 Substantially cylindrical thin part
36 Tooth part
36B back tooth
36F Front tooth
37 Tip head
41 First tip side
42 Second tip side
62 Curved intermediate level difference part
63 Posterior half side part
64 Anterior half side part
65 Slope surface
66 Posterior half side part
67 Anterior half side part
71 First convex part
72 Second convex part
83 Support incore
$L_{36}$ Dashed line (equal distance from axis)
$L_P$ Pipe axis
P Pipe
$T_7$ Average thickness dimension
$T_{35}$ Thickness dimension
$U_{64}$ Small recessed peripheral groove
$W_{16}$ Tiny interval
Z Pipe extraction resistance
$Z_B$ Extraction resistance taken on by back tooth
$Z_F$ Extraction resistance taken on by front tooth

The invention claimed is:
1. A pipe joint, comprising:
a flare joint body (1F) including a male screw part (9) and a slope surface (5) with reduced-diameter tip;
a cap nut (2) including a female screw part (12) threadedly attached to the male screw part (9) and provided at a base end of a hole part (11), and a housing space part (E) with a constant diameter section (14), a stepped section (15), and a tapered section (17) with reduced-diameter tip provided at an intermediate area of the hole part (11); and
a stop ring (3) fitted in the housing space part (E), including a base-end pressure-contacting slope surface (32) contacting the slope surface (5) with reduced-diameter tip under pressure, and having a tip provided with a plastically-deformable and substantially cylindrical thin part (35) and a pipe extraction preventing tooth part (36) formed at a tip head (37) of the substantially cylindrical thin part (35), wherein
the tooth part (36) includes a back tooth (36B) and a front tooth (36F) arranged at an interval ($W_{36}$), the back tooth (36B) has a trapezoidal or substantially trapezoidal sectional shape with a linear first tip side (41) as an upper side, and the front tooth (36F) has a trapezoidal or substantially trapezoidal sectional shape with a linear second tip side (42) as an upper side, and
as the cap nut (2) threadedly moves forward, the first tip side (41) of the back tooth (36B) and the second tip side (42) of the front tooth (36F) of the stop ring (3) come into a state of tightly contacting an outer peripheral surface (10A) of a straight tip part (10) of a connection target pipe (P) under pressure to generate pipe extraction resistance (Z) and to exert hermetic action on a fluid,
the tapered section (17) with reduced-diameter tip of the cap nut (2) is inclined so that a diameter of the tapered section (17) with reduced-diameter tip decreases toward a tip of the cap nut (2),
the slope surface (5) with reduced-diameter tip of the flare joint body (1F) is inclined so that a diameter of the slope surface (5) with reduced-diameter tip decreases toward a tip of the flare joint body (1F),
the base-end pressure contacting slope surface (32) of the stop ring (3) is inclined so that a diameter of the base-end pressure contacting slope surface (32) increases toward a base end of the stop ring (3) at a radially outside of the slope surface (5) with reduced-diameter tip,
the stop ring (3) has a cylindrical base outer diameter part (24) between the base-end pressure contacting slope surface (32) and the substantially cylindrical thin part (35) in the axial direction of the stop ring (3), the base outer diameter part (24) is slidably fitted to the constant diameter section (14) of the cap nut (2), the straight tip part (10) of the connection target pipe (P) is inserted inside the base outer diameter part (24), and in a pipe connection finished state, a gap in a radial direction between the constant diameter section (14) of the cap nut (2) and the straight tip part (10) of the connection target pipe (P) is filled by the base outer diameter part (24).

2. The pipe joint according to claim 1, wherein
a sealing function is exerted by the back tooth (36B) and the front tooth (36F) of the tooth part (36) while the back tooth (36B) and the front tooth (36F) are in the state of tightly contacting the outer peripheral surface (10A) under pressure in response to the threaded movement of the cap nut (2), thereby making a sealing member unnecessary at an inner peripheral surface and an outer peripheral surface of the stop ring (3).

3. The pipe joint according to claim 1, wherein
at the hole part (11) of the cap nut (2), the tapered section (17) with reduced-diameter tip is defined by a base-end steep slope tapered part (17A) and a tip gentle slope tapered part (17B), wherein the steep slope of the base-end tapered part (17A) is steeper in slope than the gentle slope of the tip tapered part (17B).

4. The pipe joint according to claim 1, wherein
while the back tooth (36B) and the front tooth (36F) are in the state of tightly contacting the outer peripheral surface (10A) of the pipe (P) under pressure, the pipe extraction resistance (Z) is distributed equally to the back tooth (36B) and the front tooth (36F).

5. The pipe joint according to claim 1, wherein
while the stop ring (3) is in a free state, the first tip side (41) of the back tooth (36B) and the second tip side (42) of the front tooth (36F) are arranged parallel to each other in such a manner that the first tip side (41) is placed radially inwardly from the second tip side (42), and
a slope angle at a tip of the tapered section (17) with reduced-diameter tip, and the shape and dimension of the tip head (37) are set in such a manner that, in the tightly pressure-contacting state, the second tip side (42) projects further in a radially inward direction than the first tip side (41) or the second tip side (42) and the first tip side (41) are at the same position as viewed in a radial direction.

6. The pipe joint according to claim 1, wherein
the substantially cylindrical thin part (35) with another tip provided with the back tooth (36B) and the front tooth (36F) has a conical cylindrical shape increased in diameter toward the tip.

7. The pipe joint according to claim 1, wherein
a projection (33) for preventing the substantially cylindrical thin part (35) from being increased in diameter and deformed excessively in a pressure-receiving state is provided at an outer peripheral surface of the substantially cylindrical thin part (35), and the projection (33) is configured to abut on an inner surface of the hole part (11) of the cap nut (2).

8. The pipe joint according to claim 1, wherein
the stop ring (3) includes an annular projecting strip (40) provided at an inner peripheral edge of the base-end pressure-contacting slope surface (32), to be hooked from an inner diameter side on an annular tip edge part (20) defined by a tip of the slope surface (5) with reduced-diameter tip of the flare joint body (1F) and a joint body hole part (6), and configured to prevent a base end portion of the stop ring (3) from being excessively deformed radially outwardly.

9. The pipe joint according to claim 1, wherein
at least a back portion (31) of a pipe insertion hole part (3A) of the stop ring (3) is formed into a tapered shape with diameter reduced backward and is configured to cause the straight tip part (10) to contact an inner peripheral surface (27) of the pipe insertion hole part (3A) under pressure in a pipe insertion finished state.

* * * * *